US010908611B2

(12) United States Patent
Hanson et al.

(10) Patent No.: US 10,908,611 B2
(45) Date of Patent: Feb. 2, 2021

(54) SYSTEMS AND METHODS FOR SEMI-SUBMERSIBLE LAUNCH AND RECOVERY OF OBJECTS FROM MULTI-MODE UNMANNED VEHICLE

(71) Applicant: Unmanned Innovations, Inc., Melbourne, FL (US)

(72) Inventors: Bruce Becker Hanson, Melbourne, FL (US); Thomas Edward Hanson, Ashland, MA (US)

(73) Assignee: UNMANNED INNOVATIONS, INC., Melbourne, FL (US)

( * ) Notice: Subject to any disclaimer, the term of this patent is extended or adjusted under 35 U.S.C. 154(b) by 30 days.

(21) Appl. No.: 16/449,824

(22) Filed: Jun. 24, 2019

(65) Prior Publication Data
US 2019/0310639 A1    Oct. 10, 2019

Related U.S. Application Data

(63) Continuation-in-part of application No. 15/609,459, filed on May 31, 2017, now Pat. No. 10,331,131, which is a continuation-in-part of application No. 14/788,231, filed on Jun. 30, 2015, now Pat. No. 9,669,904, which is a continuation-in-part of application No. 13/470,866, filed on May 14, 2012, now Pat. No. 9,096,106.

(Continued)

(51) Int. Cl.
*G05D 1/00* (2006.01)
*B63B 1/04* (2006.01)
*B63B 1/32* (2006.01)
*B63G 8/22* (2006.01)
*B63B 1/20* (2006.01)
*B63B 35/00* (2020.01)
*B64C 3/38* (2006.01)

(52) U.S. Cl.
CPC ........... *G05D 1/0088* (2013.01); *B63B 1/042* (2013.01); *B63B 1/322* (2013.01); *B63B 2001/206* (2013.01); *B63B 2035/007* (2013.01); *B63B 2035/008* (2013.01); *B63G 8/22* (2013.01); *B64C 3/38* (2013.01); *B64C 2201/146* (2013.01)

(58) Field of Classification Search
CPC .. G05D 1/0088; B63B 1/043; B63B 2001/206
USPC ...................................................... 701/21, 23
See application file for complete search history.

(56) References Cited

U.S. PATENT DOCUMENTS

| 3,587,505 A * | 6/1971 | Wells .................... B63B 25/006 114/26 |
| 2015/0027125 A1* | 1/2015 | Raj ........................ F03D 1/0616 60/720 |

OTHER PUBLICATIONS

W. Naeem, T. Xu, R. Sutton and J. Chudley, "Design of an Unmanned Catamaran with Pollutant Tracking and Surveying Capabilities," 2006 UKACC Control 2006 Mini Symposia, Glasgow, 2006, pp. 99-113. (Year: 2006).*

* cited by examiner

*Primary Examiner* — Isaac G Smith
(74) *Attorney, Agent, or Firm* — Mark Malek; Widerman Malek, PL

(57) ABSTRACT

The systems and associated methods are for autonomously launching and recovering payload objects such as vessels, equipment and people by partially submerging a multi-mode unmanned vehicle in a controlled manner. Mechanical, power, signal and logical system components operate in a coordinated manner to repeatedly and reliably perform unmanned launch and recovery of payloads in a variety of conditions and sea states from a catamaran style hull with multi-mode, high-performance characteristics.

26 Claims, 41 Drawing Sheets

Related U.S. Application Data

(60) Provisional application No. 61/485,477, filed on May 12, 2011.

| Vehicle | L/D (Lift to Drag Ratio) | Weight per Wing Area (lbs. / sq. foot) | Landing speed (Knots) | Minimum Air Speed (Knots) |
|---|---|---|---|---|
| Unmanned Vehicle | 4.7 | 13 | 135* | 65 |
| Space Shuttle | 4.5 | 32 | 220 | 85 |
| Concorde | 4.35 | 27 | 180 | 125 |

*Horizontal landing

SYSTEMS AND METHODS FOR SEMI-SUBMERSIBLE LAUNCH AND RECOVERY OF OBJECTS FROM MULTI-MODE UNMANNED VEHICLE

RELATED APPLICATIONS

This application is a continuation-in-part and claims the benefit under 35 U.S.C. § 120 of U.S. patent application Ser. No. 15/609,459 filed by the inventor of the present application on May 31, 2017, and titled SYSTEMS AND METHODS FOR PAYLOAD INTEGRATION AND CONTROL IN A MULTI-MODE UNMANNED VEHICLE which, in turn, is a continuation-in-part and claims the benefit under 35 U.S.C. § 120 of U.S. patent application Ser. No. 14/788,231 filed by the inventor of the present application on Jun. 30, 2015, and titled SYSTEMS AND METHODS FOR MULTI-MODE UNMANNED VEHICLE MISSION PLANNING AND CONTROL which, in turn, is a continuation-in-part and claims the benefit under 35 U.S.C. § 120 of U.S. patent application Ser. No. 13/470,866, now U.S. Pat. No. 9,096,106 titled MULTI-ROLE UNMANNED VEHICLE SYSTEM AND ASSOCIATED METHODS filed on May 14, 2012, which, in turn, claims the benefit under 35 U.S.C. § 119(e) of U.S. Provisional Patent Application Ser. No. 61/485,477 titled MARITIME MULTI-ROLE UNMANNED VEHICLE SYSTEM filed on May 12, 2011, the entire contents of each of which are incorporated herein by reference, except to the extent that any content therein conflicts with the content herein.

FIELD OF THE INVENTION

The present invention relates generally to the field of unmanned, autonomous vehicles. In particular, the invention relates to systems and methods for advantageous employment of unmanned vehicles that are capable of operating in atmospheric, marine, and submarine environments, and that are equipped for semi-submersible launch and recovery of objects such as vessels, equipment and/or people.

BACKGROUND OF THE INVENTION

For decades, use of unmanned vehicles, such as unmanned aircraft systems (generally referred to as drones), has been increasing as delivery, sensor, and automation technologies mature. One advantage of unmanned vehicles is the ability to establish large areas of operation with a significantly reduced number of people than would be required for a manned enterprise. Another advantage is the ability to deploy unmanned systems into operational environments that are hostile or dangerous to human beings.

The United States military is increasing its use of unmanned vehicles by all service branches and in all theaters of operation. Current examples of planned uses of unmanned vehicles in marine and submarine environments are for mine and submarine detection, maritime interdiction missions, harbor security, and intelligence, surveillance and reconnaissance (ISR) missions. The commercial market also is also experiencing increased use of unmanned vehicles. Current examples of such use include search and rescue, drug interdiction, remote launch and recovery of external payloads, autonomous environmental testing, oil spill collection and monitoring, weather monitoring, and real time tsunami data collection and monitoring. The scope of both military and civilian uses for unmanned vehicles is expected to continue to increase significantly in the coming decade.

Conventional unmanned vehicle designs typically are each limited in scope to a particular operating environment and/or beneficial task. In the marine and submarine environments, most current unmanned vehicle designs are based on retrofits of manned vehicle designs and, as result, incur operational and performance envelope limitations built into vehicles designed for carrying people, such as described in U.S. Pat. No. 7,789,723 to Dane et. al. Alternatively, systems designed specifically as unmanned vehicles, such as described in U.S. Pat. No. 6,807,921 to Huntsman, typically are configured to achieve particular characteristics that are conducive to accomplishing a task of interest, such as, for example, endurance or underwater performance. However, these designs typically preclude achievement of a broader range of unmanned vehicle characteristics (e.g., multi-environment, multi-task) for the sake of limited-environment, limited-task characteristics.

The current state of the art for launch and recovery of vessels and payloads from surface vessels, both manned and unmanned, includes the use of winches, booms or davits. In these approaches, the vessel or payload to be launched is required to be connected to a hoist mechanism, swung over the side of the host vessel, lowered next to the host vessel to the water and disconnected from the hoist mechanism. Similarly, on recovery, the payload or vessel is required to be positioned next to the host vessel, connected to the hoist mechanism, raised above the deck, swung over the deck, lowered into the desired position on the deck and disconnected from the payload or vessel. These types of launch and recovery systems were designed for use by multiple people and are not amenable to autonomous operation.

Large vessels, such as ships, may have "well-decks", but related technology does not exist on catamarans or high-performance unmanned vessels and does not exist on unmanned maritime vessels.

More specifically, the present state of the art, primarily referring to the use of winches, booms and davits described above, presents a number of problems, some of which are worsened by an increasing sea state. As the pitch and roll of the host vessel increases, the payload launch is increasingly difficult to control and can be damaged by prematurely coming off its structural coaming and inadvertently striking the side of the host vessel. Autonomously connecting and disconnecting winch mechanisms to the vessel is generally difficult to automate with increasing difficulty in higher sea states. The existing structures onboard smaller launch and recovery vehicles are designed such that the structural equipment increases the vertical center of gravity (CG) thereby resulting in increased instability within the roll characteristics of the host vessel. Repeatability and reliability are problematic in this kind of system. If people are part of the launch and recovery process, then there is increased safety risk with increasing sea states. The launch and recovery equipment is generally heavy and complex to operate. None of the current approaches, including well-decks used in larger ships, are available in high performance vessels or high-performance catamarans. None of the current approaches are available in an unmanned autonomous multi-mode maritime vehicle.

There is a need to autonomously launch and recover various payloads, including vessels (surface and underwater), equipment and people, from unmanned vessels at sea. Additionally, there is a need for the host vessel performing the launch and recovery to have performance characteristics including high speed, maneuverability and autonomous navigation. An example of this in the field of military operations might be an unmanned vessel carrying mine detection and neutralization vessels that themselves are unmanned. In this case, speed and navigation to and from the suspected minefield area is desired, as is the ability accurately and autonomously navigate a specific mine-search pattern.

The use of unmanned maritime vessels is increasing and the need for unmanned vessels working with other unmanned vessels is becoming a necessity. The ability to launch and recover unmanned vessels in maritime environments may be a critical aspect of unmanned vessel utility. The further ability for a larger unmanned vessel to autonomously launch other smaller surface and subsurface unmanned vessels, as well as equipment, and people increases the utility of unmanned vessel use.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the foregoing in mind, one of the many objects of the present invention is to provide advantageously and readily-deployable systems and methods for launch and recovery of objects using an unmanned vehicle with enhanced operational characteristics. These enhanced operational characteristics include, but are not limited to, speed, maneuverability, sea state handling, endurance, stealth, payload capacity, sensory capability, communication ability, and operational autonomy.

It may be an object of the present embodiments to provide a well-deck built into a catamaran-like hull including the ability to flood the stern of the host vessel, the ability to control buoyancy through a buoyancy control system, and/or the ability to control water depth in the well deck and pitch of the well deck by controlling the center of buoyancy. It may also be an object of the present embodiments to provide the ability to position the host vessel in an advantageous position and orientation, so the payload can most effectively be launched and recovered. Positioning is relative to the payload and environment. This is particularly important in higher sea states.

It may be an object of the present embodiments to provide the ability of the host vessel to navigate autonomously with high performance characteristics when not flooded, the ability of the host vessel to maintain headway and navigate while the well deck is flooded, and/or the ability of the host vessel to sense location and position of launched and recovered payloads as they move away or toward the well deck.

These and other objects, features and advantages according to embodiments of the present invention are provided by unmanned vehicle configured to selectively operate on at least a substantially planar water surface and while at least partially submerged in water. The unmanned vehicle includes a vehicle body having a pair of substantially parallel sponsons coupled together on opposite sides of a recessed well deck in a stern portion of the vehicle body, the recessed well deck being configured to stow a payload. A propulsion system is carried by the vehicle body and configured to propel the unmanned vehicle, and a maneuvering system is configured to maneuver the unmanned vehicle. A vehicle control system is carried by the vehicle body and configured to control a speed, an orientation, and a direction of travel of the unmanned vehicle in combination with the propulsion system and the maneuvering system.

A buoyancy control system is configured to control buoyancy of the unmanned vehicle, and a sensor system has a plurality of environmental sensors configured to sense environmental and operational characteristics for the unmanned vehicle. A power supply is carried by the vehicle body and configured to provide power to the propulsion system, the maneuvering system, the vehicle control system, the buoyancy control system, and the sensor system.

The vehicle control system, the buoyancy control system and the sensor system define a well deck positioning control system configured to launch and recover objects of the payload to/from the water while the well deck is at least partially submerged in water. The buoyancy control system comprises ballast containers positioned within portions of the vehicle body, and a pump and valve system configured to vary amounts of water and air in the ballast containers and the recessed well deck. The recessed well deck includes a payload securing system.

The plurality of environmental sensors of the sensor system may include water level sensors configured to sense water levels in the ballast containers and the recessed well deck, and payload position sensors configured to sense the position of the payload relative to the payload securing system and the recessed well deck. The well deck positioning system further includes a well deck positioning controller configured to provide output signals to the buoyancy control system in response to input signals from the sensor system and at least one of operator instructions and autonomous operation instructions.

Orientation sensors may include positional sensors to provide pitch-roll-yaw and depth position of the unmanned vehicle. Also, sensors may detect location and orientation of payload objects to provide feedback to the command and control block and/or positioning and payload securing systems. The payload position sensors may include imaging sensors, e.g., electro-optical or infrared (EO/IR), that are oriented toward payload objects and a remote streaming system (i.e., control and communications of imaging) may provide feedback to remote human operators. Thus, the well deck positioning control system, in connection with the vehicle control system, may have the capability to dynamically position the unmanned vehicle relative to payload objects and may include communication between such objects and the unmanned vehicle.

Additionally, and/or alternatively, the well deck positioning system is controlled by the well deck positioning controller to position the recessed well deck within six degrees of freedom including roll, pitch, yaw, up/down, forward/reverse and right/left. As such, roll, pitch, and up/down may be controlled in combination with the buoyancy control system, and yaw, forward/reverse and right/left may be controlled in combination with the vehicle control system.

Additionally, and/or alternatively, the ballast containers may include at least one ballast container located forward and aft in each of the sponsons to define four quadrants of buoyancy for the unmanned vehicle. As such, the buoyancy control system may be configured to control the relative buoyancy in each of the four quadrants and the total buoyancy of the unmanned vehicle.

Additionally, and/or alternatively, the pump and valve system includes a ballast water pump and a ballast water valve associated with each ballast container. The pump and valve system may include at least one well deck water pump and associated well deck water valve. The pump and valve system may include at least one air valve associated with the ballast containers or the recessed well deck.

Additionally, and/or alternatively, the payload securing system may include at least one support structure configured to hold and stabilize objects of the payload. The payload securing system may also include a winch/tether system including tether lines attached to at least one reel. The tether lines may be multi-purpose tether lines configured to transmit power to, communicate data with, and mechanically tow objects of the payload.

Additionally, and/or alternatively, the objects of the payload may be unmanned surface vessels ("USV"), unmanned underwater vessels ("UUV") and/or remote operated vehicles ("ROV").

Additionally, and/or alternatively, the plurality of environmental sensors of the sensor system further include orientation sensors, and wherein the well deck positioning system is controlled by the well deck positioning controller to position the recessed well deck relative to position and orientation of objects of the payload using payload position sensors and orientation sensors. The well deck positioning system may be controlled by the well deck positioning controller to position the recessed well deck relative to position and orientation of objects of the payload using communication therebetween.

Additionally, and/or alternatively, the sensor system further includes environmental sensors to sense environmental conditions including at least one of sea state, wind and current. Here, the well deck positioning system may be controlled by the well deck positioning controller to position the recessed well deck relative to objects of the payload based upon the environmental conditions.

Additionally, and/or alternatively, the propulsion system is powered by at least one of an electric motor, a diesel motor, a turbine engine, and a nuclear reactor.

Additionally, and/or alternatively, the at least one power supply includes at least one battery in electrical communication with at least one of solar energy collectors, wave motion energy collectors, and generated energy collectors.

DETAILED DESCRIPTION OF THE INVENTION

Figure 1:
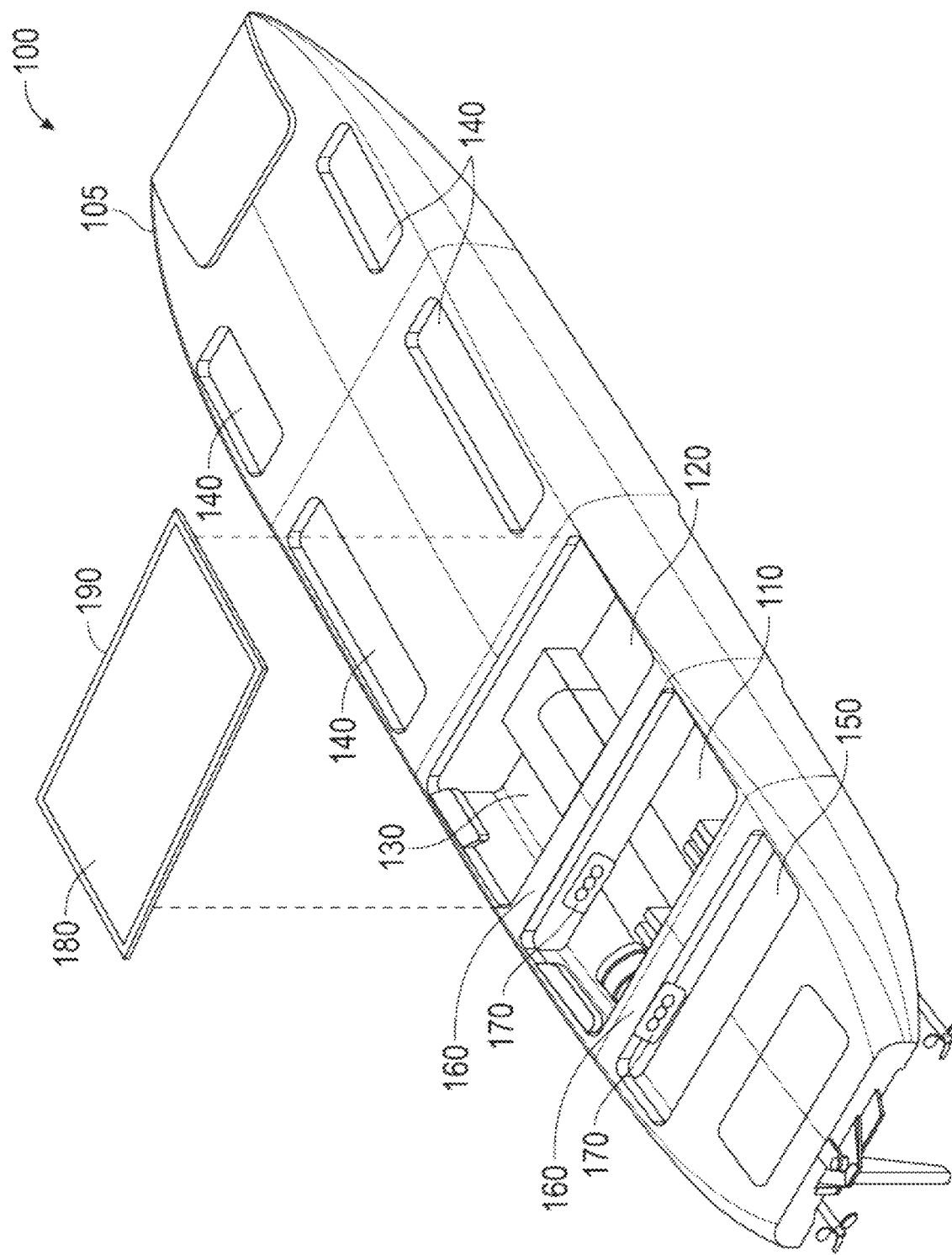
FIG. 1 is an exploded solid model view of an unmanned vehicle according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

As a matter of definition, "mission," as used herein, refers to an overarching goal to be achieved through some combination of human, machine, material, and machine assets. "Planning," as used herein, refers to establishing a hierarchy of logistical and operational tasks to be accomplished using available mission assets, and to be assigned and managed at the appropriate level of abstraction. For example, and without limitation, levels of abstraction for asset assignment may include an individual unmanned vehicle being assigned a specific task, an unmanned vehicle sub-group being responsible for a mission sub-goal, and/or a full set of available assets being dedicated to an overall mission goal. Therefore, planning may involve pre-configuring missions for each unmanned vehicle as well as mapping and visualizing groups of unmanned vehicles. "Control," as used herein, refers to asset tracking, data collection, and mission adjustments accomplished in real-time as execution of a plan unfolds and as a mission evolves. Control, in the context of unmanned vehicle use, may involve selection of deployment modes (for example, and without limitation, air, marine, and submarine) and operational timing (for example and without limitation, active, wait at location, and remain on standby).

The furtherance of the state of the art described herein is based on advantageous employment of the multi-mode capabilities of the multi-mode unmanned vehicle disclosed in U.S. patent application Ser. No. 13/470,866 by Hanson et al., which is incorporated in its entirety herein by reference. The mission planning and control system described herein applies at least in part to the transit routes of one or more unmanned vehicles, each of which may be capable of air glide, water surface (e.g. marine), and sub-surface (e.g., submarine) modes of operation. For example, and without limitation, a single unmanned vehicle may transit across multiple modes of operation within a single transit route, and the respective transit routes of multiple unmanned vehicles across air mode, water surface mode, and sub-surface mode may be coordinated by the mission planning and control system.

Mission planning and control, as used herein, involves addressing the problem of accomplishing missions by efficiently and effectively employing some number of unmanned vehicles, each capable of multi-mode operation, and all coordinated in their actions both temporally and geographically. A significant portion of mission planning and control involves coordination across large time spans and diverse global locations. For example, and without limitation, such coordination may involve off-board command and control systems that may communicate and may integrate with unmanned vehicle on-board systems. Also for example, and without limitation, unmanned vehicles may coordinate with each other, often in sub-groups, as well as coordinate with other assets.

Figure 2:
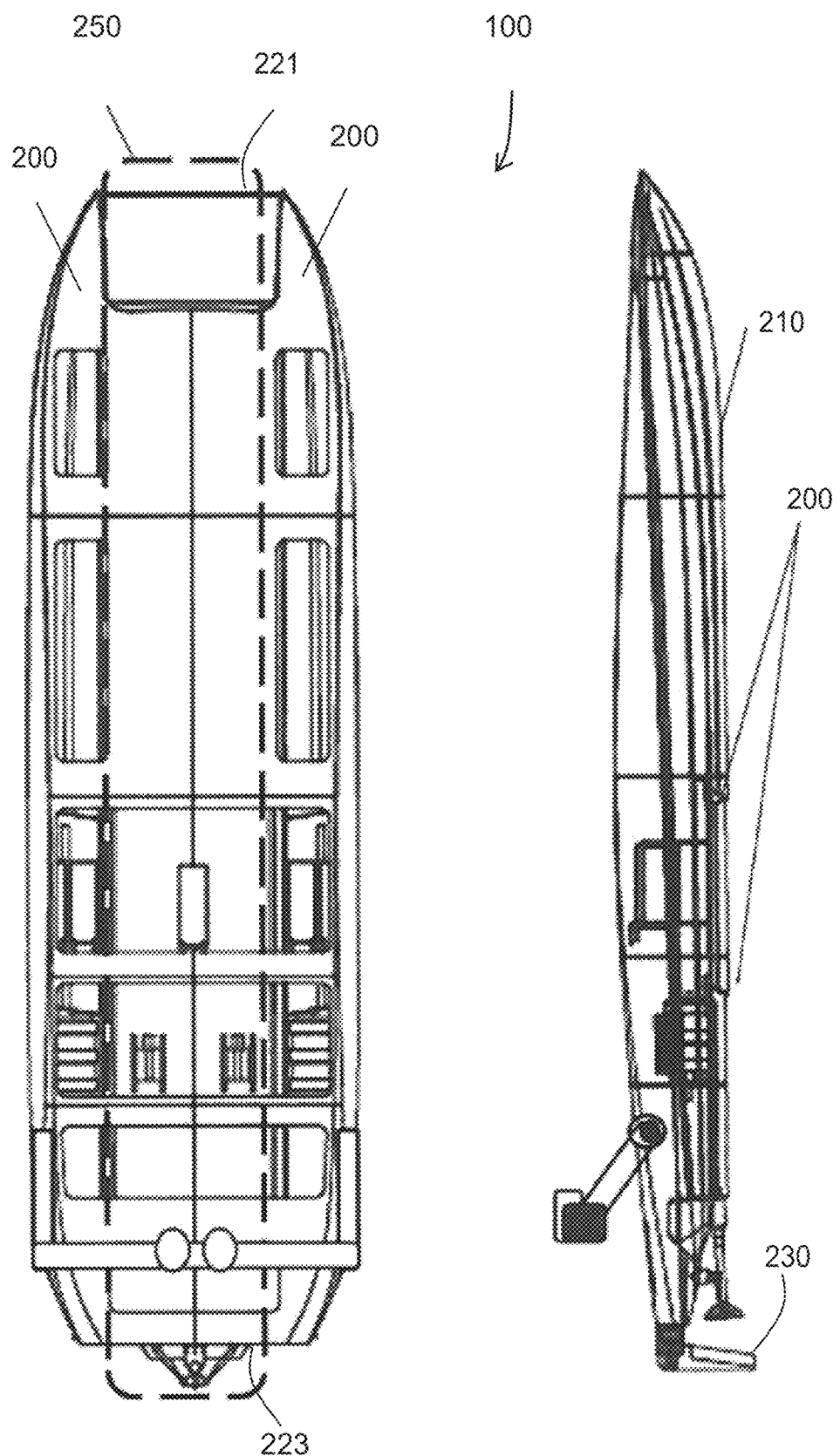
FIG. 2 is a top plan view and a side elevation view of an unmanned vehicle according to an embodiment of the present invention.
Figures 2A, 3:
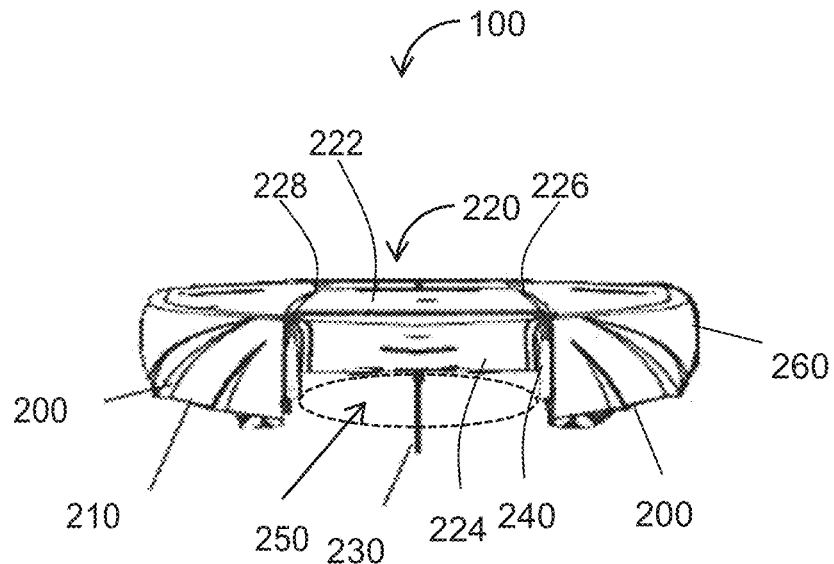
FIG. 2A is a front elevation view of an unmanned vehicle according to an embodiment of the present invention.
FIG. 3 is a table illustrating air glide parameters of an unmanned vehicle according to an embodiment of the present invention compared to air glide parameters to two exemplary aircraft known in the art.

Referring now to FIGS. 1, 2, and 2A, an unmanned vehicle 100 capable of operating in the air, on the surface of the water, and underwater according to an embodiment of the present invention will now be discussed. Throughout this disclosure, the unmanned vehicle 100 may also be referred to as a vehicle, an autonomous vehicle, a vessel, or the invention. Alternate references of the unmanned vehicle 100 in this disclosure are not meant to be limiting in any way.

The unmanned vehicle 100 according to an embodiment of the present invention may include a vehicle body 105 which may be configured as an aerohydrodynamic wing, which will now be described in greater detail. The vehicle body 105 according to an embodiment of the present invention may exhibit the shape characteristics of a catamaran including two opposing and substantially-parallel sponsons 200 each having a stepped hull 210. The stepped hull design may advantageously increase the efficiency of the unmanned vehicle 100 by providing lower drag and increased stability at speed. The stepped hull 210 may also enhance maneuverability of the unmanned vehicle 100. Referring now additionally to FIG. 2A, the catamaran-style stepped hull 210 additionally may have shape characteristics that provide aerodynamic stability and control in the form of a central tunnel portion 250 and a central wing-shaped portion 220 of the vehicle body 105. The wing 220 may be characterized by a leading edge 221, a trailing edge 223, a port edge 226, a starboard edge 228, an upper surface 222, and a lower surface 224. The two sponsons 200 may be coupled to the port 226 and starboard 228 edges of the wing 220, respectively. Each sponson 200 may be characterized by a proximal wall 240 positioned adjacent the centrally-positioned wing 220 and a distal wall 260 positioned opposite the proximal wall 240. The two proximal walls 240 of the sponsons 200 and the lower surface 224 of the wing 220 may define a tunnel 250 through which fluid (for example, and without limitation, water and/or air) may pass when the vehicle 100 is in motion relative to the fluid. The central wing-shaped portion 220 of the vehicle body 105 may have varying widths according to the mission-driven aerodynamic and hydrodynamic characteristics of the unmanned vehicle 100.

Continuing to refer to FIGS. 1, 2 and 2A, aerodynamics of the unmanned vehicle 100 are now discussed in more detail. More specifically, the unmanned vehicle body 105 may be shaped such that opposing lift forces may be balanced. For example, top of vehicle 222 lift may be caused by decreased air pressure resulting from increased air velocity, while opposing rear of vehicle lift may be caused by increased air pressure resulting from decreased air velocity. An increase in angle of attack may cause increased vertical lift on the lower surface 224 of the wing defining the tunnel 250, which may result in an upward force forward of the centerline. An increased angle of attack may also cause air flow to slow and pressure to increase under the tunnel 250, which may result in increased lift with a force vector aft of the centerline. The top and rear lift vectors may result in a balanced lift rather than rotational forces, so that the vehicle body 105 may move in a controlled fashion along its central axis. The constrained air tunnel 250 with canards and trim tabs (described below) at the points where air enters (e.g., leading edge 221) and exits (e.g., trailing edge 223) may enable good control of air flow about the vehicle 100 and resulting lift FIG. 3 summarizes wind tunnel test results 300 for an unmanned vehicle 100 characterized by the aerohydrodynamic wing design disclosed above. As illustrated in FIG. 3, the unmanned vehicle body 105 may achieve a lift to drag (L/D) ratio 320 of 4.6 to 5.0 depending on angle of attack, tunnel 250 width, and sponson 200 depth. Test conditions predicted a minimum air speed 350 before stall of 65 knots for the unmanned vehicle 100 at a maximum angle of attack, and good horizontal glide control at 135 knots (horizontal landing speed 340). Sample field results included stable laminar air flow at 225 knots and balanced forces (L/Weight, D/Thrust) at 165 knots. Demonstration of an 80 foot drop of the unmanned vehicle 100 resulted in a measured maximum air speed of 55 knots and an angle of attack of 25 degrees.

Continuing to refer to FIG. 3, the aerodynamic characteristics of the unmanned vehicle 100 are now discussed in more detail by comparison to a NASA orbiter (e.g. Space Shuttle) 310. In one exemplary embodiment, the present invention may exhibit the following dimensions:

Weight: 86 pounds
Length: 95 inches (7.92 feet)
Tunnel (wing) length: 90 inches (7.5 feet)
Tunnel (wing) width: 11 inches
Height: 12.5 inches
Total area under tunnel=6.88 square feet
Weight per wing area=12.5 pounds per square foot For purposes of comparison 310, a representative implementation of the NASA orbiter is known to exhibit the following dimensions:

Weight: 172,000 pounds
Length: 122 feet
Wing span: 78 feet
Height: 59 feet
Wing area=5380 square feet
Weight per wing area=32 pounds per square foot As shown in FIG. 3, the present invention comparatively may have a slightly better L/D ratio on approach than the Space Shuttle Orbiter or, also for example, than the Concorde Supersonic Transport (SST). Moreover, the wing surface area to weight ratio 330 on the unmanned vehicle disclosed herein is more than twice as good in terms of wing loading as the ratio achieved by either the Concorde SST or the Space Shuttle Orbiter.

Those skilled in the art will recognize that the aerodynamic characteristics of the unmanned vehicle 100 operated in air mode will differ from the hydrodynamic characteristics of the same unmanned vehicle 100 operated in submarine mode. For example, and without limitation, underwater glide dynamics may differ from air glide dynamics in that water is an incompressible fluid and, therefore, lift/drag characteristics may be different when the unmanned vehicle 100 moves through water. In this regard, glide characteristics underwater may be dominated by drag characteristics as balanced across the surface area of the vehicle body 105, the glide ratio, and the efficiency of changing from positive to negative buoyancy. For example, and without limitation, the unmanned vehicle 100 may be configured for sub-surface operation that may include underwater glide that employs ballast-only motivation, powered thrust, or power-augmented (e.g., ballast and powered thrust).

Those skilled in the art will appreciate that the hull 210 of the unmanned vehicle 100 does not necessarily have to be a stepped hull but, instead, can have any other shape. More specifically, it is contemplated that the hull 210 of the unmanned vehicle 100 may be smooth, for example, or may have any other shape while still achieving the goals, features and objectives according to the various embodiments of the present invention.

Referring now back to FIG. 1, the vehicle body 105 of the unmanned vehicle 100 may carry a plurality of compartments to house propulsion and power components 110, electrical and control components 120, center of gravity adjustment actuators 130, ballast components 140, and internally stowed payloads 150. These compartments may be sealed from each other by partitions 160 integrated into the vehicle body 105 with sealed electrical and mechanical interconnections 170. All vehicle compartments are preferably sealed from the external environment by hatches 180 with pressure seals 190 designed for both submarine and atmospheric environments. The plurality of sealed compartments can be pressurized to advantageously allow for deeper submerged (e.g., submarine) operation, and may be designed to maintain sealed integrity to a submerged depth in excess of one hundred (100) feet. Those skilled in the art will appreciate that each of the above-mentioned components do not necessarily need to be positioned in separate compartments. The unmanned vehicle 100 according to an embodiment of the present invention does contemplate that the various components may be organized in combined compartments, in one single compartment, in a combination of compartments, or in any other configuration. For example, and without limitation, the plurality of sealed compartments may define an on-board environment inside one or more of the sealed compartments, and an external environment outside one or more of the sealed compartments.

The present invention may include a sensor system to collect both vehicle 100 functional systems data and also external environmental data. The sensor system may comprise a variable set of sensors of many kinds that collect a wide variety of data from disparate sources, an electronic communication network over which the sensors may send data, and a data processing and routing system for collected sensor data. In one embodiment of the present invention, data representing the condition of components in the on-board environment may be collected by functional sensors such as the following: Global Position System (GPS), electronic compass, accelerometers, roll, pitch, yaw orientation, depth, pressure, temperature, voltage, drive train revolutions per minute (RPM), vibration at multiple locations, vehicle humidity, fuel level, and charge level. External environmental data may be collected by sensors that may include a video camera with computer-controlled articulation, zoom and night vision; electro-optical/infrared imaging and an audio sensor. Optional sensors may include, but are not limited to, radar, sonar, chemical and radiation sensors. External sensors may be mounted on a retractable device rack, as described below. Sensor signals may be connected to a signal multiplexing unit that may provide signal conditioning and routing, and the multiplexing component may be connected to a sensor data processing subsystem that includes a computer software component that may be located in the vehicle's 100 central computer. The sensor system also may include a sensor data storage system comprised of digital storage components that may allow for real time data collection and for latent data processing. The system may categorize stored data by a number of attributes that may include time of capture, device, and data type.

Still referring to FIGS. 1, 2, and 2A, the vehicle body 105 may scale proportionally in three dimensions. The vehicle body 105 according to an embodiment of the present invention may advantageously have a length scaling from about 2 feet to 70 feet, a beam from about 10 inches to 15 feet, and a depth of about 4 inches to 5 feet. The vehicle body 105 according to an embodiment of the present invention can advantageously range in weight from about 5 pounds to 15,000 pounds. Alternate references of the vehicle body 105 in this disclosure are not meant to be limiting in any way. More particularly, any reference to dimensions above is meant for exemplary purposes, and not meant to be limiting in any way.

The vehicle body 105 may be constructed of various materials, including fiberglass, carbon fiber, or aramid fiber, depending on the relative importance of prevailing design factors. For example, and without limitation, if lowering construction costs of the unmanned vehicle 100 is an important design factor, the choice of fiberglass as the material for the vehicle body 105 may reduce the total cost to manufacture the unmanned vehicle 100. In another example and without limitation, if an important design factor is enhancing strength to weight characteristics in the vehicle body 105 for the unmanned vehicle 100 to withstand ambient air pressures during aerodynamic flight or glide as well as to withstand ambient water pressures when submerged in water to hundreds of feet, the choice of aramid fiber as the construction material for the vehicle body 105 may be desirable. Those skilled in the art will appreciate, however, that the unmanned vehicle 100 according to an embodiment of the present invention may be constructed of any material, and that the materials mentioned above are exemplary in nature, and not meant to be limiting. According to an embodiment of the present invention, a vehicle body 105 constructed of disclosed materials less than 0.125 inches thick may exhibit a high tensile strength to counter the pressures at hundreds of feet under water as well as to support a controllable low pressure differential across the exterior of the vehicle body 105 during atmospheric flight.

Figure 4:
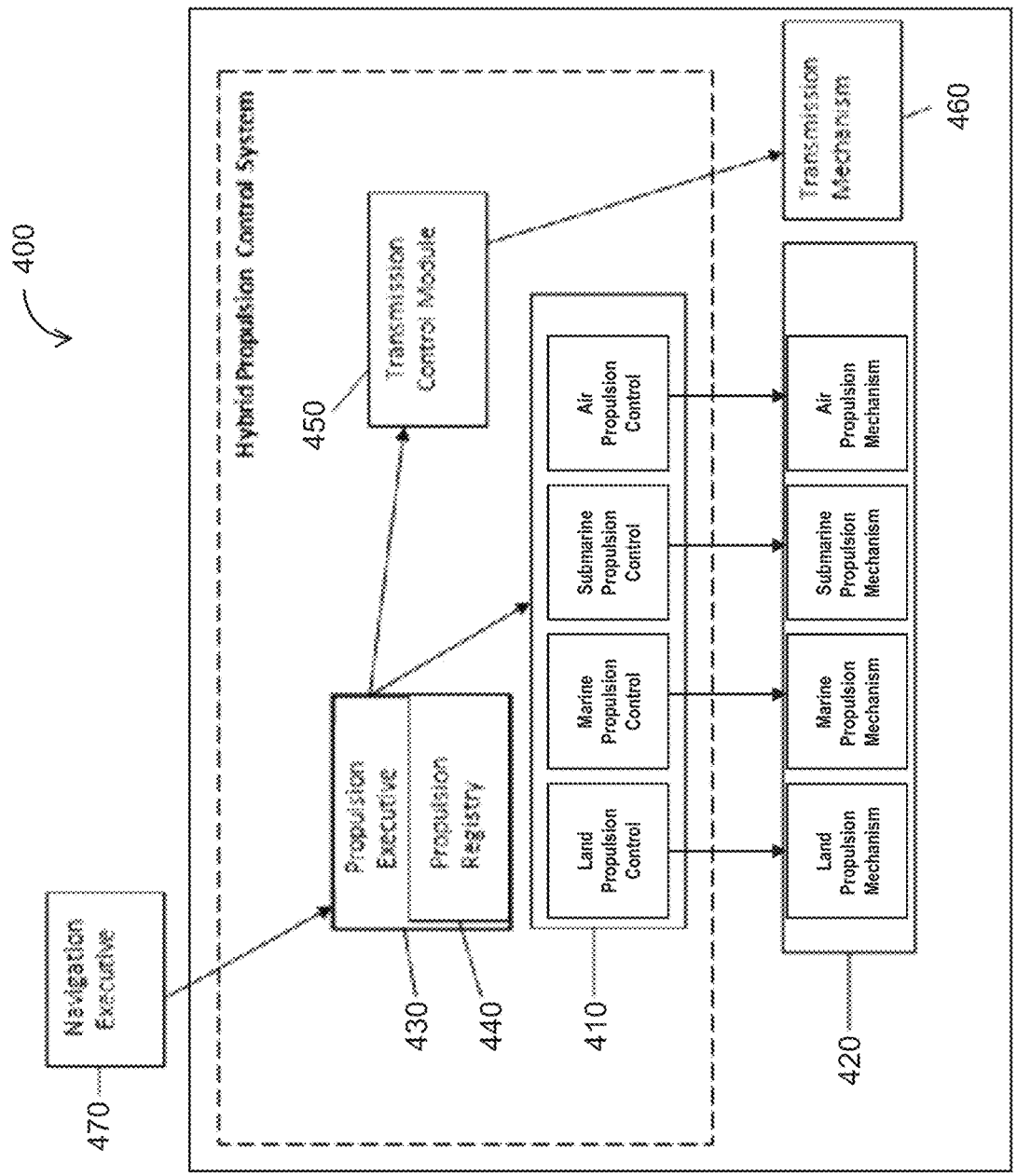
FIG. 4 is a schematic overview of a propulsion control system of an unmanned vehicle according to an embodiment of the present invention.

Referring now to FIG. 4, a propulsion system 400 of the unmanned vehicle 100 according to an embodiment of the present invention will now be discussed. The propulsion system 400 may include a combination of propulsion control modules 410 and propulsion mechanisms 420 that may, either autonomously or in response to remote controls, propel the unmanned vehicle 100 in the air, on the surface of the water, and underwater. The propulsion mechanisms 420 may employ vectored thrust mechanisms that may, for example and without limitation, include turbines and propellers.

Still referring to FIG. 4, the propulsion system 400 may include a propulsion executive 430, a propulsion registry 440, and a transmission control module 450. The propulsion executive 430 may accept instructions for speed and propulsion type from the navigation executive 470, and may send control signals to direct the desired propulsion mechanisms 420 to engage using the transmission mechanism 460. The instructions to the propulsion executive 430 from the navigation executive 470 may be in the form of relative changes to speed, including the ability to reverse direction, as well as to the mode of propulsion. Several different types of propulsion systems are contemplated for use in connection with the unmanned vehicle 100 according to embodiments of the present invention. Details regarding the several different types of propulsion systems are provided below.

Figure 5:
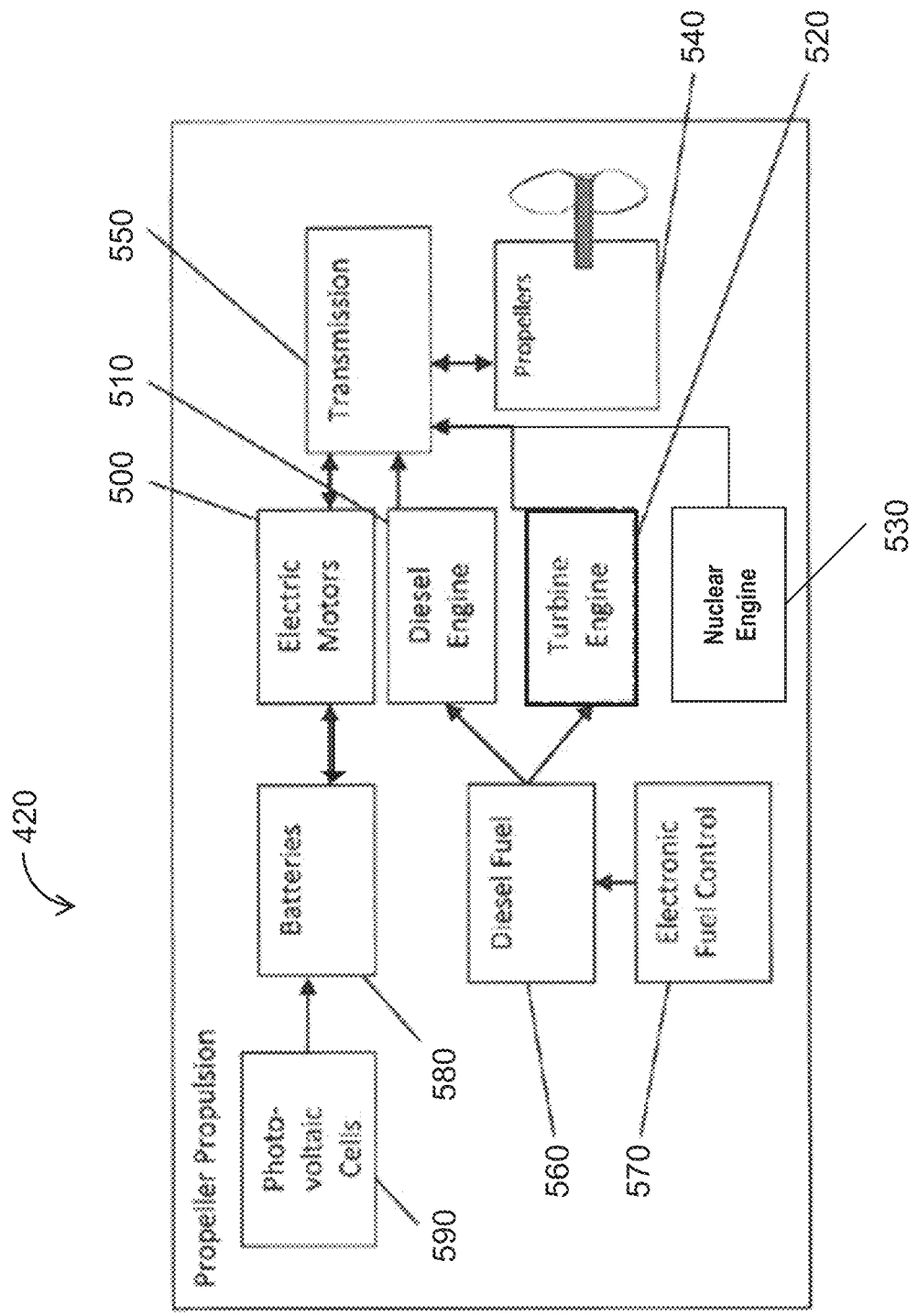
FIG. 5 is a schematic overview of a propulsion system of an unmanned vehicle according to an embodiment of the present invention suitable for marine and submarine use.

Referring now to FIG. 5, an example propulsion mechanism 420 of the unmanned vehicle 100 according to an embodiment of the present invention is discussed in greater detail. Power supplies for all modes of use of the unmanned vehicle 100 may, for example and without limitation, include a variety of motors such as electric 500, diesel 510, turbine 520, and nuclear 530. Embodiments of the unmanned vehicle 100 according to the present invention may include all or some subset of the hybrid power sources disclosed.

Still referring to FIG. 5, in some embodiments of the present invention the unmanned vehicle 100 operating in marine and submarine modes may use a plurality of propellers 540 or water jets as vectored thrust. Power may be supplied to propellers 540 by electric motors 500 or by diesel 510, turbine 520, or nuclear 530 engines through a computer-controlled transmission 550. A turbine engine 520 may be substituted for the diesel engine 510. The diesel 510 and turbine 520 engines may be fueled by, for example and without limitation, common diesel fuel 560, kerosene, and jet-x. The propulsion control system may include an electronic fuel control 570 to regulate the fuel supplied to the diesel 510 and turbine 520 engines.

Still referring to FIG. 5, the unmanned vehicle 100 according to embodiments of the present invention may make use of energy captured in storage cells such as batteries 580. Such storage cells, for example and without limitation, may include high power density lithium polymer batteries or lithium ion batteries. The storage cells may receive energy from the electric motors 500 running as generators when the unmanned vehicle 100 is under power from another source such as diesel 510, turbine 520, or nuclear 530 engines. In another embodiment, the storage cells may receive energy from photovoltaic cells 590 that may be mounted to the vehicle body 105 in a variety of mechanical configurations. Such mounting configurations, for example and without limitation, may include axial hinges with actuators to articulate the photovoltaic cells 590 outwardly from the vehicle body 105. In one embodiment, the photovoltaic cells 590 may be wired to a computer-controlled power control and regulator module. A computer-controlled switch in the power control module may route power from the photovoltaic cells 590 to sets of batteries 580 for recharge depending on the relative charge state of the batteries 580. The regulator module may monitor and adjust the charge to the batteries 580 used in the first unmanned vehicle 100 embodiment. For example, and without limitation, another embodiment of battery 580 recharge may utilize wave motion to accomplish a low level recharge by mounting a faraday tube along the fore-to-aft axis of the vehicle body 105. The faraday tube may be electrically connected to power lines in communication with batteries 580 through a regulator.

Figure 6:
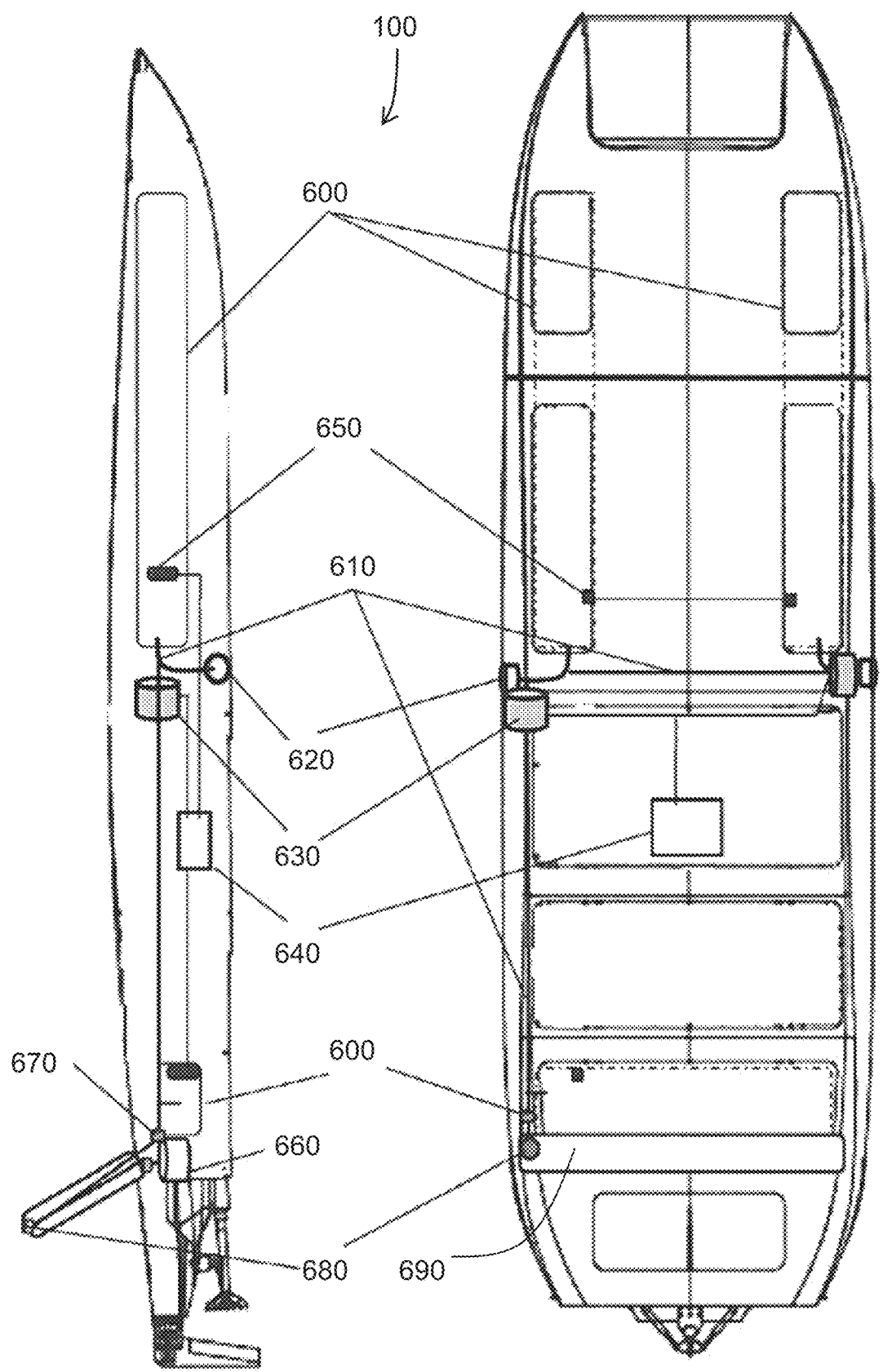
FIG. 6 is a side elevation view and a bottom plan view of a ballast system of an unmanned vehicle according to an embodiment of the present invention.

Referring now to FIG. 6, the ballast system of the unmanned vehicle 100 according to an embodiment of the present invention will be discussed. The ballast system, for example and without limitation, may contain mechanisms to control the volume of water and air in one or more ballast chambers 600 to advantageously vary the buoyancy of the unmanned vehicle 100 while submerged and to support selective submerging and re-surfacing of the unmanned vehicle 100. The ballast system may also be known as the buoyancy system because the system may provide for the selective submerging and re-surfacing of the unmanned vehicle 100 by varying buoyancy. The ballast control mechanism may comprise piping 610 and ports 620 to enable the flow of water into and out of ballast chambers 600. Electric water pumps 630 may be activated by the ballast control system 640 to control ballast levels which may be monitored by ballast sensors 650. A pressure tank 660 may be vented into the ballast chamber 600 and the air flow between the pressure tank 660 and the ballast chamber 600 may be regulated by locking electronic valves 670 that may be controlled by the ballast control system 64. The pressure tank 660 may enable fast evacuation of the ballast chamber 600 and also evacuation of the ballast chamber 600 when other means are not available rapidly.

Ballast ports 680 may be located on the bottom surface of the vehicle body 105 which may enable water to be fed into the ballast tanks 600 when the unmanned vehicle 100 is in motion, which may enable fast submersion. A ballast port 680 located on a device rack 690 positioned on the top of the vehicle body 105 may enable water to be routed into the ballast chambers 600 when the unmanned vehicle 100 is in a top-down position in the water. Filling the ballast chambers 600 while top-down may advantageously enable the unmanned vehicle 100 to autonomously self-right, both at or below the surface of the water. In another embodiment, for example and without limitation, a ballast port 680 located on a device rack 690 may allow routing of air or water to the ballast chambers 600 and, in so doing, may allow the unmanned vehicle 100 to operate underwater without fully surfacing, which may be advantageous for stealth objectives.

Figure 7:
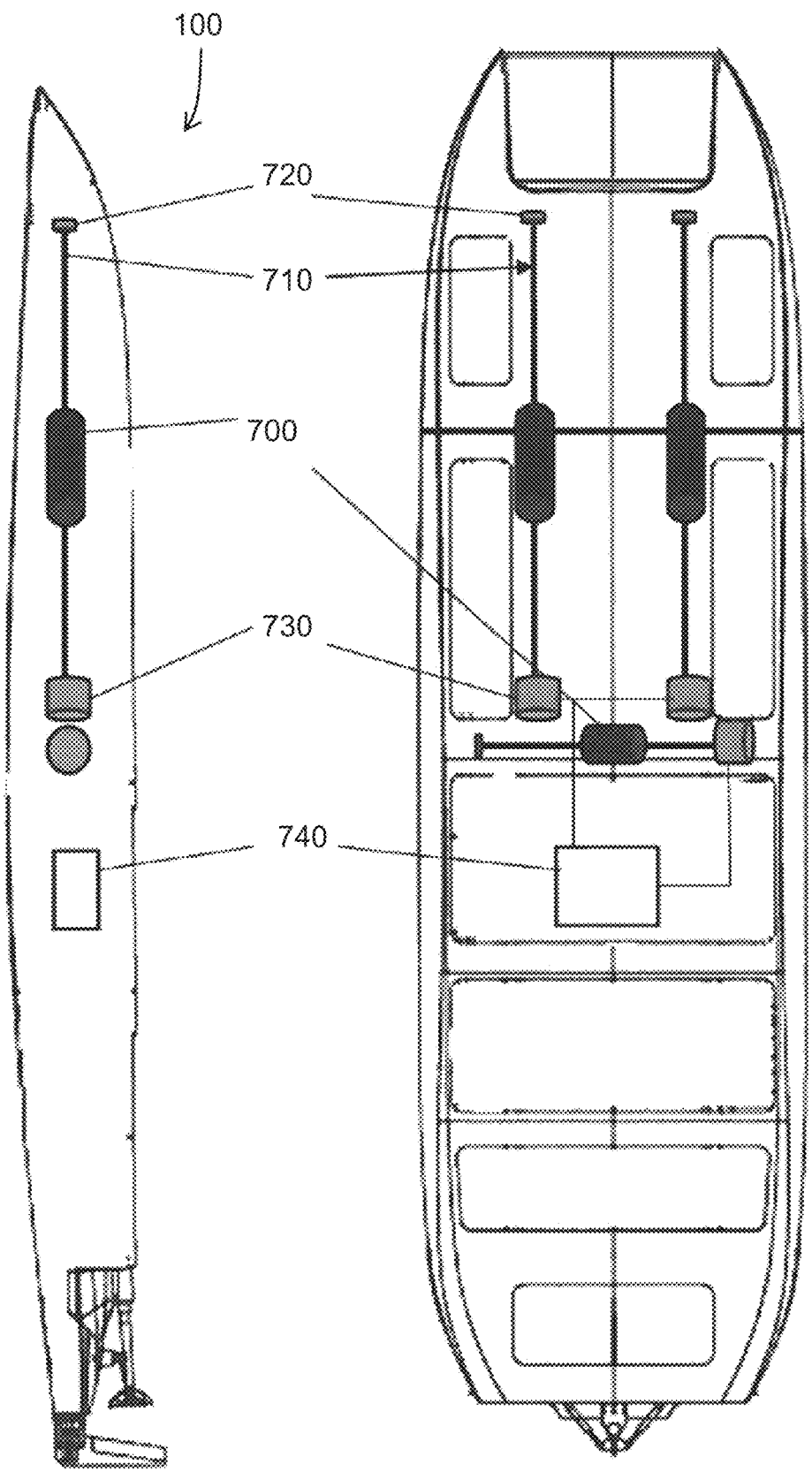
FIG. 7 is a side elevation view and a top plan view of an adjustable center of gravity system of an unmanned vehicle according to an embodiment of the present invention.

Referring now to FIG. 7, the center of gravity system of the unmanned vehicle 100 according to an embodiment of the present invention will be discussed. The center of gravity system, for example and without limitation, may include mechanisms to control the center of gravity of the unmanned vehicle 100 along the two perpendicular axes for roll and pitch. The center of gravity control system may include internally threaded weights 700 which may encase threaded actuator rods 710 that may be fixed to rotational bearings 720 on one end and electric motor actuators 730 on the other. The electric motor actuators 730 may be controlled by the center of gravity control system 740 that supplies power and signal to the electric motors. Sensors on the linear actuators provide feedback to the center of gravity control system 740 as to position and speed of motion of the controlled, internally threaded weights 700.

Figure 8:
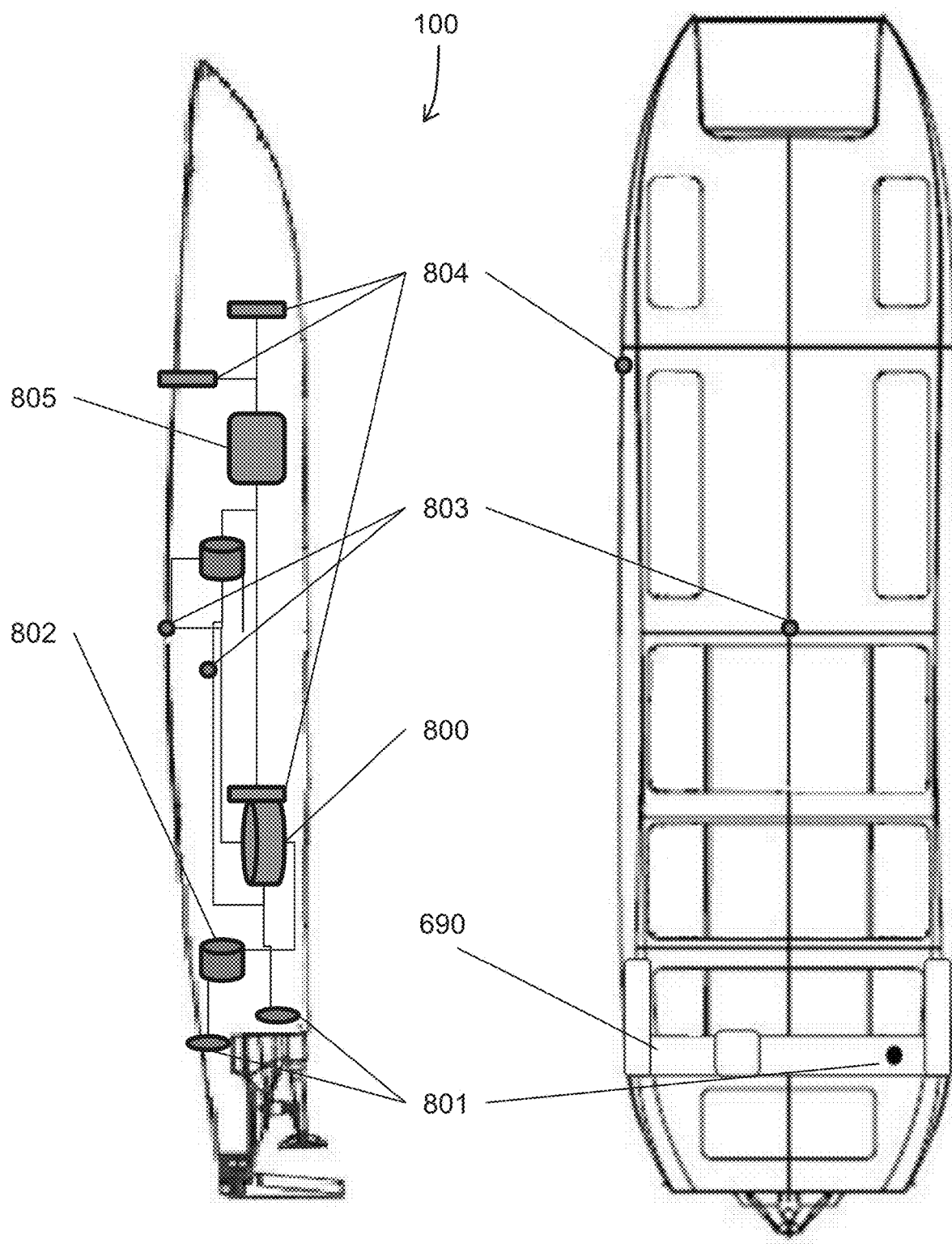
FIG. 8 is a side elevation view and a top plan view of a pressurization system of an unmanned vehicle according to an embodiment of the present invention.

Referring now to FIG. 8, the pressurization system of the unmanned vehicle 100 according to an embodiment of the present invention will be discussed. The pressurization system, for example and without limitation, may contain a pressure tank 800 that may be able to hold gaseous material, such as air, at a minimum gas pressure of 500 PSI with a sealed hull of an unmanned vehicle 100 to advantageously enable vehicle body 105 strength-to-weight characteristics during selective operation of the unmanned vehicle in the air, on the surface of the water, and below the surface of the water. In one embodiment, the pressure tank 800 may be carried within a compartment inside the vehicle body 105. In another embodiment, the pressure tank 800 may be affixed to the inside of the sealed hull of the vehicle body 105 which itself defines a watertight chamber. Bidirectional seals in the sealed hull may be applied to any openings, vents, ports, and moving services carried by the vehicle body 105 to maintain a pressurizable space within the unmanned vehicle 100.

Still referring to FIG. 8 in a further embodiment, for example and without limitation, pressurized spaces within the vehicle body 105 may vent 801 via piping to the exterior of the vehicle body 105. In one embodiment, for example and without limitation, the piping lines may be vented to the vehicle body 105 exterior through the device rack 690. In a further embodiment, for example and without limitation, an electrically-actuated air pump 802 capable of transferring air into the pressure tank 800 may be connected to an air port via piping line that may employ locking electronic valves 803 to regulate the intake of air through an air port and into the pressure tank 800.

Still referring to FIG. 8 in a further embodiment, a locking electronic valve 803 that is in the "normally closed" position may be connected to a piping line that may connect to the pressure tank 800 and may vent 801 inside the vehicle body 105. In a further embodiment, for example and without limitation, a locking electronic valve 803 that is in the "normally closed" position may be connected to a piping line that may vent 801 air from inside the vehicle body 105 to the vehicle body 105 exterior. All internal compartments in the unmanned vehicle 100 may be connected via piping lines to both external vents 801 or to internal vents between compartments.

Continuing to refer to FIG. 8, pressure sensors 804 may be affixed inside the vehicle body 105 and external to the hull of the vehicle body 105, and may send internal and ambient pressure information to the pressurization control system 805. The pressure control system 805 may be a set of software programs running on a set of microprocessors that may have control algorithms that may receive inputs from the sensors 804 previously mentioned, may calculate the differential pressure, and may produce outputs to the pressure valve 803 actuator and the air pump 802. The navigation control system (described in more detail below) may contain logic that may determine the optimal pressure differential set point and may send this information in the form of digital instructions across a computer network to the pressurization control system 805. The pressure control logic may send control signals to actuator controllers that operate the air pump 802 and relief valve 803.

To increase the internal pressure in a pressurized compartment inside the vehicle body 105, the pressure relief valve 803 from the pressure tank 800 may be opened. To decrease the internal pressure in a pressurized compartment inside the vehicle body 105, the pressure relief valve 803 between the compartment inside the vehicle body 105 and the environment external to the vehicle body 105 may be opened. In both cases, a control algorithm in the pressurization control system 805 may determine the frequency and duration of opening and closing the pressure valves 803.

A pressure sensor 804 may monitor the pressure tank 800 and may send this signal periodically to the pressure control system 805. When the pressure in the pressure tank 800 may fall below a given level, as may be configured in the pressure control system 805 logic, the pressure control system 805 may issue a request to pressurize to the navigation system which, in turn, may issue a request to pressurize to the off-board mission control and on-board control system master. These systems may have logic and configurations that may determine when pressurization may be authorized. When pressurization is authorized, instructions are sent to the pressurization system to pressurize.

Figure 9:
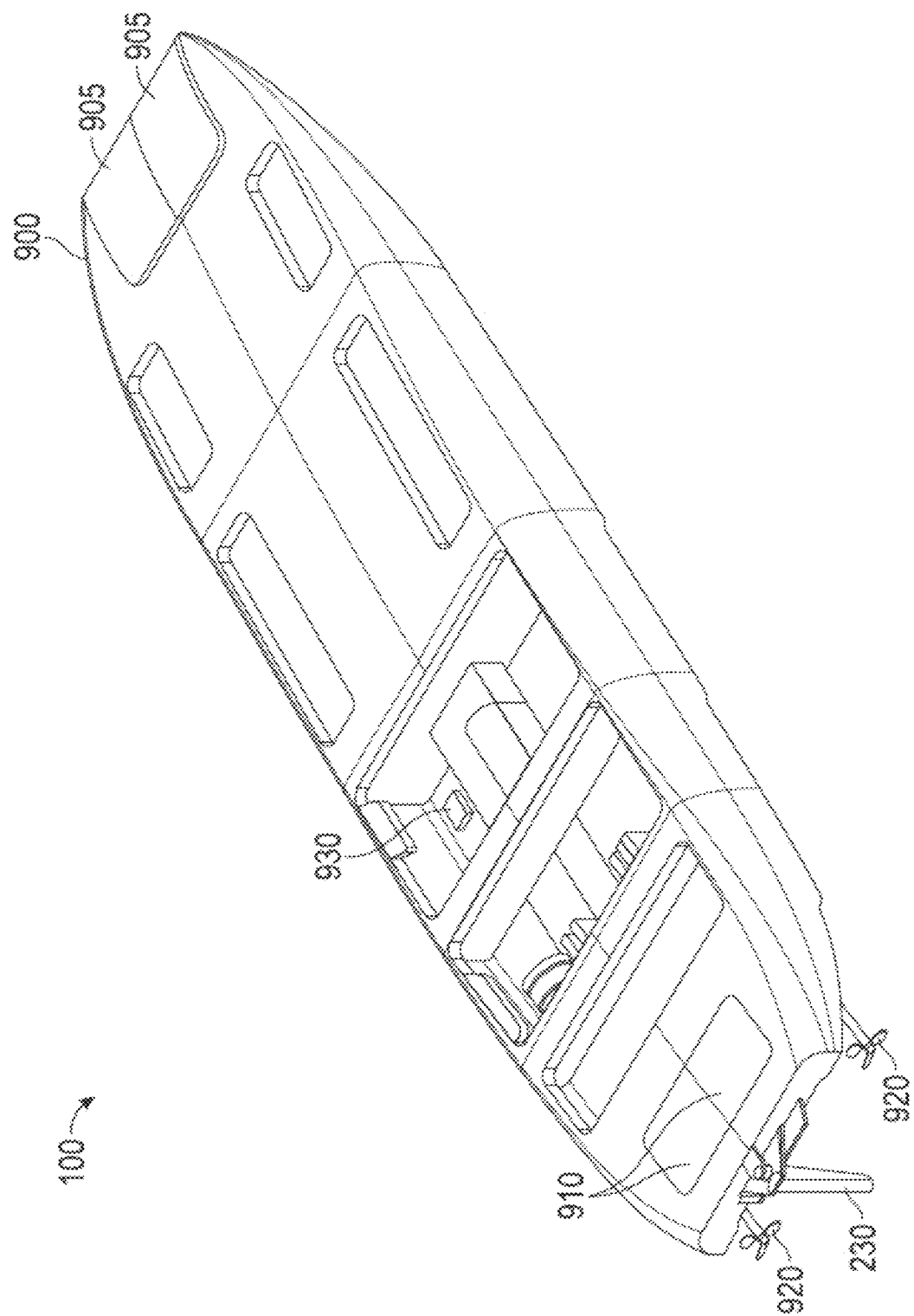
FIG. 9 is a solid model perspective view of control surfaces of an unmanned vehicle according to an embodiment of the present invention.
Figure 10:
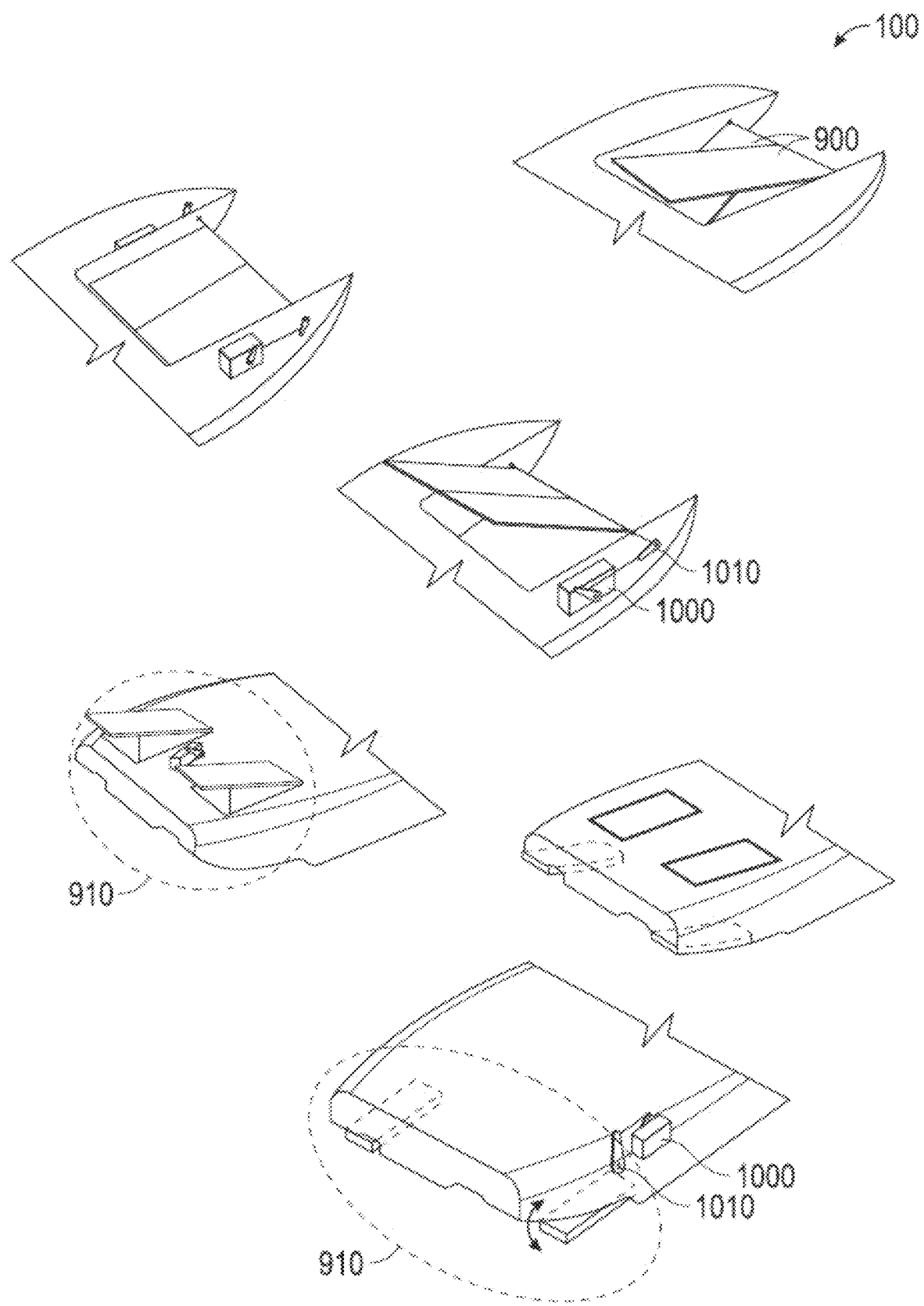
FIG. 10 is a plurality of partial perspective views of control surfaces of an unmanned vehicle according to an embodiment of the present invention.

Referring now to FIGS. 9 and 10, the control surfaces 900 of the unmanned vehicle 100 according to an embodiment of the present invention will be discussed. In one embodiment of the present invention, control surfaces 900 may be affixed to the vehicle body 105 to advantageously support physical maneuvering of the unmanned vehicle 100 in the air, on the surface of the water, and below the surface of the water. The control surfaces 900, for example and without limitation, may be comprised of forward canards 905, rear trim plates 910, and rudders 230, all of which may be affixed externally to the vehicle body 105. In one embodiment, for example and without limitation, a rudder 230 may be mounted on a strut that may be positioned substantially near the stern of the vehicle body 105. The unmanned vehicle 100 may also include propeller thrusts 920 which may be vectored.

Still referring to FIGS. 9 and 10, electronic position sensors 1010 may be attached to each control surface 900 and position signals may be relayed to the control surface control system 930, which may apply control logic to determine desired control surface 900 adjustments. In one embodiment, each of the control surfaces 900 may be independently articulated by electric motor actuators 1000 in response to control signals received by that control surface 900 from the control surface control system 930. For example and without limitation, the front canards 905 may articulate independently in two directions for a maximum roll condition, and the rear trim tabs 910 may also articulate bi-directionally.

Figure 11:
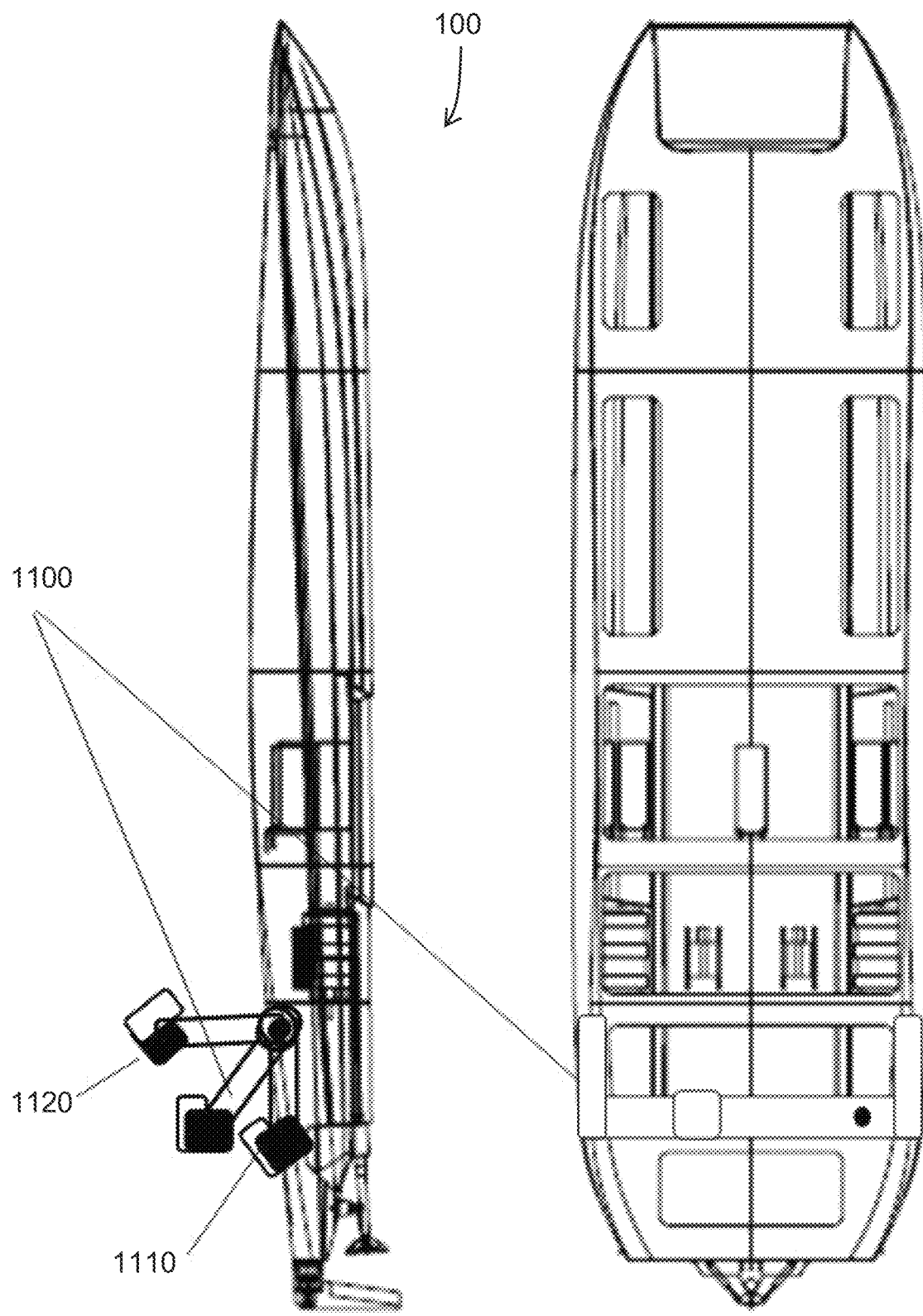
FIG. 11 is a side elevation view and a top plan view of a retractable device rack of an unmanned vehicle according to an embodiment of the present invention.
Figure 12:
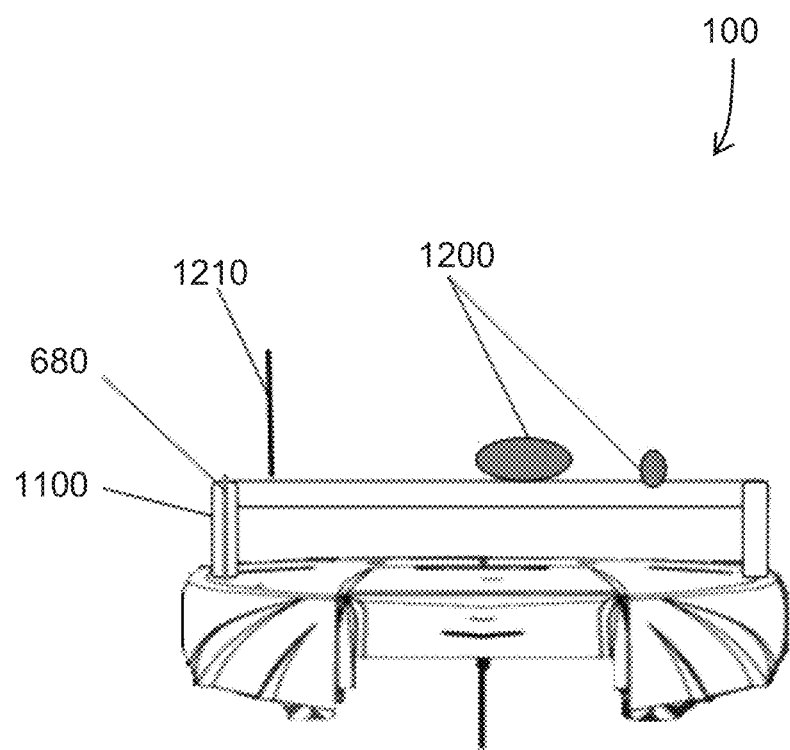
FIG. 12 is a front elevation view representing a retractable device rack of an unmanned vehicle according to an embodiment of the present invention showing the retractable device rack in an extended position.

Referring now to FIGS. 11 and 12, the device rack of the unmanned vehicle 100 according to an embodiment of the present invention will be discussed. The device rack, for example and without limitation, may include a retractable mount 1100 that may articulate from the vehicle body 105 and that may hold sensors 1200, communication antennae 1210, and a ballast port 680. In one embodiment, for example and without limitation, mounting points including mechanical, power and signal mounts may be provided at the device rack for sensors 1200 and communication antennae 1210. In another embodiment, ballast ports 680 may be located on either side of the retractable mount 1100, to which electric wiring and ballast piping may be routed from inside the vehicle body 105 through pressure sealed bulkheads. The device rack may be constructed of various materials including, for example and without limitation, aramid fiber as an outer cover which may be disposed over an aluminum tube frame.

Still referring to FIG. 11, in one embodiment, for example and without limitation, the device rack may be actuated by electric motors under computer control such that the device rack can be retracted into a "down position" 1110 which may present the least drag and visibility of the unmanned vehicle 100. In another embodiment, for example and without limitation, the device rack may be actuated by electric motors under computer control such that it can be extruded into a full "up position" 1120 which may present better surveillance, communication, and ballast reach. In one embodiment, for example and without limitation, the retractable mount 1100 may be actuated in the form of a lever arm that may, to accomplish articulation and retraction, swing rotationally about a hinge that may be fixed at a mount point located substantially adjacent to the surface of the vehicle body 105. In another embodiment, for example and without limitation, the device rack may be actuated in the form of a telescoping member that may extrude and retract in a vector substantially perpendicular to the member's deployment point on the surface of the vehicle body 105. A person of skill in the art will immediately recognize that the operational value of the multi-mode vehicle 100 may be largely dependent on the payloads the vehicle 100 may carry and how effectively those payloads may be made usable to consumers. Common payloads include various sensors (e.g., cameras, sonar), communications units (e.g., radios) and electronic devices (e.g. electronic warfare). Such payloads come in many shapes, sizes, power requirements and interfaces, as well as environmental ruggedness characteristics. The unmanned vehicle 100 of the present invention may advantageously present a general purpose platform configured to integrate many different payloads. Consumers and/or payload providers may have a need to quickly integrate different sensors into an unmanned vehicle 100.

In certain embodiments of the present invention, the unmanned vehicle 100 may be configured to carry varying types and amounts of payload in one or more operational modes, including on the surface of water, underwater, and in the air. For example, and without limitation, the vehicle 100 may be configured to carry such payloads internal to the vehicle body (e.g., internally stowed payload 150 in FIG. 1, as described above). Also for example, and without limitation, the vehicle 100 may be configured to augment the basic hull structure and to receive a mountable payload deck to advantageously provide additional payload capacity, as described in more detail below.

Figure 13:
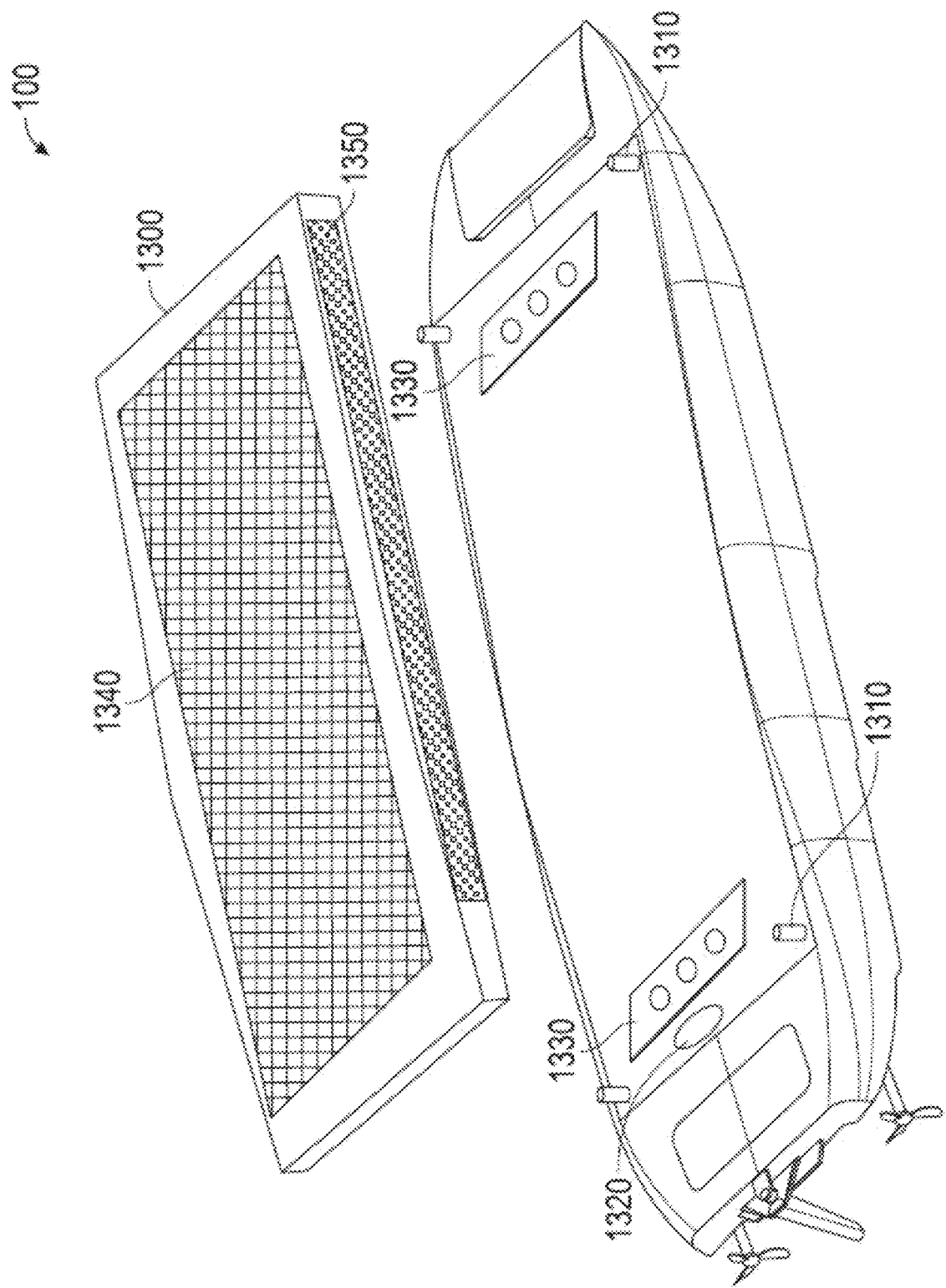
FIG. 13 is an exploded perspective view of an interchangeable payload deck of an unmanned vehicle according to an embodiment of the present invention including a solar panel payload module.

Referring now to FIG. 13, the payload deck of the unmanned vehicle 100 according to an embodiment of the present invention will be discussed. The payload deck, for example and without limitation, may provide mounting points for an interchanging payload deck 1300. In one embodiment, the mounting points may include mechanical mounting mechanisms 1310, power connections 1320, and signal connections 1330. Connections and mount points may be fully, hermetically sealed for underwater operation of the unmanned vehicle 100. The vehicle body 105 may be itself fully sealed and may operate without a payload deck. In one embodiment of the present invention, a payload deck may carry auxiliary solar panels 1340 for electrical recharge, and may contain flat form factor batteries 1350 that may provide auxiliary power which may advantageously extend the operational duration of the unmanned vehicle 100.

Although FIG. 13 demonstrates the unmanned vehicle 100 having the capability to interchange payload decks directly on the vehicle body 105, the unmanned vehicle 100 may also, for example, and without limitation, include a towing apparatus for towing external payloads. For example, and without limitation, towable payloads may include transport sleds for people, material, and fuel. Such a towing apparatus may support power and signal connections to the unmanned vehicle 100 to which the apparatus is engaged, permitting advantageous employment of auxiliary towable payloads such as, for example, and without limitation, solar sleds to extend running time and sensor arrays to hunt mines and/or submarines. A towable sled, like the unmanned vehicle 100 with which the sled may be deployed, may be configured to operate underwater or on the surface of water, which may be advantageous for missions conducted in dangerous or contested environments where stealth or cover (underwater) is important.

In one embodiment of the external payload towing feature, a Mobile Unmanned Target Practice System may be characterized by mission planning and control instructions advantageously operating some number of unmanned vehicles 100, each configured with a towing apparatus and a towing sled. Current manned methodologies for positioning, simulating, and assessing military targets limit deployment options and practice locations. The unmanned target practice system described herein may advantageously enable target practice to be done in an expanded range of conditions and locations, allowing for more "organic" target practice. For example, and without limitation, such a target practice system may comprise unmanned vehicles 100 equipped with control systems and mechanical configurations for towing and releasing targets as external payloads. Such towable targets each may be configured with retractable center keels for stability in a surface water environment. The towable targets may also feature retractable target flags. Alternatively, or in addition, towable targets may also be configured as radio-controlled target vessels. For example, and without limitation, an unmanned vehicle 100 may be configured as a "relay station" to remotely operate some number of radio-controlled target vessels.

Figure 14:
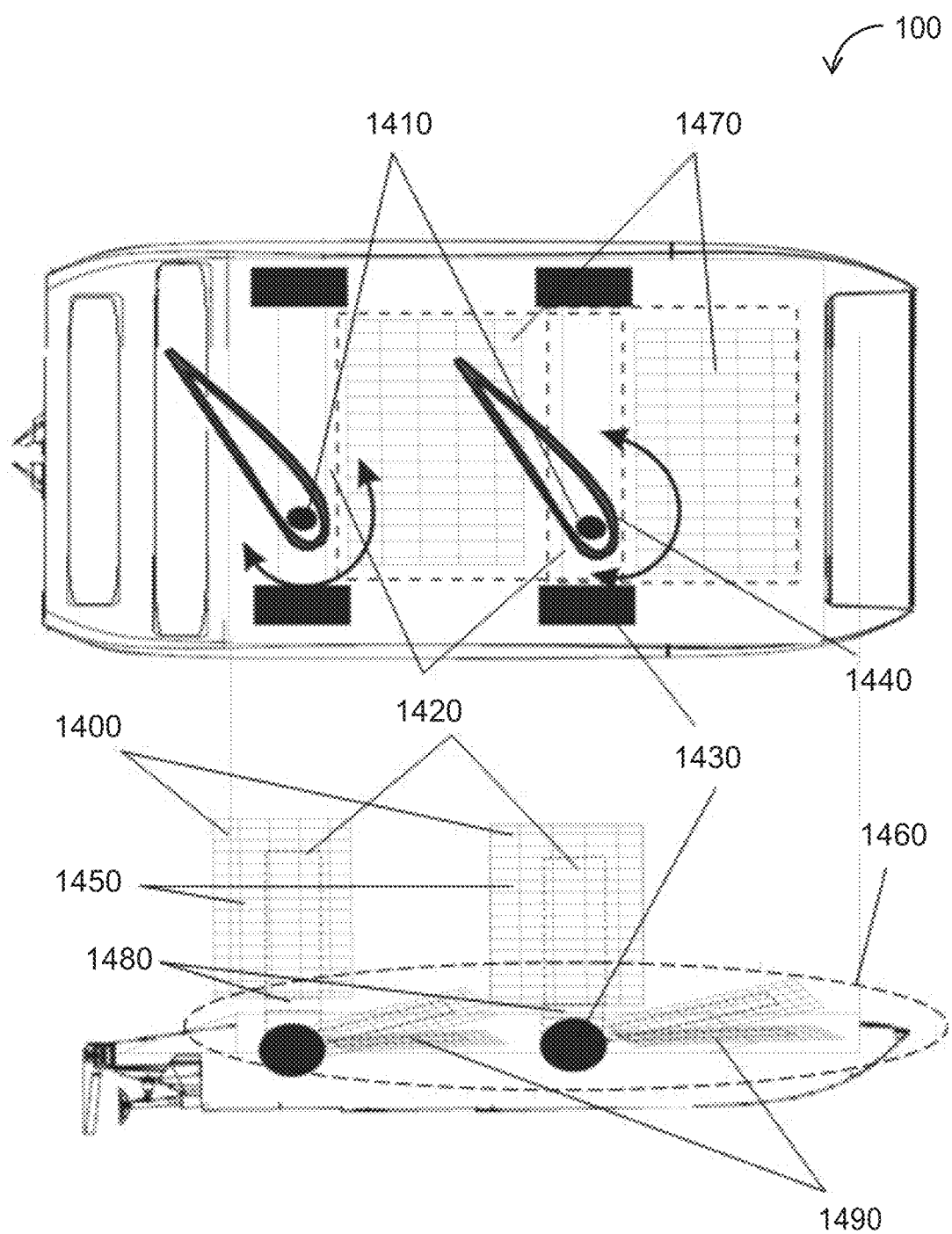
FIG. 14 is a top plan view and a side elevation view of an interchangeable payload deck of an unmanned vehicle according to an embodiment of the present invention including a wind sail payload module.

Referring now to FIG. 14, the payload deck, for example and without limitation, may provide mechanical, power, and signal connectivity for an additional form of propulsion that may be supplied by a retractable hard sail affixed to an interchangeable payload module. In one embodiment, for example and without limitation, two hard wing sails 1400 with central masts 1410 may be mounted on horizontal cylinders 1420 that may rotate and may be driven by electric motor actuators 1430. The hard wing sails 1400 may have an aerodynamic wing shape 1440 that may provide additional lift when the unmanned vehicle 100 sailing upwind on the surface of the water. The hard sails 1400 may be rotated around the axis of their mounting mast 1410, which may be accomplished by splitting the masts 1410, articulating the sections independently, and mounting electric motor actuators 1480 between mast sections 1410. The hard sails 1400 can be rotated in two axes and stowed in the payload bay in a horizontal position 1490. Position sensors may be mounted on the actuators between mast sections 1410 that may be connected to the navigation control system through a wiring connection that may run through bulkhead connectors between the payload deck and the vehicle body 105.

Still referring to FIG. 14, for example and without limitation, solar panels 1450 may be affixed to the outer surfaces of the hard sails 1400 which may provide solar recharge capability. The solar panels 1450 may be connected to the payload electrical system which may be connected to the vehicle electrical power system through a bulkhead connector between the payload deck 1460 and the vehicle body 105. Additional solar panels 1470 may be mounted in the bed of the payload deck for additional solar energy collection and also may be connected to the vehicle electrical power system. In other embodiments, the payload deck, may provide mechanical, power, and signal connectivity for payload modules that may provide auxiliary capabilities in the form of, for example and without limitation, wind energy collectors, video surveillance, and weapons systems.

As described above, the device rack and/or payload deck may provide mechanical, power, and signal connectivity for any number of interchangeable payload modules and/or auxiliary mounts. In this manner, the unmanned vehicle 100 may be outfitted with working appendages of various form and function. Such appendages may advantageously provide utility in multiple modes, as the appendages may be integrated with the body 105 of the unmanned vehicle 100 so that unmanned vehicle 100 may operate effectively in the air, on water, and underwater. Such appendages may be configured with specialized capabilities (e.g., magnetic, telescopic) or specialized tools, depending on the needs of a particular mission.

In one embodiment, for example and without limitation, the payload deck may support a single (e.g., "simple") arm and gripper, which may be positioned in a substantially-central payload bay (e.g., interior compartment) of the unmanned vehicle 100, which may be advantageous in terms of reach capability. In another embodiment, the payload deck may support a "bat wing" configuration, which may be defined as two appendages each characterized by a shoulder, some number of arms, and some number of grippers. For example, and without limitation, a bat wing appendage configuration may include two appendages attached, respectively, to each side of the unmanned vehicle 100, and each having a "shoulder" mechanism that may support motion with three degrees of freedom. Each appendage may also include arm sections having connecting "elbows," and each elbow may support motion with either two or three degrees of freedom. Each appendage may also include hand sections, each of which may have gripping/holding capability and may support motion with three degrees of freedom at a "wrist," Also for example, and without limitation, each appendage may comprise a flexible, thin film material positioned between the arm sections that form wings that may be made of (or, alternatively, coated with) thin-film solar. Advantages of "bat wing" design for use with a multi-mode unmanned vehicle 100 is that the design may provide efficient retraction and storage for surface efficiency, increased wing surface for air or sub-surface gliding, solar energy harvesting either in water surface mode or slightly sub-surface, and wind propulsion in water surface mode.

A person of skill in the art will immediately recognize that employing the unmanned vehicle 100 to carry heavy payloads, as in the examples illustrated in FIGS. 13 and 14 and subsequently described above, the vehicle 100 may be expected to experience increased displacement in the water. To counteract the negative impact on performance that increased displacement may cause, the hull design shown and described above for FIGS. 1-3 may be advantageously altered to include an additional sponson.

Figure 24:
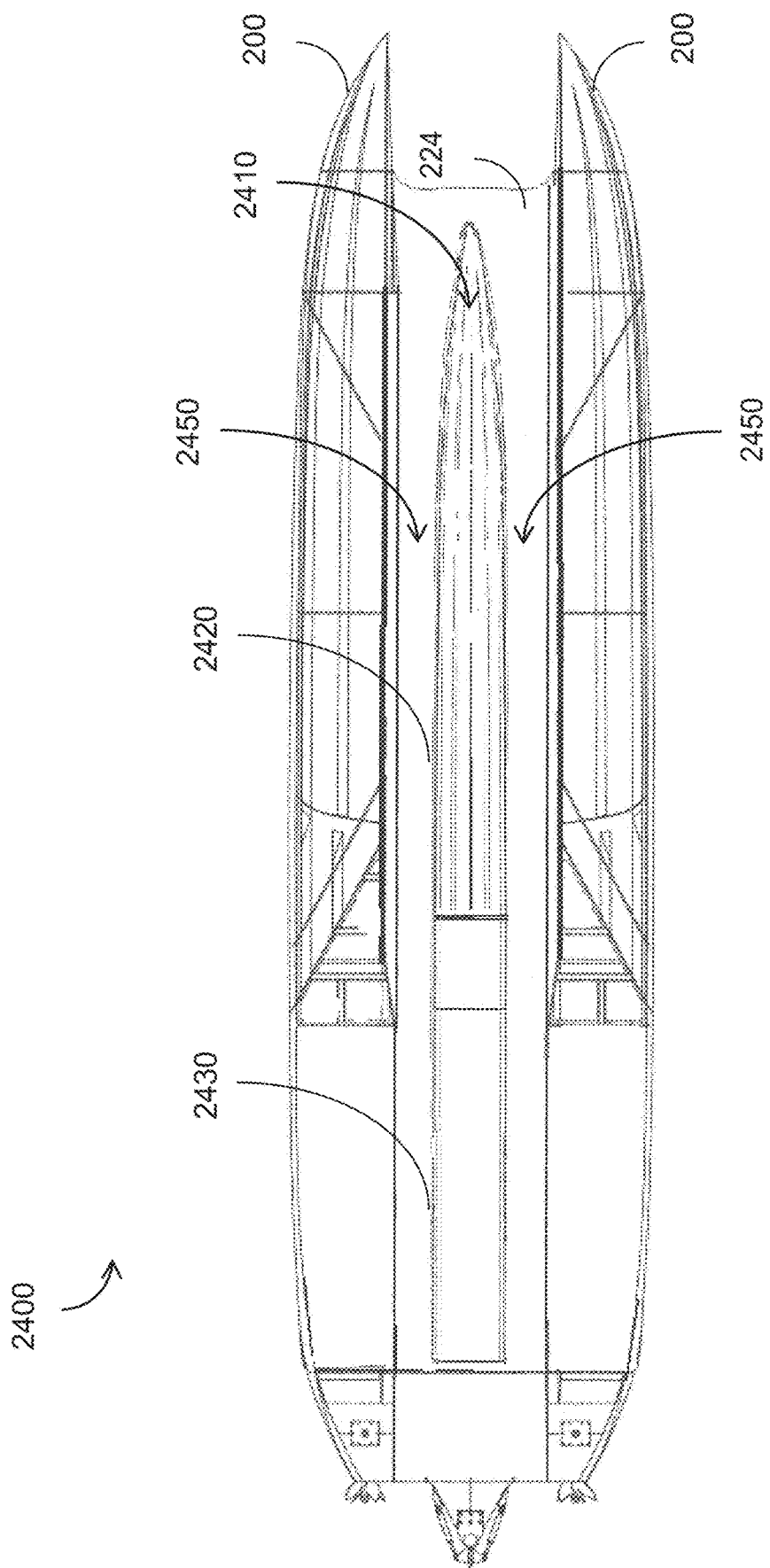
FIG. 24 is a bottom plan view of an unmanned vehicle according to an embodiment of the present invention.

In one embodiment of the present invention, as illustrated in FIG. 24, a center sponson 2410 may be added to the hull structure of the vehicle 100 (hereinafter referred to as vehicle embodiment 2400) and may be centrally-positioned between the two existing sponsons 200 to advantageously increase payload carrying capacity for the vehicle 2400 overall. More specifically, the center sponson 2410 may create additional lift through increased displacement and upward force from water flow as the center sponson 2410 moves forward through water. As a direct consequence of this upward force, high performance characteristics may be maintained because, as speed increases, the vehicle 2400 may lift onto the primary port and starboard sponsons 200 which may advantageously remove drag that may be caused by the additional surface area introduced by the center sponson 2410.

Still referring to FIG. 24, the front of the sponson 2410 toward the bow of the vehicle 2400 may be characterized by a deep V-Hull shape 2420. As the sponson 2410 transitions aft, the sponson 2410 may flatten out to a low deadrise hull and pad bottom 2430. The center sponson 2410 so designed may advantageously provide additional lift when operating on the surface of water because the sponson 2410 may provide displacement that increases as it descends below the water line. The angle and shape of the center sponson 2410 may provide lift as water flows across it from bow to stern of the vehicle 2400. On either side of the center sponson 2450, a gap 2450 may be defined between the center sponson 2410 and each side sponson 200 (port and starboard). This gap 2450 may define part of the tunnel 250 (as described above, except necessarily split by the center sponson 2450 into two generally parallel tunnels) that may allow for air flow and lift at higher speeds in such a way as to advantageously maintain good high speed performance of the vehicle 2400.

Figure 25:
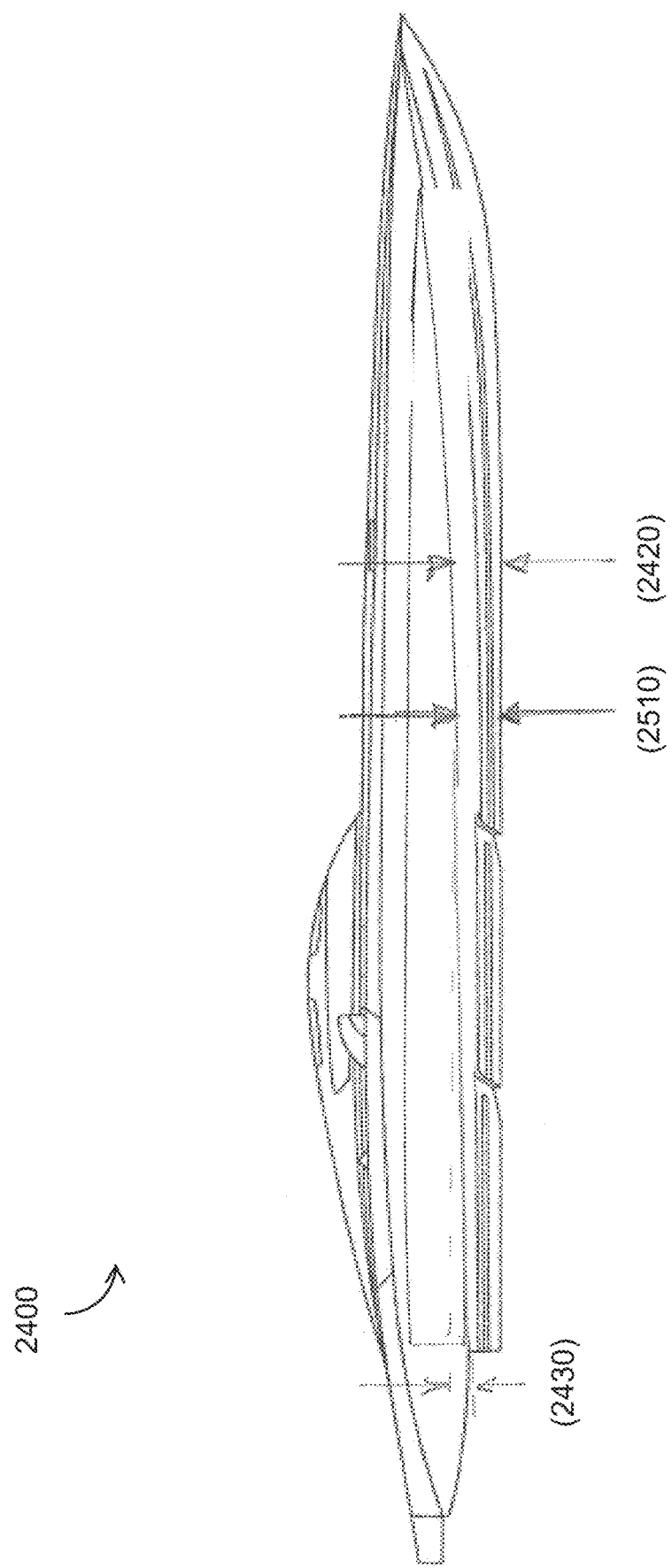
FIG. 25 is a side elevation view of an unmanned vehicle according to an embodiment of the present invention.
Figure 26B:
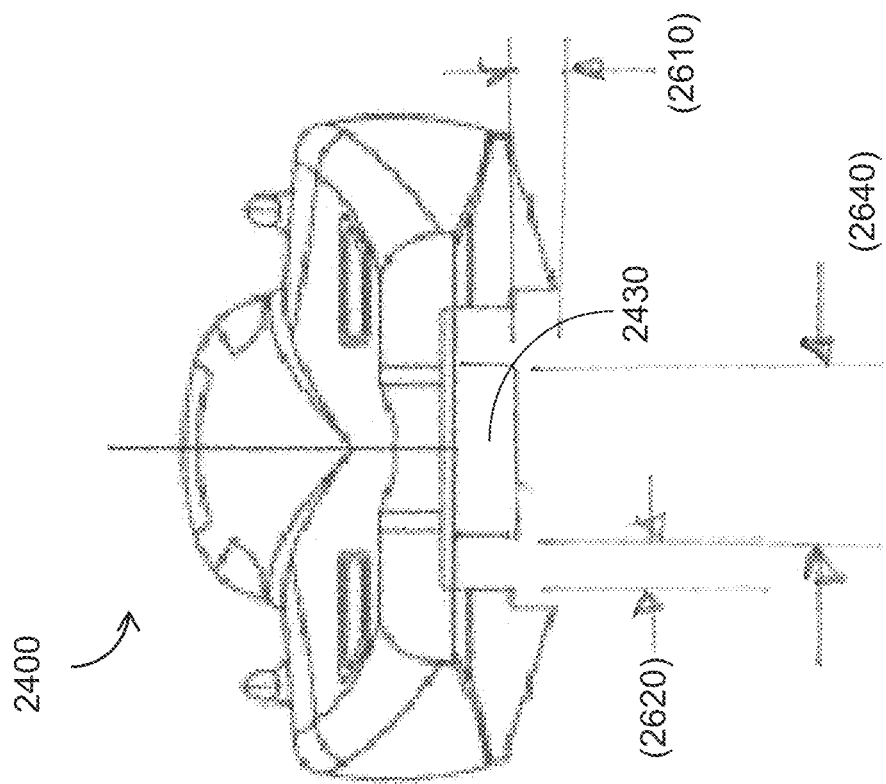
FIG. 26B is a rear elevation view of an unmanned vehicle according to an embodiment of the present invention.
Figure 26A:
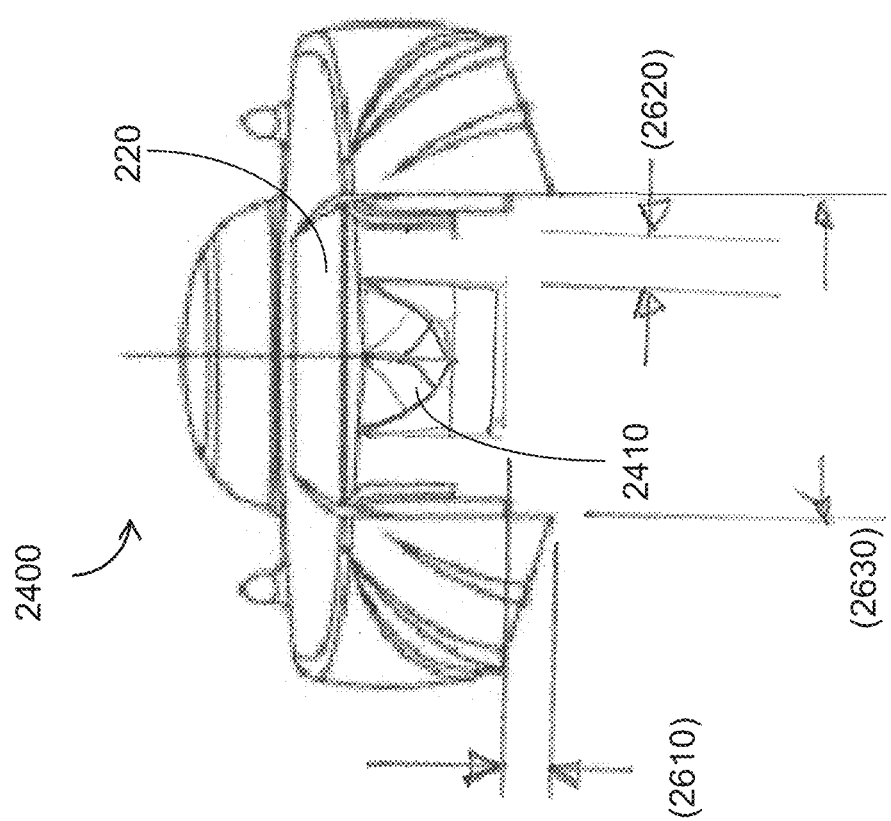
FIG. 26A is a front elevation view of an unmanned vehicle according to an embodiment of the present invention.

Referring to FIGS. 25, 26A, and 26B, additional characteristics of the sponson 2410 of the vehicle 2400 are now described in detail. For example, and without limitation, the center sponson 2410 may define an inclined plane as it moves aft (e.g., progress from first point 2410 through second point 2510 to third point 2430), which may advantageously provide lift in addition to displacement of the sponson 2410 when vehicle 2400 is moving. Viewed from front to rear of the vehicle 2400, the sponson pad may be above the port and bow sponson portion relative to water line (2610 such that at high speeds, the sponson 2410 may remain above the water line. The design of the sponson 2410 is such that a gap 2620 may be maintained on either side of the center sponson 2410 to advantageously allow air flow and lift which may advantageously maintain stability with low drag. The gap 2610 may be sized relative to total tunnel volume and tunnel width (2630).

Figure 27:
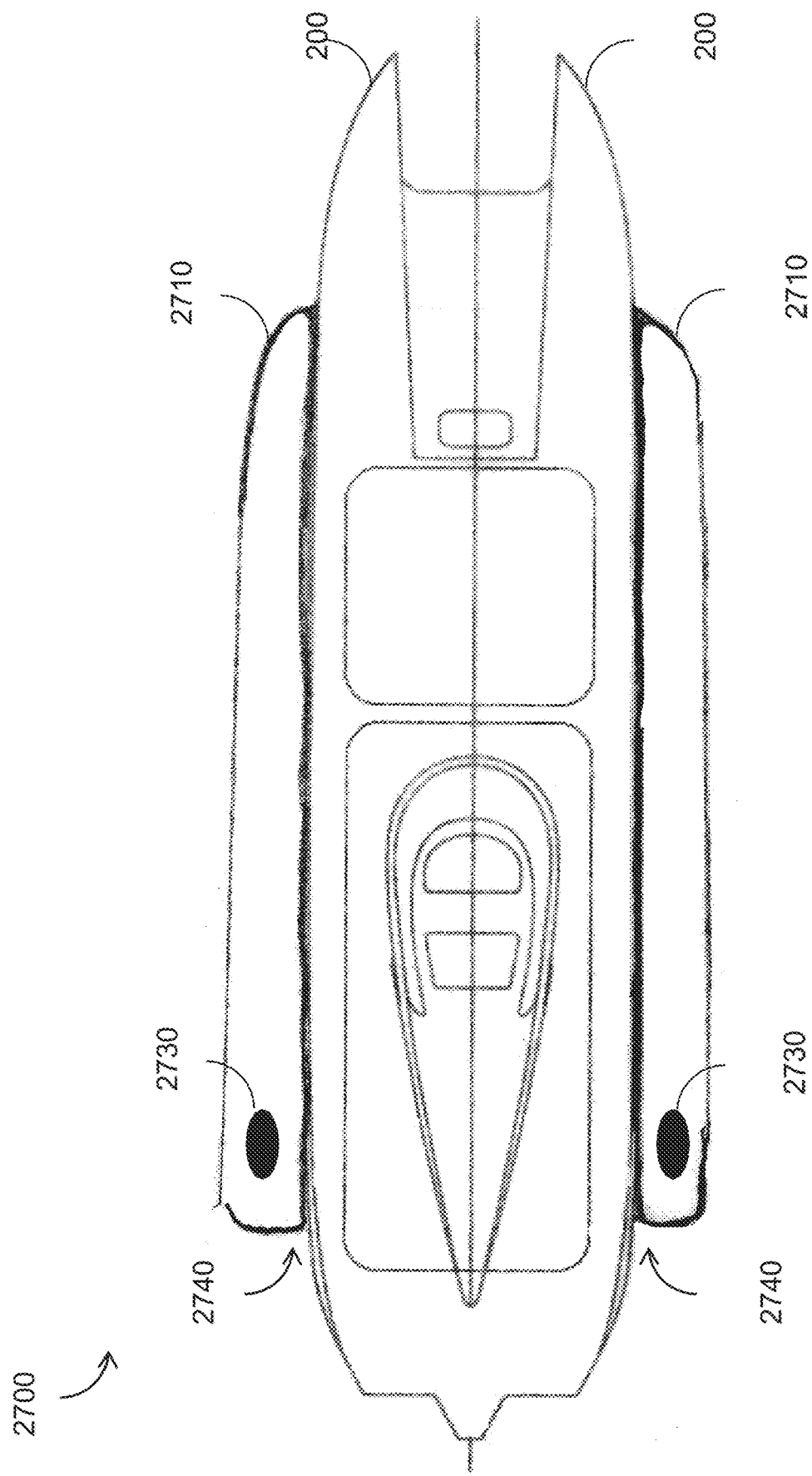
FIG. 27 is a top plan view of an unmanned vehicle according to an embodiment of the present invention.

In another embodiment of the present invention, as illustrated in FIG. 27, outboard extensions 2710 may be added to the hull structure of the vehicle 100 (hereinafter referred to as vehicle embodiment 2700) on both port and starboard sponsons 200 to advantageously increase payload carrying capacity. In yet another embodiment, the sponson extensions 2710 may be removable. In yet another embodiment, the extensions 2710 may be part of the base hull mold. The addition of sponson extensions 2710 may increase the displacement of the vehicle 2700 at low speeds as payload weight increases. The addition of the extensions 2710 outboard of the current vehicle 100 profile may advantageously add roll stability at low off-plane speeds while maintaining good high performance characteristics because a) as speed increases, the sponson extensions 2710 may rise up causing less surface contact and therefore less drag, and b) the center tunnel configuration 250 configured to control air flow and lift may be maintained. The sponson extensions 2710 may exhibit minor air drag effects at very high speeds.

For example, and without limitation, the sponson extensions 2710 may exhibit one or more of the following characteristics:

(1) positioned equilaterally port and starboard;
(2) constructed of the same aramid material as the vehicle hull (e.g., carbon fiber);
(3) shaped to follows the hull contour;
(4) each external sponson 2710 may runs aft and terminate where the vehicle transom begins (i.e., stepped hull shape ends);
(5) the front of each extension sponson 2710 may begin just aft of the vehicle sponson bow rake (i.e., where the sponsons flatten out);
(6) in one embodiment, sponson extensions 2710 may be removable (e.g., affixed to the hull with water proof bolt assemblies);
(7) in another embodiment, external sponsons 2710 may be made as part of the hull mode (e.g., permanent);
(8) the external sponson width may be adjusted depending on the payload weight;
(9) the external sponson width may vary in width asymmetrically to allow for more displacement where the payload is located;
(10) the starboard external sponson 2740 may be characterized by through ports 2730 that may allow water to flow freely between it and the starboard main sponson (e.g., this feature may advantageously facilitate for self-righting of the vehicle 2700).

Figure 28A:
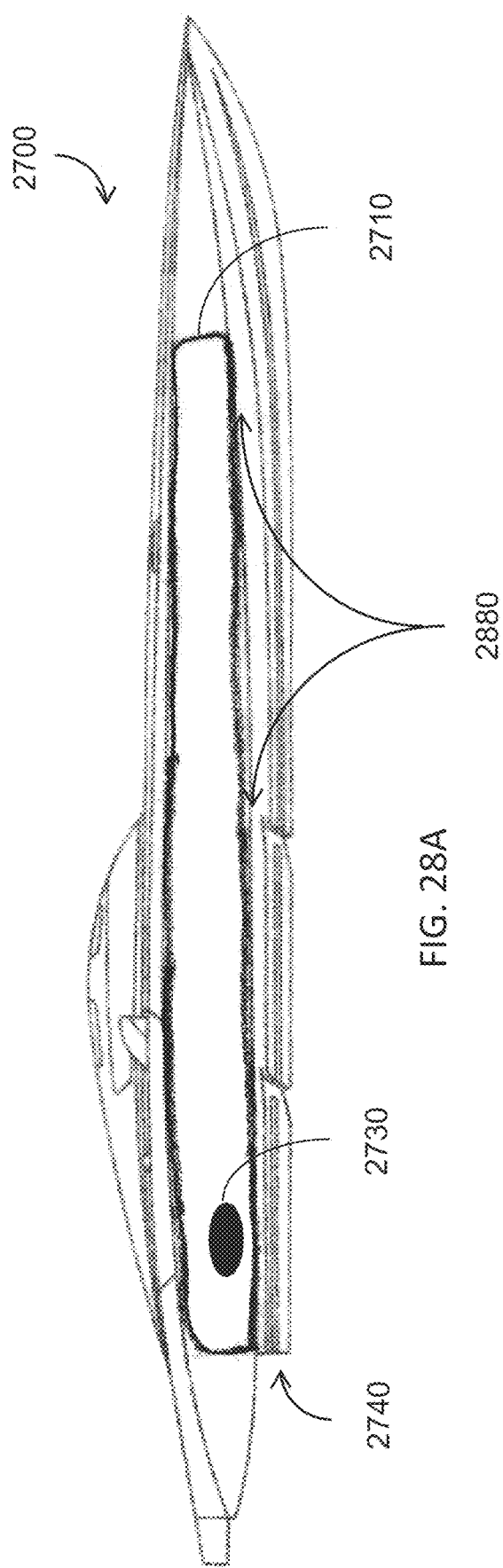
FIG. 28A is a side elevation view of an unmanned vehicle according to an embodiment of the present invention.
Figure 28B:
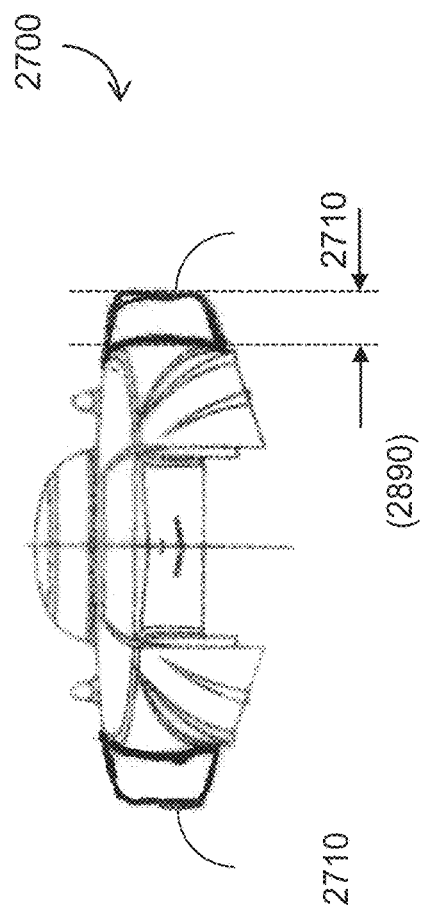
FIG. 28B is a front elevation view of an unmanned vehicle according to an embodiment of the present invention.

Still referring to FIG. 27, and referring additionally to FIGS. 28A and 28B, additional characteristics of the sponson extensions 2710 of the vehicle 2700 are now described in detail. For example, and without limitation, the bottom of the external sponson 2710 starts above the external "water line" step 2880 that is longitudinal along the hull 200. The aft end of the external sponson 2710 may terminate where the transom begins 2740, and may not overhang the stepped portions of the hull. The width 2890 of the external sponson 2710 may be variable depending on payload weight. A port location 2710 that allows water flow between starboard external and internal sponsors 2710 may be necessary for self-righting. (Not shown: a port side water port may be added to enable underwater multi-mode operation.)

Figure 15:
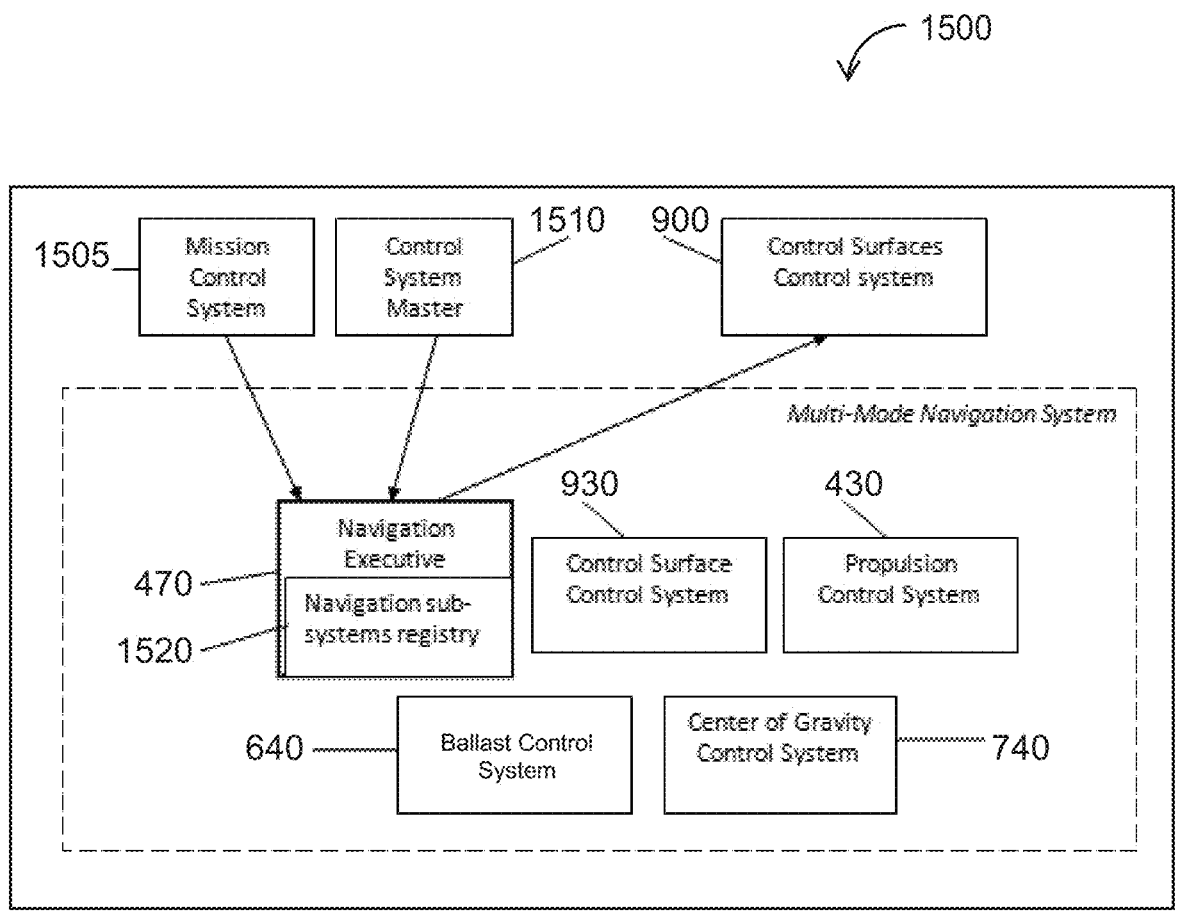
FIG. 15 is a schematic overview of a multi-mode navigation control system of an unmanned vehicle according to an embodiment of the present invention.

Referring now to FIG. 15, the navigation control system 1500 of the unmanned vehicle 100 according to an embodiment of the present invention will now be discussed in more detail. The navigation control system 1500, for example and without limitation, may act as the on-board governor of the speed, direction, orientation, mode and propulsion type for operation of the unmanned vehicle 100. Navigation of the unmanned vehicle 100 includes both underwater and air glide capabilities as transit route alternatives. Underwater activity may include powered or un-powered operation (e.g., underwater glide). Advantageous underwater activity may include "sit and wait," "power through," or "glide until." Advantageous air activity may include air drop into high seas, which may involve picking an angle of entry and direction of entry that may be best matched to prevalent wave patterns. Examples of advantageous use of the multi-mode navigation capabilities described above may include patrolling coastal areas in the surf zone, navigating through storm conditions, air drop search and rescue in heavy seas, optimizing energy use through all seas states, and surfing (riding) waves to save energy. Other advantageous uses of the capabilities described above may involve underwater current vectoring and may include merging with (riding) underwater currents for motion, avoiding underwater currents that oppose navigation direction, and exploiting underwater thermals.

In one embodiment, for example and without limitation, the navigation control system 1500 may order functional responses from a navigation executive 470, control surfaces 900 and control surfaces control system 930, propulsion executive 430, ballast control 640, and center of gravity 740 subsystems. The multi-mode navigation control system 1500 may enable the unmanned vehicle 100 to operate on the surface of the water, submerged under water, and in controlled glide or flight in the air by coordinated computer control of the vehicle control surfaces 900, ballast 640, center of gravity 740 and mode of propulsion 430 according to logic and sensor input that may be matched to the operating environment in which the unmanned vehicle 100 may be operating. The computer-controlled subsystems for each control activity may be connected in a computer network which may enable communication between each control subsystem and coordination by a control executive.

For example, and without limitation, navigation directives may originate from a mission control system 1505 when all systems may be operating normally, or from the on-board master control system 1510 in the event of an exception condition, for example, if the mission control system 1505 may be not operating reliably or if a critical subsystem may be operating abnormally. The navigation executive 470 may translate instructions for consumption by each subsystem. The navigation executive 470 includes a navigation subsystems registry 1520 by which it may register and store information about the navigation subsystems that may be available on the unmanned vehicle 100, including the signal format and semantics by which instructions may be communicated to them.

As mentioned above, the navigation control system 1500 of the present invention may control navigation and orientation of the vehicle 100 in multiple modes. This capability may be exemplified by the ability to maintain direction and stability at speeds of typically between 100 to 200 knots on the surface of the water, orientation and depth control underwater, and controllable glide and flight paths in the air. The ability to control navigation and vehicle 100 orientation in multiple modes may be achieved by autonomous computer control of vehicle control surfaces 930, ballast control 640, and vehicle center of gravity control 740. The control systems of all three of these elements may themselves be under coordinated control by the multi-mode navigation control system 1500. Further, the multi-mode navigation control system 1500 may control propulsion 400 which also may affect vehicle 100 orientation in combination with the other navigation systems. The systems that control these elements may employ computer-controlled actuators and feedback sensors for closed loop real-time control.

For example, and without limitation, the multi-mode navigation control system 1500 may include optimization instructions regarding speed and orientation. The orientation control function of the navigation control system may calculate the optimal changes in control surfaces 900 and center of gravity 740 and may send instructions to the navigation executive 470 which may issue instructions to the control surface control system 930 and the center of gravity control system 740. A velocity control function of the navigation control system 1500 may calculate propulsion required and may send the signal to the propulsion control system 430 via the navigation executive 470. A flight control function of the navigation control system 1500 may enable powered flight and aerodynamic gliding.

For example, and without limitation, the mission control system 1505 may send instructions to the navigation executive 470 of the multi-mode navigation control system to initiate a mission segment that has an environmental mode of "air glide to water entry." The navigation executive 470 may, in turn, send instructions over a computer network or internal computer bus to activate the flight control function of the navigation control system 1500 and to prompt other subsystems to become slaves to the flight control function of the navigation control system 1500. The flight control function may monitor sensor input for altitude, orientation (e.g., roll, pitch, yaw) and speed, and may send control instructions to the control surfaces control system 930 and the center of gravity control system 740. The flight control system may store parameters for optimal orientation and speed characteristics of the vehicle 100, and also logic to operate the control surfaces 900 and center of gravity 740 accordingly. Altitude and infrared sensor input may be fed to the navigation executive 470 that may indicate approach to the water surface. As this approach occurs, the navigation executive 470 may issue new instructions to the flight control function of the navigation control system 1500 as to optimal orientation for entering the water, and the flight control function may issue instructions based on stored logic to the control surfaces 930 and center of gravity control 740 systems to achieve the optimal vehicle 100 orientation. Acceleration, temperature, and pressure sensor data may be fed to the navigation control systems 1500 that indicate water entry.

When water entry occurs, the navigation executive 470 may send instructions to the flight control function of the navigation control system 1500 to shutoff, and may initiate logic for underwater operation that may determine characteristics to achieve stable orientation of the vehicle 100 underwater. Instructions may be sent to the control surfaces 930, center of gravity 740, and ballast control 640 systems for this purpose. Also, the navigation executive 470 may send an electronic message over the computer network to the mission control system 1505 signifying that the vehicle 100 has entered and is under the water. The mission control system 1505 may store information that indicates the next mission segment, and also logic to translate the segment information into environmental mode of operation, speed, orientation, direction and duration. The mission control system 1505 then may send instructions pertaining to navigation characteristics of the next segment back to the navigation executive 470. For example, and without limitation, the next segment may be water surface operation at 15 knots with a specified directional heading.

Also, for example and without limitation, the navigation executive 470 may execute logic for surfacing the vehicle 100 that includes instructions to the control surfaces 930, ballast 640, and center of gravity 740 systems. Depth, pressure, temperature and directional sensor input may be fed to the navigation executive 470 and, as the vehicle 100 surfaces atop the water, the navigation executive 470 may select the propulsion mode and may initiate propulsion according to configuration parameters stored in computer memory. Speed and direction instructions may be issued by the navigation executive 470 to the propulsion control system 400 and control surfaces control system 930. Each of these systems may accept sensor inputs, and the propulsion system 400 may control the propulsion mechanisms to the determined speed, and the control surfaces control system 930 may operate the control surfaces 900 to achieve the instructed orientation.

When an unmanned vehicle 100 is autonomously navigating between two points in a transit route, the navigation control system 1500 may generate directives to other on-board control system components to change speed and direction based on detected wave activity. The navigation control system 1500 may analyze the wave activity and autonomously adjust the transit route to achieve best speed, energy efficiency, and/or vehicle safety (e.g., least likely to overturn). Alternatively, or in addition, the on-board control systems (including the navigation control system 1500) may accept instructions from a remote-control station that may notify the unmanned vehicle of weather and/or sea state conditions in order to equip the navigation control system 1500 to select the best mode of vectoring. In one embodiment, the navigation control system 1500 may be put in a "maximum endurance" mode, which may comprise executing algorithms to exploit the most efficient use of the propulsion systems 430 that the vehicle 100 has on board. In a preferred embodiment for endurance, such a configuration may include wind sail propulsion 1400, current propulsion, underwater glide propulsion, and solar recharge 1450. In such a hybrid-propulsion configuration, the time endurance of the unmanned vehicle 100 may be virtually unlimited from a motive power standpoint.

For example, and without limitation, water current external to the vehicle 100 may be determined by the navigation control system 1500 from maps and algorithms, and sensors for wind speed and direction may be activated by the navigation control system 1500 to perform data collection. The navigation control system 1500 may be configured with algorithms to choose the most effective path segments and overall plan for minimum energy consumption. For example, and without limitation, if the vehicle 100 is proximity to an ocean current moving from west to east, and also to a prevailing wind moving in substantially the same direction, the navigation control system 1500 may choose a path to tack up wind generally in a westerly direction, and then ride the current in an easterly direction without aid of wind to maximize the time of the path on current propulsion. Alternatively, or in addition, mission control system 1505 algorithms may determine that underwater glide mode is the most desirable mode with the current for surveillance reasons. In this case, the unmanned vehicle 100 may sail east to west on the surface, and then glide underwater west to east. In this mode of operation, very little energy may be consumed and, with solar recharge 1450, the unmanned vehicle 100 may actually experience a net gain in energy over this path. Employing the systems and mechanisms described above, the navigation control system 1500 may advantageously accomplish autonomous navigation of the unmanned vehicle 100 through various sea states for "fastest, cheapest, safest" patterns, that may include both surface and sub-surface patterns, and that also may include air-drop patterns of entry into an operational environment.

Figure 16:
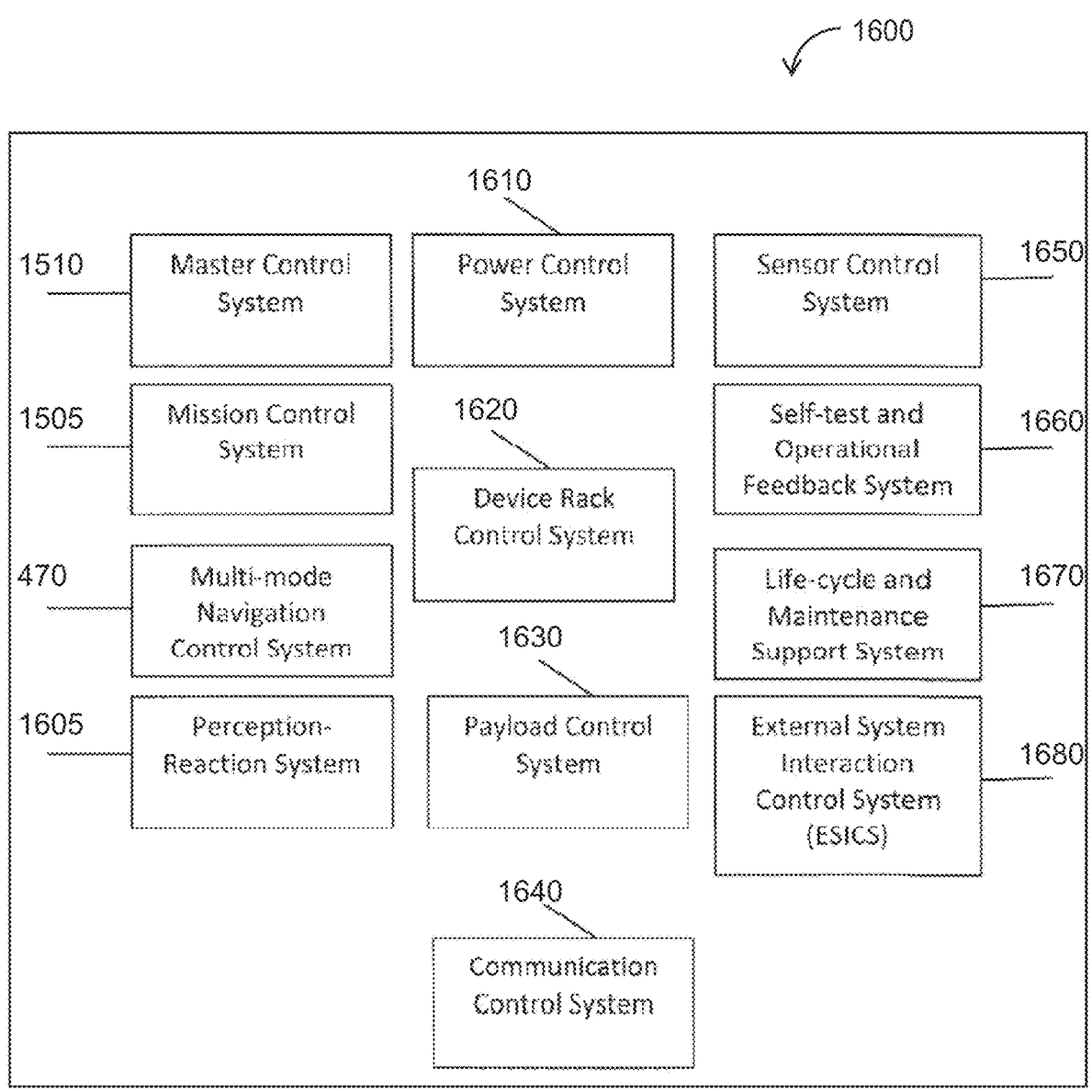
FIG. 16 is a schematic overview of an on-board control system of an unmanned vehicle according to an embodiment of the present invention.

Referring now to FIG. 16, the on-board control system 1600 of the unmanned vehicle 100 according to an embodiment of the present invention will now be discussed. The on-board control system 1600 may comprise an on-board master control subsystem 1510, for example and without limitation, that may exercise local authority over all command, control and communications related to operation of the unmanned vehicle 100. In one embodiment, for example and without limitation, on board control system 1600 may interact with additional subsystems that may include a mission control system 1505, multi-mode navigation control system 470, propulsion and power control system 1610, device rack control system 1620, payload control system 1630, communication control system 1640, sensor control system 1650, as well as a perception-reaction system 1605, self-test and operational feedback control system 1660, life cycle support and maintenance system 1670, and external system interaction control system 1680. The on-board master control system 1510 may enable multi-mode operation, autonomous operation, and remote manual control of the unmanned vehicle 100.

In one embodiment, for example and without limitation, the on-board master control system 1600 of the present invention may be comprised of software programs that may reside on computer storage devices and may be executed on one or more microprocessors also referred to as central processing units (CPU). Inputs to these software control modules may originate as instructions that may be sent from other on board control systems, as instructions that may be generated from off board control systems and communicated to on board systems, and as sensor data input that the control programs may monitor. The output of the software control programs may be digital control signals that may be translated to electronic control signals that may be consumable by motor controlled actuators that may operate the mechanical components of the unmanned vehicle 100. Software control module outputs also may be connected to a computer network on the unmanned vehicle 100 and all control modules may be connected to a computer network on board the unmanned vehicle 100.

The unmanned vehicle 100 according to embodiments of the present invention may be configured for rapid integration of various sensors by employing a "plug-in" design approach where interfaces exposed to the systems of the vehicle 100 may be standard and where interfaces exposed to the sensor are variable. The sensor interface may be translated to a standard system 100 interface which may allow the sensor to be "plugged in" to the vehicle's 100 system. This general approach to interfaces may be implemented on several levels and may apply to the following:

(1) Mechanical mounting points;
(2) Signal and Power connections;
(3) Logical interfaces;
(4) Data processing schemes; and
(5) Communication schemes.

Certain embodiments of the present invention may provide one or more of the following advantages (a) enablement of rapid swapping of many different payloads in the field;

(b) presentation to payload providers of a readily available integration platform (resulting in shortened development cycles on the order of days and weeks rather than weeks and months).

As described in more detail below, mechanical interfaces, which include signal and power connectors as well as mounting points may be embodied as part of an enclosure that is resistant to the multi-mode environment. A number of embodiments of payload enclosures exist that vary in size, shape and mounting locations within the vehicle 100 that accommodate various sensor interfaces and which adhere to the standard vehicle 100 interfaces so that they may be "plugged in". Also as described below, "payload control" may be integrated with mechanical, signal and power interfaces and may be extended to include communications control and data processing control. Referring to the system block diagram from the original provisional patent, the architecture is the same and supports the "plug-in" model.

As described above, the on-board control system 1600 may further include the payload control system 1630 that, more specifically, may enable control of a wide variation of payloads and may coordinate the payload behavior with the behavior of the vehicle 100. For example, and without limitation, payload components may include sensor arrays, robotic devices, unmanned aerial vehicles (launch and recovery), and energy sources such as solar arrays. In certain embodiments of the present invention, the payload control system 1630 may manage multiple payloads simultaneously. A person of skill in the art may immediately recognize that the design and operation of the payload control system 1630 may be similar to the design and operation of the device rack control system 1620, except that the former 1630 may allow for multiple unknown payloads.

Figure 29:
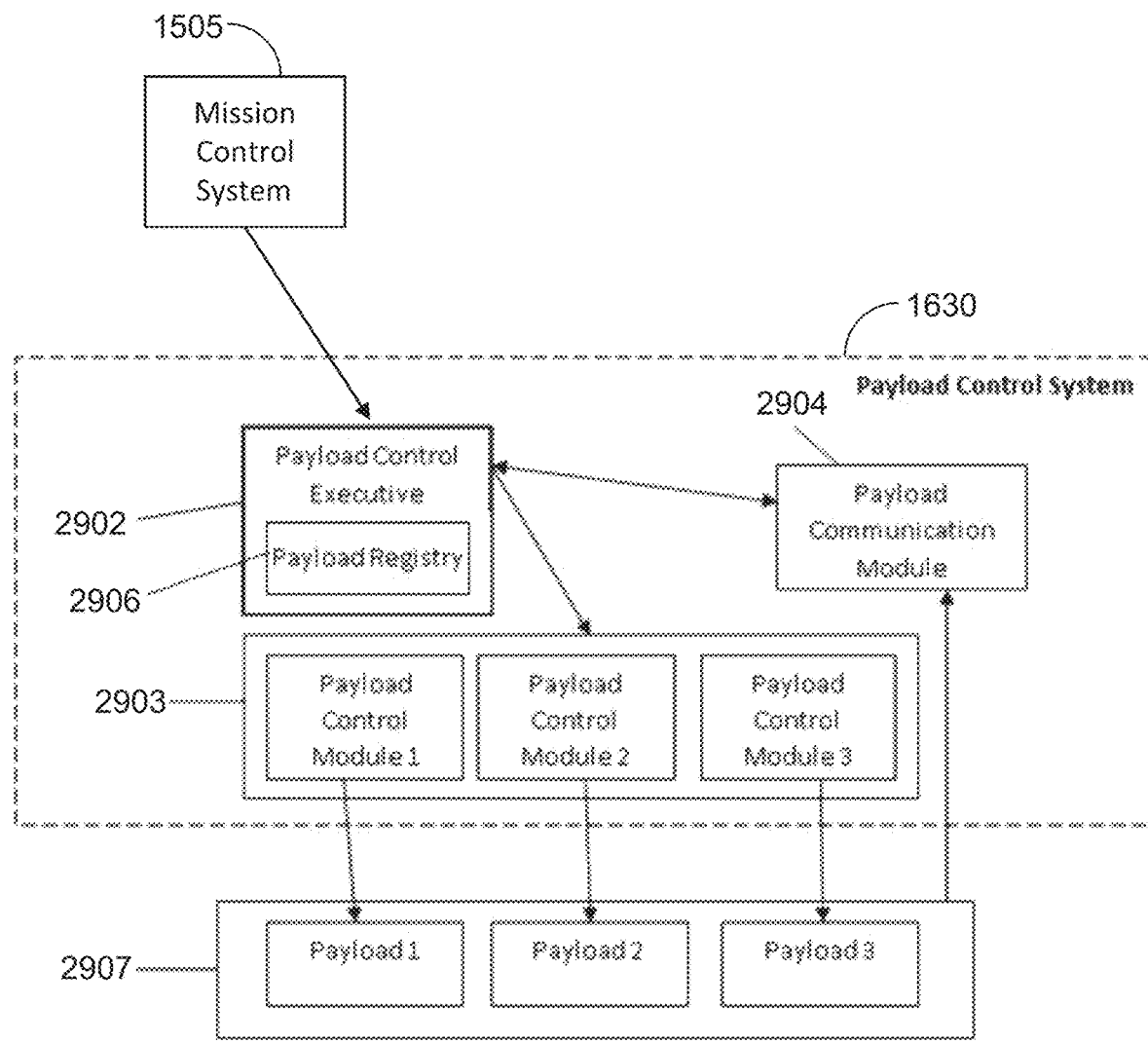
FIG. 29 is a schematic overview of a payload control system according to an embodiment of the present invention.

Referring now to FIG. 29, a schematic of an embodiment of the payload control system 1630 will now be discussed in detail. The payload control system 1630 may include a payload control executive 2902, individual payload component control modules 2903, and a payload communication module 2904. The payload control modules 23 and payload communication module 2904 may be operably connected to individual payloads 2907. Using the payload registry 2906, the payload control executive 2902 may register the payload, the payload devices, the corresponding control modules 2903 and information about how to communicate 2904 to each payload module 2903. The payload control executive 2902 may receive signals from sensors and instructions from system control components as to desired operation of the payload and information requested from the payload. For example, and without limitation, the payload 2907 may include a high-resolution video camera with articulation and zoom capabilities and its own control actuators and signal processing. The mission control system 1505 may issue instructions to the payload control executive 2902 to turn the camera on and point it in a particular orientation and/or with a particular zoom level. The mission control system 1505 may issue instructions as to the routing and processing of the video information collected. The payload control executive 2902 may translate the instructions received from the mission control system 1505 into instructions and signals the video camera control system can use. Additionally, the payload control executive 2902 may route and translate signals from the vehicle sensors to the camera control system. In this case, the camera control system may be provided orientation of the vehicle 100 such that it could actuate the video camera in accordance with the instructions. The video camera data output would be collected and routed in accordance with the mission control system 1505 instructions.

Figure 30:
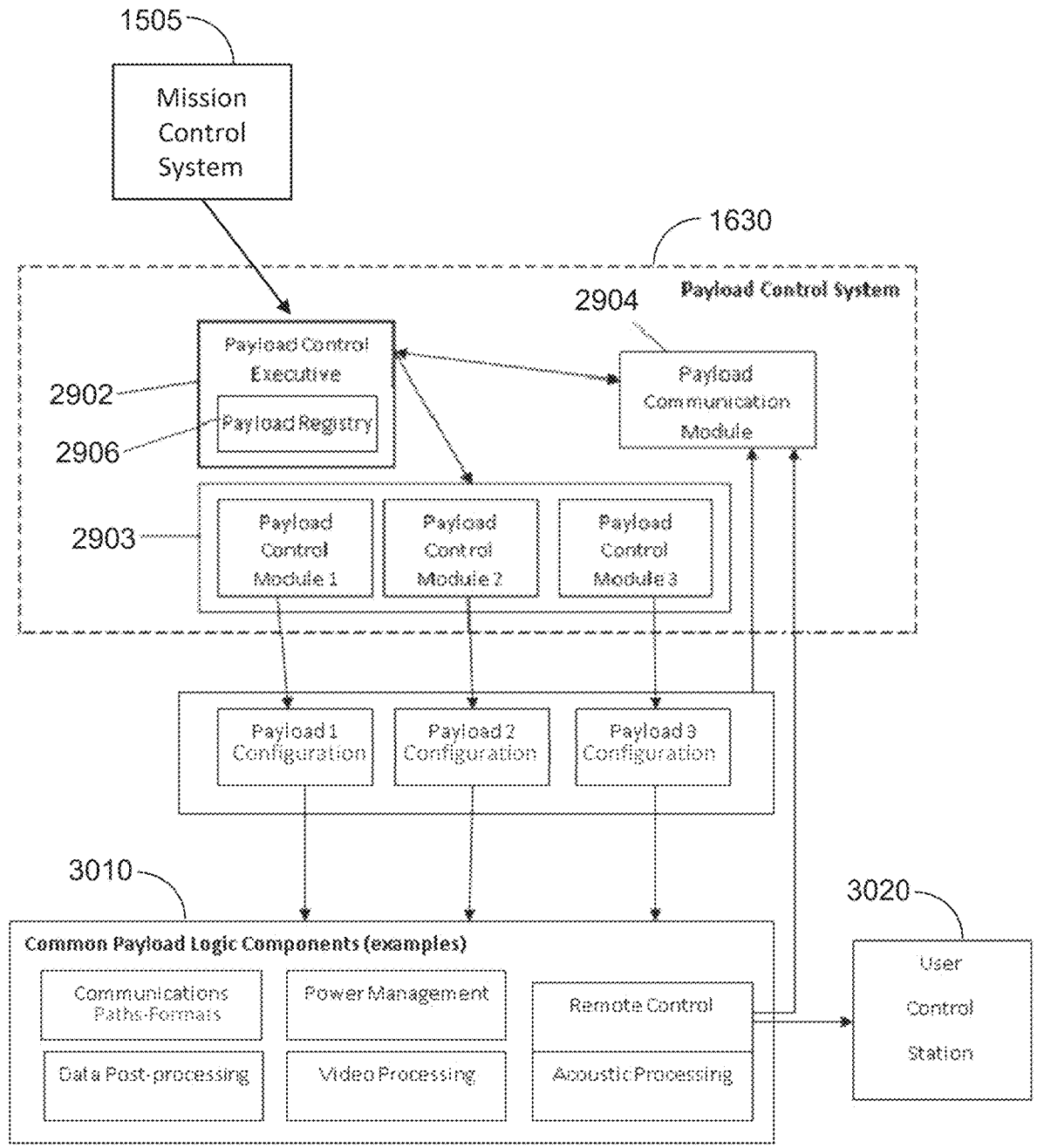
FIG. 30 is a schematic overview of a payload control system according to an embodiment of the present invention.
Figure 31:
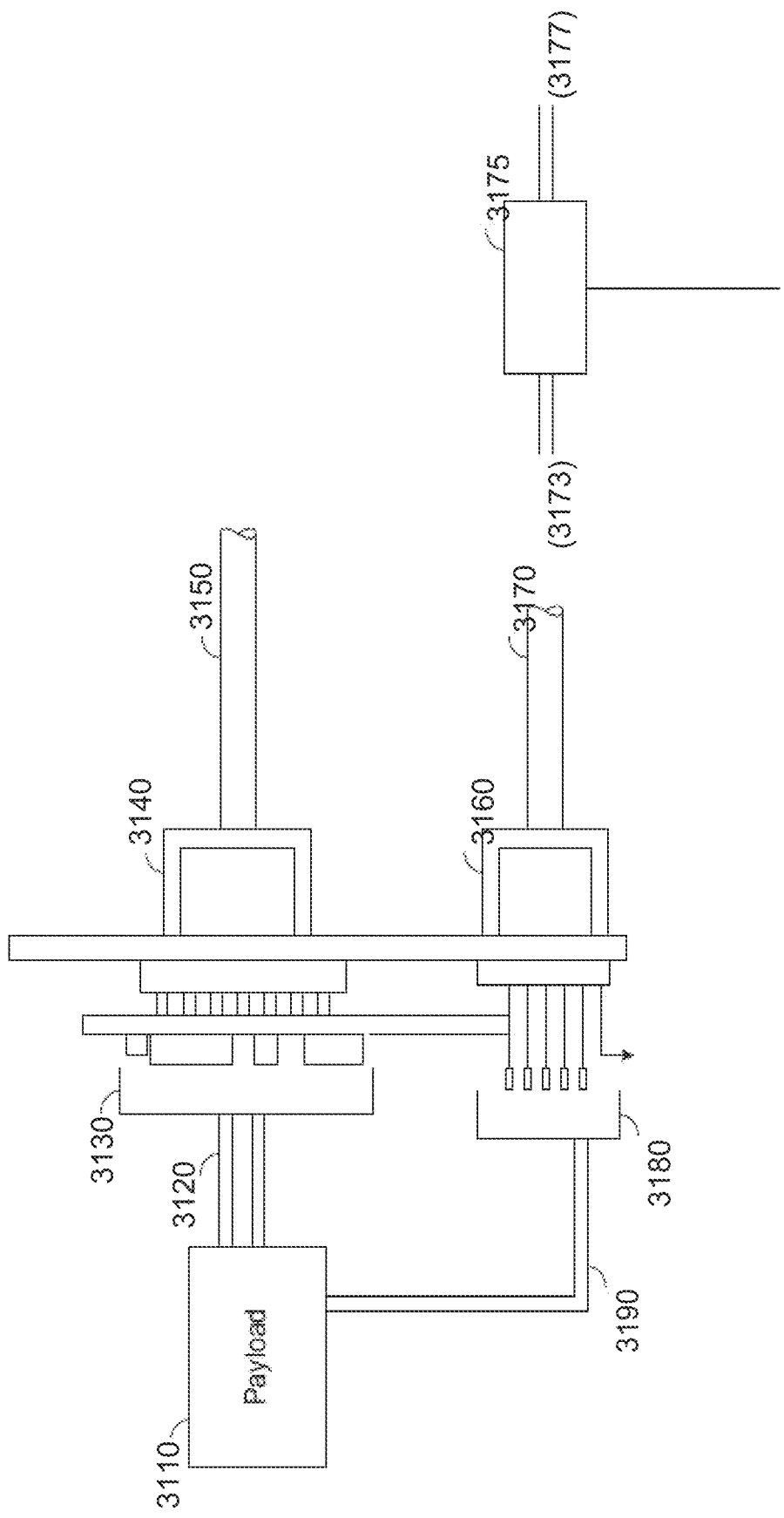
FIG. 31 is a schematic diagram of exemplary payload signal and power interfaces according to an embodiment of the present invention.
Figure 32:
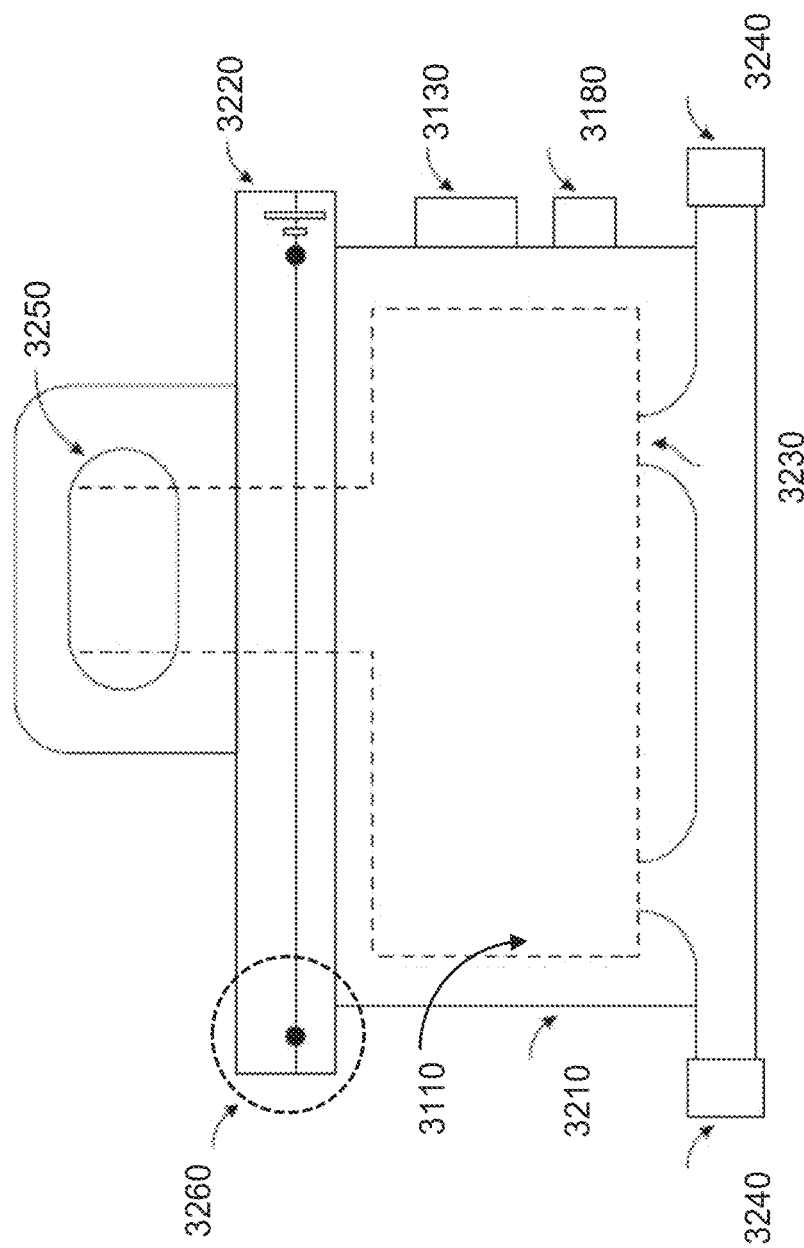
FIG. 32 is a schematic diagram of exemplary payload mechanical interfaces according to an embodiment of the present invention.

Referring additionally to FIGS. 30, 31, and 32, the following terms are significant to rapid payload integration as advantageously provided by the present invention:

Payload Enclosure: A payload 3110 may be housed in a payload enclosure 3210 with standard connection 3130, 3180 and mechanical characteristics 3230 as described above. While the signal connection 3140, 3150 and power connection 3160, 3170, as well as internal mounting schema may be standard, the actual size, shape and external mounting characteristics 3240 may vary depending on location within the vehicle 100 and physical requirements of the sensor. In addition to providing uniform interfaces, the payload enclosure of FIG. 32 may provide protection from the multi-mode environment, and primarily protection from water incursion. For example, and without limitation, this protection may be accomplished with standard pressure seals 3260 and enclosures 3220 designed for the vehicle 100 environment. The payload enclosure of FIG. 32 may accommodate varying physical characteristics, such as clear viewing apertures 3250 for cameras and below deck mounting for heavy electronics. The following interface descriptions relate to the payload enclosure (FIG. 32) and connections to it.

Signal Interface: A payload 3110 may be housed in an enclosure 3210, 3220 with standard interfaces for power 3180 and signal 3130. Examples of standard signal interfaces connections may include USB, Ethernet, Serial (DB9) and a GIO (General IO) connection interface with standard pin configurations. These standard signal interfaces may be connected to one side of a water resistant, pressure rated bulkhead connector 3140, 3160 on the inside of the enclosure 3210, 3220. On the outside interface, the quick connect style connector 3140, 3160 may be connected to a wiring harness 3150, 3170 with known signal mapping to the internal signal inputs that may be, in turn, connected to the vehicles 100 mission control system 1505 and/or known, identified input locations.

Communications Interface: To accommodate payloads 3110 that require an independent communication channel, there may be internal connections in the enclosure for antennae connections. On the outside interface, environment-proof connectors 3140, 3160 may be connected to a wiring harness 3150, 3170 that may terminate at locations where antennae may be secured to the hull of the vehicle 100.

Power Interface: Inside the enclosure (FIG. 32) may be another set of standard interfaces for power 3180, 3190, which may feature heavier gauge wire for power transmission. Multiple sets of plus and minus paired connections 3180 may be available for various voltages and ground connection. These connectors 3180 may be joined via a bulkhead connector 3160 that may be environmentally resistant and rated for the power to be carried. On the outside interface, the quick connect style connector 3160 may be connected to a wiring harness 3170 that may be on a digitally controlled relay that may turn power off and on as needed to the payload 3110. This digitally controlled relay may be controlled from the payload control system 1630.

Mechanical Mounting: Inside the payload enclosure 3210, 3220 may be a number of standard internally threaded standoffs to which the payload 3110 may be secured. For example, and without limitation, these fasteners may take the form of directly bolting the payload 3110 to the inside of the box, or fastening the payload 3110 to an intermediary plate or container that may then be fastened to the standard mounting points 3230.

Logical Control: As an extension to the original plug-in design of the payload control system 1630, advantages compared to the known art include configurable components for handling communication paths, data processing of payload generated data, power management of payload power and remote control of the payload. Remote control of the payload may be autonomous logic or direct operator control. The mechanism for this may be described as follows:

Each payload type may be registered with the payload control system 1630. Part of the registration may include a configuration of the particular payload 3110. This configuration may be read when the payload 3110 is initiated and may include directives as to which components and logic apply to the payload 3110. When a payload is installed on the vehicle 100, it may be registered and configured as "installed". When the payload control system 1630 initiates its control sequence, it may initiate the installed payloads according to the configured logic set and may report initiation status.

Once initialized, the payload control system 1630 may run continuously and ma execute according to logic and according to remote operator control. The mechanisms for remote operator control may involve a user operating a control station 3020 performing a read of the payload registration and configuration from the vehicle 100 and activating user control interfaces according to pre-programmed instructions that are part of the payload configuration. Additional remote control may be achieved when the payload has a direct communication link enabled that bypasses the vehicle 100 logic and may enables access to payload controls natively in its own metaphor.

Figure 17:
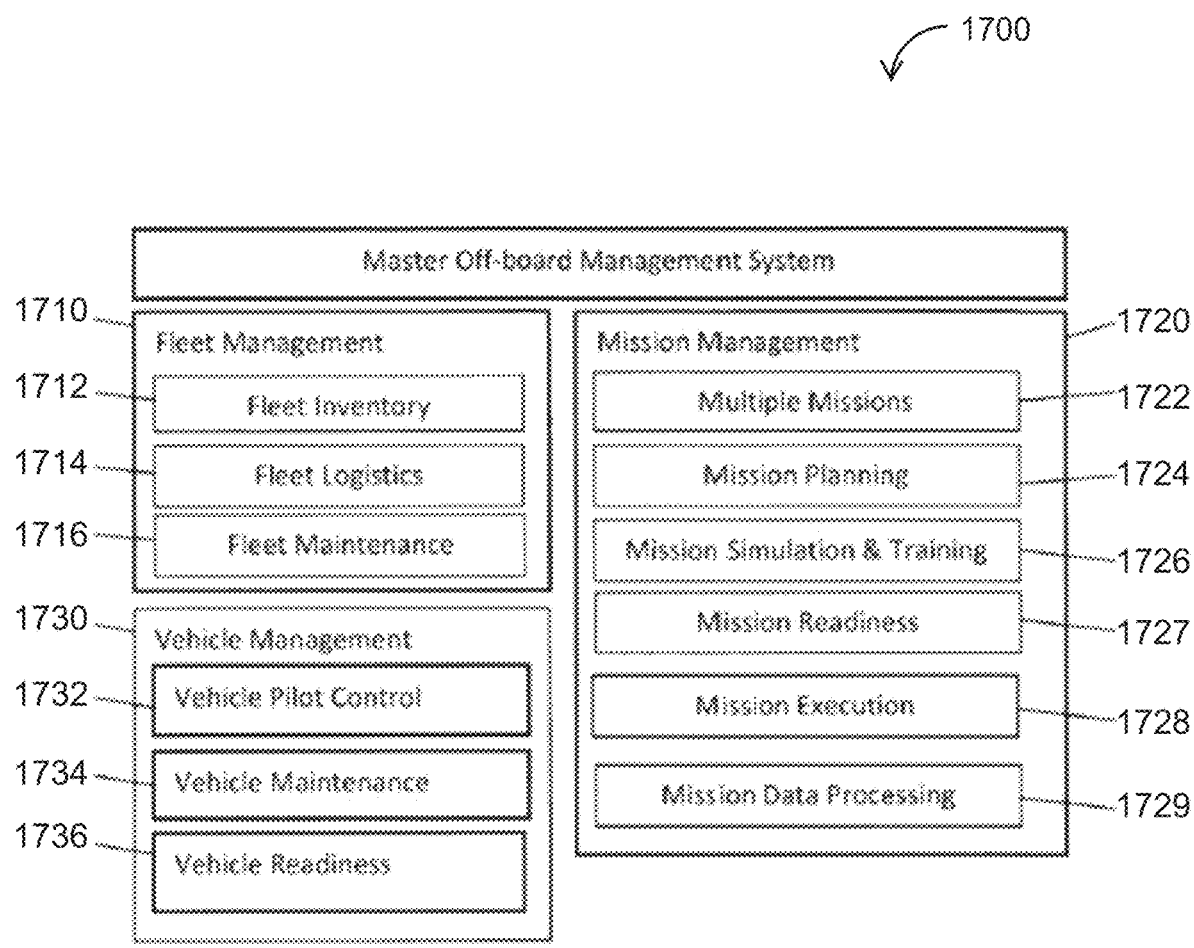
FIG. 17 is a schematic overview of an off-board control system of a mission planning and control system according to an embodiment of the present invention.

Referring now to FIG. 17, the off board mission control system 1700 of the unmanned vehicle 100 according to an embodiment of the present invention will now be discussed. The unmanned vehicle 100 of an embodiment of the present invention may, for example and without limitation, operate in full autonomy, partial autonomy or full manual control modes. The on board mission control system 1600 may accept signals from the off board mission control system 1700 (also known as the Master Off-board Management System) that may indicate the degree of control, and may establish operation control of the unmanned vehicle 100 by enabling or disabling the required mission control logic. The Master Off-Board Management System 1700 may provide registration, navigation, communication, and network integration of the off-board management subsystem modules, and may provide a graphical user interface menu and software module navigation system that may provide access to various modules. Sub-systems may be physically separate but may be available over a network of networks, some number of which may be characterized by different protocols and bandwidth characteristics. The Master Off Board Management System 1700 may integrate various other management and control systems.

Figure 18:
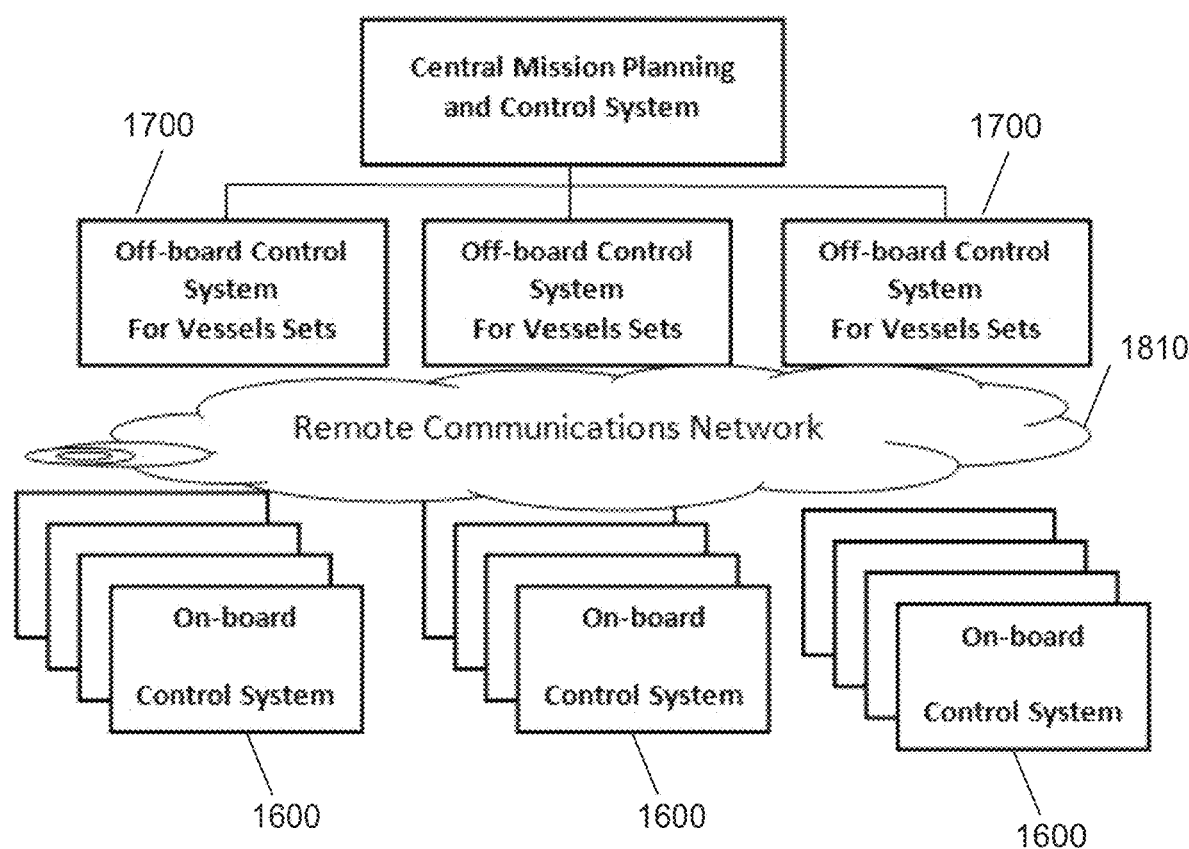
FIG. 18 is a schematic overview of a mission planning and control system according to an embodiment of the present invention.

Referring now to FIGS. 17 and 18, a multi-vehicle, multi-mode planning and control system may comprise a central off-board planning and control system, a set of off-board control systems that are networked together with the central control system, a set of unmanned vehicles with on-board vessel control systems, and a networked communication system that connects on-board unmanned vehicle control systems with off-board control systems. For example, and without limitation, FIG. 17 is a schematic overview depicting an embodiment of the functional modules of the off board mission control system 1700. The major functional modules of the off board mission control system 1700 may include a Fleet Management Module 1710, a Mission Management module 1720, and a Vehicle Management module 1730. These and other off-board systems may be connected on a common computer network 1810 where all sub-systems may uniquely identified and any system may communicate with any other system to send and receive data and digital signals. Off-board control systems 1700 may include software programs and digital storage means that may enable autonomous vehicle control operations, and the off-board systems 1700 also may include human interfaces in the form of "graphical user interfaces" (GUIs) displayed on human readable devices such as flat screen monitors, tablet devices and hand held computer and cell phone devices.

The present invention may advantageously enable coordinated operations across a large number of unmanned vehicles 100 that may be deployed across the globe. The unmanned vehicles 100 may have a number of embodiments of operational characteristics, and may potentially support a large number of payload variations. The Fleet Management System 1710 may include a feet inventory module for unmanned vehicles 100, payloads, and related utility systems. The inventory system may store information on each unmanned vehicle 100, including vehicle specifications, sub-systems, payloads, sensors, operational status, operational history, current location, and availability. Unmanned vehicle information may be provided to the system 1710 by upload from the unmanned vehicle self-test and operational feedback system, which may be initiated automatically by the unmanned vehicle (as described below). Alternatively, software program, graphical user interface, and input means may be provided by the fleet management system 1710 so that human operators may enter information into the system 1710 manually. Application program interfaces (APIs) or interface services may be provided by means of software modules in the fleet management system 1710 that may allow external computer systems to transmit and receive data without human intervention or, alternatively, with a person simply triggering the data transfer through a user interface but not actually entering the data himself. The software programs that may constitute the Fleet Management system 1710 may be modular and separable from each other, even though these programs may inter-communicate. A subset of the programs that may run logic that interacts with the unmanned vehicle self-test and operational feedback system may be executed separately on devices that may collect unmanned fleet and operational data. These data may then be uploaded to a fleet management system 1710 through a connected network 1810. Such asynchronous upload capability may be advantageous for inventory situations wherein unmanned vehicles 100 may be briefly powered up and interrogated, before losing data communication with a network 1810 that may be shared with the Fleet Management System 1710.

Continuing to refer to FIG. 17, the Fleet Management module 1710 may include a Fleet Inventory module 1712, a Fleet Logistics Management Module 1714, and a Fleet Maintenance Module 1716. The Mission Management module 1720 may include a Multiple Mission Management Module 1722, a Mission Planning module 1724, a Mission Simulation and Training module 1726, a Mission Readiness Module 1727, a Mission Execution Module 1728, and a Mission Data Processing module 1729. The Vehicle Management module 1730 may include a Vehicle Pilot Control Module 1732, a Vehicle Maintenance Module 1734, and a Vehicle Readiness Module 1736. As described above, the Fleet Management modules 1710, the Mission Management modules 1720, and the Vehicle Management modules 1730 may be characterized as software programs executing on digital computers with human readable output devices and human input devices. These modules may be connected on a common computer network 1810 and all modules and subsystems may be uniquely identified by network address and unique names that may be registered in a namespace registry with information as to how to communicate with each module. All subsystems of the off board control system 1700 may be accessible to all other subsystems and may transmit and receive data among each other in sets or individually. Security measures may be added to control access between systems or to systems by selected users.

For example, and without limitation, the Fleet Management System 1710 may include a Fleet Logistics system 1714 that may track spare parts, orders, shipments, and vehicle process status. The Fleet Management System 1710 further may include a Fleet Maintenance System 1716 that may store maintenance records for each vehicle, self-test history, maintenance plans, maintenance orders, and maintenance status. The Fleet Maintenance System 1710 may further contain a software program module that may compare maintenance activity and status for each vehicle against the maintenance plan for each vehicle. The software program may contain algorithms to determine when maintenance events are needed or warranted for each vehicle; and may provide notification of these events by means of reports that may be retrieved by people, of proactive email alerts, or of notifications on human readable computer interfaces. The Fleet Management System 1710 may provide a software program with data retrieval and reporting algorithms, a GUI, and input means for people to interact with the system and retrieve information about the fleet of unmanned vehicles.

Still referring to FIG. 17, for example and without limitation, the off board mission control system 1700 may include functions to remotely manage individual unmanned vehicles 100. In one embodiment, real-time tracking 1710 and video feeds may allow remote operators to control specific unmanned vehicles 100 and to monitor the status of each unmanned vehicle 100 while in mission operation 1720. In another embodiment, human interfaces for remote operators of unmanned vehicles 100 in the form of graphical user interfaces (GUIs), for example and without limitation, may be displayed on human readable devices such as flat screen monitors, tablet devices, and hand held computer and smart phone devices. Off board mission control databases and software programs may register, classify, and execute mission logic that may have inputs and outputs communicated to and from specific sets of unmanned vehicles 100 or individual unmanned vehicles 100.

As illustrated in FIG. 18, in one embodiment, the on board 1600 and off board 1700 systems that may collaborate to control one or more unmanned vehicles 100 may be linked through a common communication network protocol 1810, for example and without limitation, internet protocol (IP). The common network protocol 1810 may be a communication layer that may work in combination with multiple transmission means that may include radio frequency (RF) and satellite microwave between on board 1600 and off board 1700 systems, as well as wired means such as Ethernet on wired networks. In a further embodiment, the off board systems 1700 may have databases and software programs that may operate in concert and on a shared network 1810 that may extend off board remote control of unmanned vehicle 100 sets. In one embodiment, for example and without limitation, a communication network may enable the off board mission system 1700 to advantageously manage and control many unmanned vehicles 100 within communications range of the shared network 1810. In a further embodiment, on board subsystems 1600 of many unmanned vehicles 100 may exchange data and digital signals and, in series, may relay those data and digital signals to an otherwise out of range off board control system 1700, thereby advantageously extending the range of remote control and communication capability across a fleet of unmanned vehicles 100 which may result in coverage of larger operational areas with more unmanned vehicles 100 and fewer human operators.

For example, and without limitation, off-board control systems 1700, which may comprise databases and software programs, may register, classify, and execute mission logic may exchange inputs and outputs with specific sets of unmanned vehicles or with individual unmanned vehicles 100. Such data exchange may be supported by a common network 1810 that may uniquely identify entities on the network to each other. On-board control systems 1600 may equip an unmanned vehicle 100 to behave autonomously and report events experienced by the unmanned vehicle 100. Off-board control systems 1700 may direct the operations of sets of unmanned vehicles, and may have databases and software programs for storing and executing mission logic. The inputs and outputs exchanged across the network 1810 may enable management and control of many vehicles and missions by the off-board control system 1700, thereby advantageously covering larger maritime areas with more vehicles and fewer human operators. The off-board management and control systems 1700 also may advantageously enable management of maintenance and logistics of fleets of unmanned vehicles throughout multiple missions over the life cycles of many vehicles. The characteristics of the unmanned vehicle described above (e.g., autonomous multimode operation, small size, and the ability to deploy a large number of vehicles over a target area) pose a fleet, mission, and vehicle management challenge. As described above, the capability of the off-board system to integrate and communicate with the respective on-board modules of some number of unmanned vehicles may facilitate advantageous fleet management activities, such as registration, tracking, locating, and records maintenance (as described in more detail below).

Figure 19:
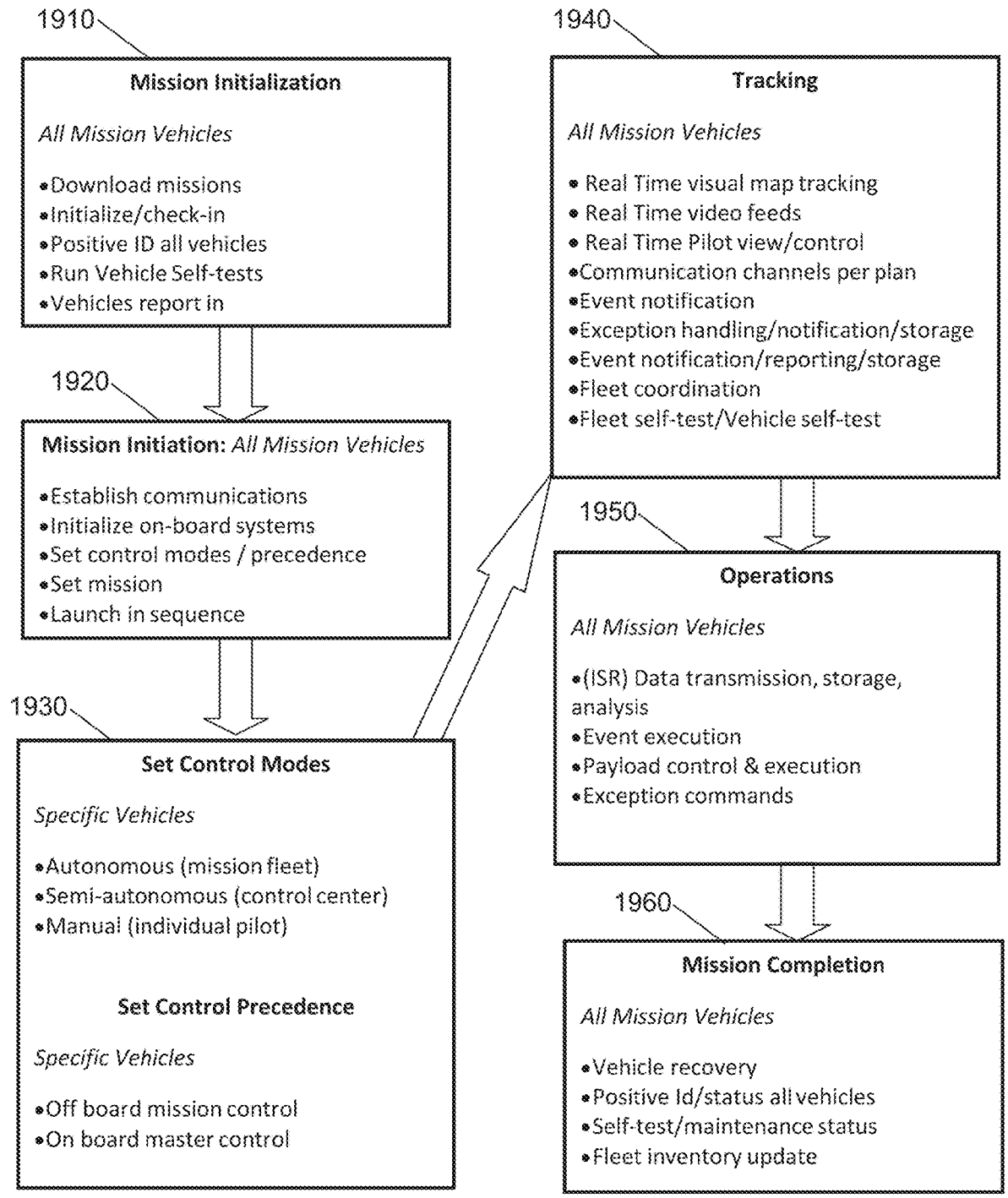
FIG. 19 is a flowchart of a mission control operation for an unmanned vehicle according to an embodiment of the present invention.

Referring now to FIG. 19, mission execution functionality is now described in more detail. A Mission Initialization module (Block 1910) may allow for an orderly and sequential initialization for all mission vehicles. Initialization may include, but is not limited to, the downloading of both critical and non-critical mission data. This data may be secure and/or partitioned data. Initialization also may include, but is not limited to, performance of a "roll call" of all vehicles. This step may provide for a check in of primary, secondary, and/or tertiary platoons of unmanned vehicles. Each vehicle 100 may respond to a roll call with its positive, unique and, as required, encrypted identification. Communication protocols may provide for redundant and periodic identification updates. Initialization also may include, but is not limited to, all unmanned vehicles 100 performing a basic power up self-test (POST) and the reporting of these results. At this stage, the unmanned vehicles 100 may enter the Mission Initiation state (Block 1920), maybe commanded into a dormant state to await further mission instructions, and/or may be outfitted with unique or mission specific payloads.

At Block 1920, mission Initiation may comprise the orderly and sequential initiation for all mission vehicles 100. For example, and without limitation, initiation may include establishing basic and enhanced communication by and between all unmanned vehicles, as well as establishing any external communications dictated by mission needs. Initiation also may include, but is not limited to, the powering up of all on-board systems 1600 and the performance of detailed diagnostic self-tests by all unmanned vehicles 100 involved in the mission (e.g., self-tests of advanced sensors, power systems, control systems, energy systems, and payload systems). At this stage, the initial control modes may be set, the mission directives may be activated, and the unmanned vehicles 100 may be launched either in sequence or in parallel, the latter being advantageous for mass/time critical mission deployment.

At Block 1930, one or more Mission Execution Control and Tracking modules may allow for the control of each unmanned vehicle 100 as an autonomous unit or units, as a semi-autonomous unit or units assisted from a control center, and/or if the situation or mission requires, as a remotely-controlled unit. A remote control unit/user interface may be implemented, for example, and without limitation, as devices such as Droids, iPhones, iPads, Netbooks, Laptops, Joysticks, and Xbox controllers. The control mode precedence may be set prior to the start of the mission. The control system master default precedence may be autonomous mode. In addition, control provisions may be made in unmanned unit logic that may allow a unit to be completely "off the grid" to perform missions that require a high level of stealth, secrecy, and/or security. More specifically, these units may act as their own master and may be programmed to initiate communications at predefined intervals that may be modified as required. These units also may have the ability to go dormant for extended periods of time, which may further support the ability for unmanned vehicles 100 to perform virtually undetectable mission execution.

At Bloc, 1940, the Mission Execution Control and Tracking modules also may allow for the real time tracking of all unmanned vehicles 100. This capability may include methods such as satellite tracking, GPS tracking, and transponder based tracking. Communication channels may be redundant and may utilize various levels of military encryption. Tracking may be performed at the fleet level, yet may also support the ability to zoom in on a specific unmanned vehicle 100. The specific unmanned vehicle tracking data may be overlaid with detailed data such as live video feeds, real time pilot perspective viewing, sensor displays, and other relative data. Analysis of sensor data by on-board control systems may detect "events" of interest. Data characterizing these events may be stored in the unmanned vehicle on-board control system logic, and may be reported a message transmitted to the Mission Control System. For example, and without limitation, an event may be defined as a positive identification of a particular target. Periodic vehicle and fleet level self-tests for tracking may occur as background tasks. These self-tests may flag and log exceptions detected, as well as may send a notification to the Mission Control System depending on the class of the exception.

At Block 1950, the Mission Execution Operations module may define how the unmanned units 100 perform operational tasks. During a mission, as a primary function, the unmanned vehicle 100 may monitor its ISR (or similar) sensors, as well as sensor input received from external sources (e.g., other unmanned vehicles in the fleet, Mission Control inputs) on a real time basis. As part of this monitoring process, exception handling may be performed. Computational logic may then be performed that may include analysis, decision making, and the execution of a series of tasks to fulfill mission parameters. Also during a mission, as a secondary function, the unmanned vehicle may monitor its payload sensors. As in the case of primary monitoring, exception handling, analysis, decision making and mission task specifically related to payload may be performed.

At Block 1960, the Mission Completion module may be designed to close out the unmanned fleet after a mission, may status all vehicles, may perform any required maintenance of the vehicles, and/or may return them to fleet inventory ready for the next mission. Vehicle recovery may be performed in multiple ways. For example, and without limitation, unmanned vehicles may be driven to a pickup point or recovered on location. The unmanned vehicles 100 may be recovered directly by military personnel, military equipment, by other vehicles in the unmanned fleet and similar recovery methods. The unmanned vehicles 100 may be recovered either above or below water, as well as shore or rivers edge, and similar locations. Before, during, or after recovery operations, the identity of each unmanned vehicle 100 may be checked, demanded self-tests may be performed, and the status may be reported. Any required vehicle maintenance may be performed including checking all internal and external systems. At this point, the unmanned vehicle may be returned to the fleet and the inventory status may be updated.

Tying the mission-level actions more specifically to on board actions in response, upon vehicle initialization (Block 1910), the Control System Master 1510 may issue a startup command across a computer network to prompt the on board mission control system 1600 to perform self-test and operational feedback, and to send an on-line status back to the Control System Master 1510. At Block 1920, the on board mission system 1600 then may issue start up commands to all other on-board systems. Each system may start up, perform a self-test, and forward success or failure messages across the network to the Control System Master 1510. The Control System Master 1510 may be configured 1700 to start up in autonomous or manual control mode, and also may be configured with a designator of the current mission (Block 1930). If in manual control mode, a ready signal may be sent to the Control System Master 1510 and the on board systems may await manual commands. If in autonomous control mode, the on board control system 1600 may be activated with the designator of the current mission and the Control System Master 1510 may hand off primary control to the on board control system 1600. The Control System Master 1510 may be given back primary control if the on board control system aborts, is diagnosed as malfunctioning, or is over-ridden by manual control. The on board control system 1600 may be programmed with mission segments that define navigational, sensor, and payload operating characteristics in a time and logic sequence. At Block 1950, the on board control system 1600 may issue continually updated instructions to vehicle subsystems as to course and speed (e.g., vector), mode of operation (air, water surface, subsurface), sensor data collection, stealth, payload operation, and interaction with external environments, events and entities. The on board control system 1600 may receive a continuous stream of data from sensors and may interrogate sensors for more granular data through instructions to the sensor system. The on board control system 1600 may issue higher level instructions to subsystems that are decomposed by the vehicle control subsystems into more specific instructions. This decomposition of more general instructions to more specific instructions may be a multi-level process that may result in specific signals consumable by vehicle devices and mechanisms. For example, the on board control system 1600 may issue an instruction to the navigation control system 1500 to navigate in a directional heading, within a speed range having maximum endurance. The navigation control system 1500 may execute logic and may, in turn, issue lower level instructions over the computer network to the subsystems it controls. The on board control system 1600 may also issue instructions to a power control system 1610 for maximum endurance; a perception-reaction system 1605 as to allowable reaction parameters; the device rack control system 1620 as to device rack orientation; the payload system 1630 as to current operational behavior; the communication control system 1640 as to channels and formats of communication; the sensor control system 1650 as to the environmental sensors to activate and the parameters for each as well as the sensor data to collect; and an external system interaction control system 1680 as to current behavioral attributes. All control subsystems may provide continuous status messages to the on board control system which may multiplex input status messages and may have logic to translate incoming message and sensor data into instructions back to the subsystems.

Figure 20:
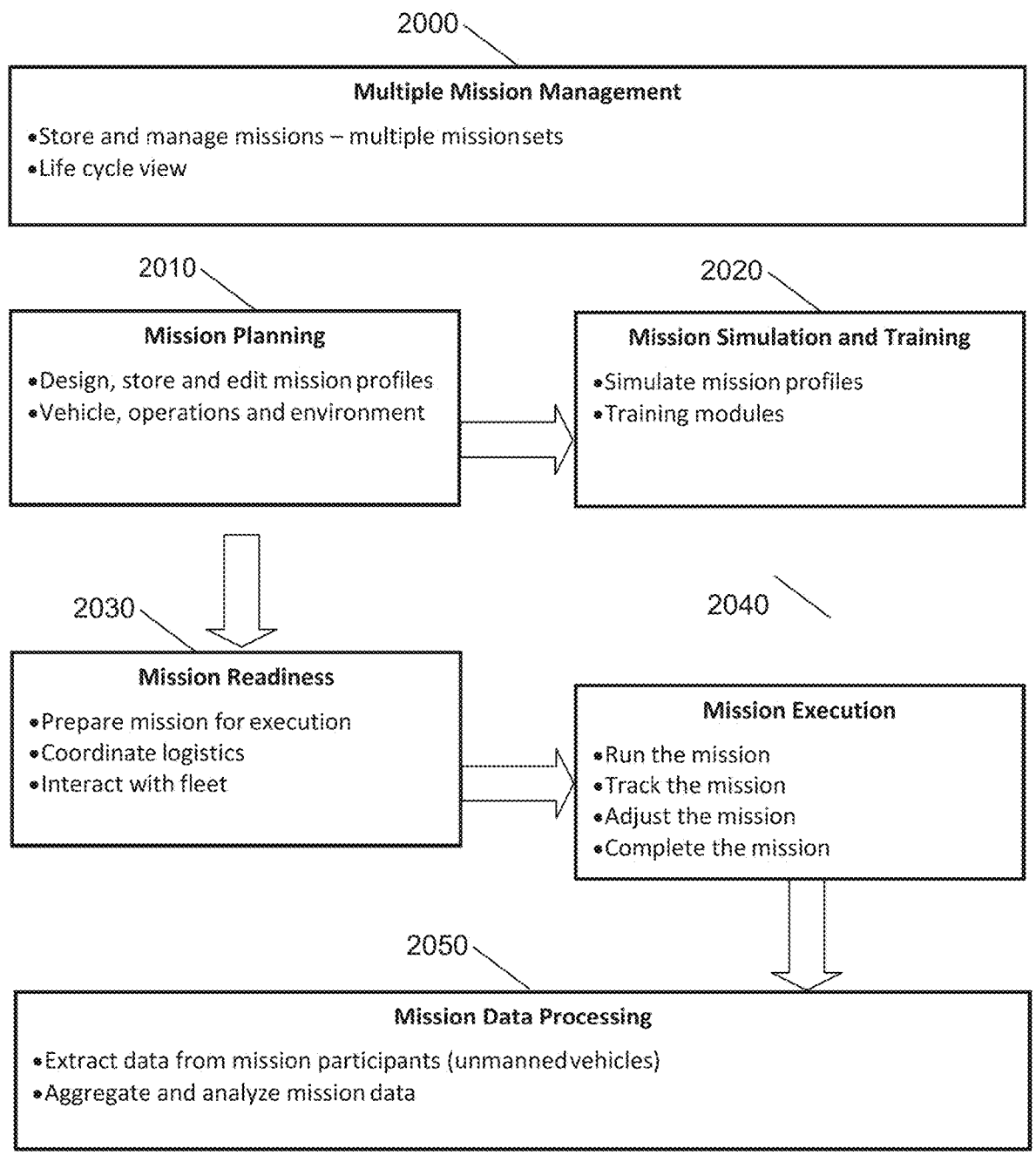
FIG. 20 is a flowchart of a mission management operation for an unmanned vehicle according to an embodiment of the present invention.

Referring now to FIG. 20, an automated Multiple Mission Management 2000 process may provide a set of sub-systems that may enable a complete, end-to-end capability for planning and executing a number of concurrent missions, which may be advantageous within a large maritime target area wherein a number of missions may be required to successfully cover the area. For example, many coastal areas are made up of a combination of a large open area, a number of zones close to shore with different characteristics, populated harbors, and riverine zones that extend well inland. In such a diverse target area, unmanned vehicles may be air dropped or deployed (man portable) to small surgical inland targets.

The concept of a "mission" may be specific to each unmanned vehicle 100, and/or may be aggregated across sets of unmanned vehicles. The Multiple Mission System may enable the management of multiple missions throughout the entire mission life cycle. When missions are initiated, they may be recorded by the Multiple Mission System and then throughout each mission life cycle may be tracked, updated, and executed. The Multiple Mission System also may manage concurrently executing missions and may provide a security capability to allow access to only authorized users. Employing the systems and methods described above, the present invention may enable the use of many unmanned vehicles 100 to cover large maritime areas with minimal operators at a fraction of the cost compared to conventional approaches to cover the same area.

Continuing to refer to FIG. 20, a Mission Planning module 2010 may support modeling of trial missions that employ unmanned vehicle capabilities. More specifically, the Mission Planning module 2010 may allow for constructing coverage grids, time-on station duty cycles, communication parameters, perception-reaction attributes, rules of engagement, rules of notification, exception handling rules, and payload operation. The Mission Planning module 2010 also may allow overlaying the vehicle 100 paths on an accurate digital map of the target coverage area and also may include underwater mapping. For example, and without limitation, the modeling capability described above may be used to simulate missions of fleets of unmanned vehicles 100. Such simulation may be advantageous for purposes of training and/or for planning and strategy.

For example, and without limitation, a Mission Simulation and Training module 2020 may enable mission plans to be "run virtually" with various scenarios including variations in weather, sea state, and external system encounters. Operators may interject simulated manual control of unmanned vehicles. The Mission Simulation and Training module 2020 may provide a valuable estimate as to the likely success of the planned mission under various scenarios.

Also for example, and without limitation, a Mission Readiness module 2030 may enable planned missions to become ready for execution. When a planned mission is put in "prepare" mode, the mission preparation module may interact with the Fleet Management systems 1710 to determine logistics activities and may enable the user of the system to assemble a mission fleet of unmanned vehicles 100. Mission Preparation functionality may provide tracking and reporting functions to allow the user to know the state of mission readiness.

Also for example, and without limitation, a Mission Execution System 2040 may provide the functions necessary to begin and complete a successful mission of a fleet of unmanned vehicles 100. FIG. 19 illustrates a high level flow diagram of exemplary functions provided by the Mission Execution System modules.

Also for example, and without limitation, a Mission Data Processing System 2050 may receive and record mission data transmitted from the unmanned vehicles 100. A majority of missions may be presumed to relate to data gathering for intelligence, surveillance and reconnaissance (ISR) purposes. The Mission Data Processing system 2050 may collect and process large amounts of data, and may extract the most useful information out of the data in near real time. The Mission Data Processing system 2050 may perform complex data pattern processing in addition to raw storage and reporting.

Figure 21:
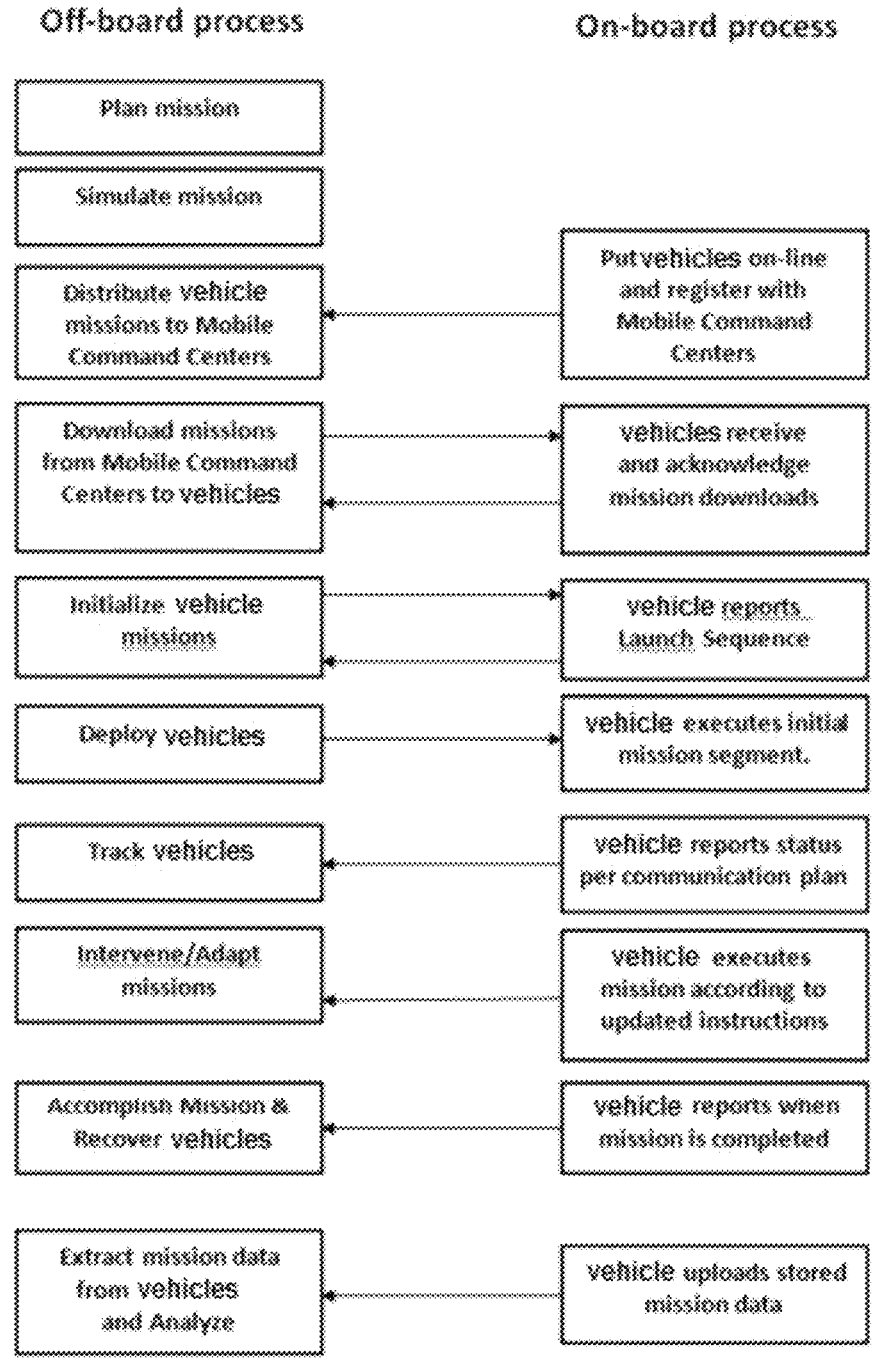
FIG. 21 is a flowchart of a mission planning and execution lifecycle according to an embodiment of the present invention.

FIG. 21 illustrates an embodiment of integrating various off-board management and control processes with on board control processes of a set of unmanned vehicles 100. For example, and without limitation, a mission may be planned and simulations of a mission may be run in a data center in the United States, subsequently may be made available to a mission control center in East Africa. The mission control center may check for fleet availability to populate the mission and may transmit a request through secure communication channels for unmanned vehicles. A vehicle repository that may be, for example, and without limitation, controlled by military personnel or military subcontractors in Europe, may process the request. Unmanned vehicles in Europe may be run through maintenance diagnostics to validate readiness, then may be loaded on transport aircraft equipped with unmanned remote launch apparatus. The loaded unmanned vehicles may be flown to a target area off the coast of East Africa, and may be air dropped over a pre-planned pattern in accordance with the mission planned in the United States. Mission execution responsibility may be transferred to a mission control center in the Middle East, again through secure communication channels. After the mission is concluded, fleet management may be transferred back to a control center in Europe, and the unmanned vehicles may be retrieved by or driven to designated destinations (either mobile or static). Upon successful retrieval, the unmanned vehicles involved in the complete mission may be returned to the vehicle repository.

Swarming may be defined as a deliberately structured, coordinated, and strategic way to strike from all directions, by means of a sustainable pulsing of force and/or fire, close-in as well as from stand-off positions. Swarming involves the use of a decentralized force in a manner that emphasizes mobility, communication, unit autonomy, and coordination/synchronization. In the context of unmanned vehicles, "swarming" relates to coordinating a collection of vehicles such the vehicles' movements are orchestrated in relation to each other.

In one embodiment of mission planning and control, multi-mode swarm control advantageously solves the problem of having a number of unmanned vehicles each moving in its own pre-determined path in a coordinated spatial and time pattern where the unmanned vehicles are in close proximity. Unmanned vehicle swarms may locate a collection of unmanned vehicles in a target zone at desired times and locations. The unmanned vehicles may proceed at a collection of coordinated paths and speeds. Paths may defined by geo-coordinates (e.g., latitude and longitude) and depth (e.g., altitude), so that paths may be said to be "three dimensional". Additionally, a swarm may include a number of unmanned vehicles deployed by air drop following a pre-determined glide path. Unmanned vehicle multi-mode swarm technology may include coordinated on-board and off-board control. By contrast, conventional swarm control involves swarming in one "mode", meaning vessels operate in one of three modes (e.g., air, surface, sub-surface) rather than in two or three modes. As described herein, multi-mode control guides unmanned vehicles in three modes. A single unmanned vehicle may traverse multiple modes executing a transit route.

Figure 22:
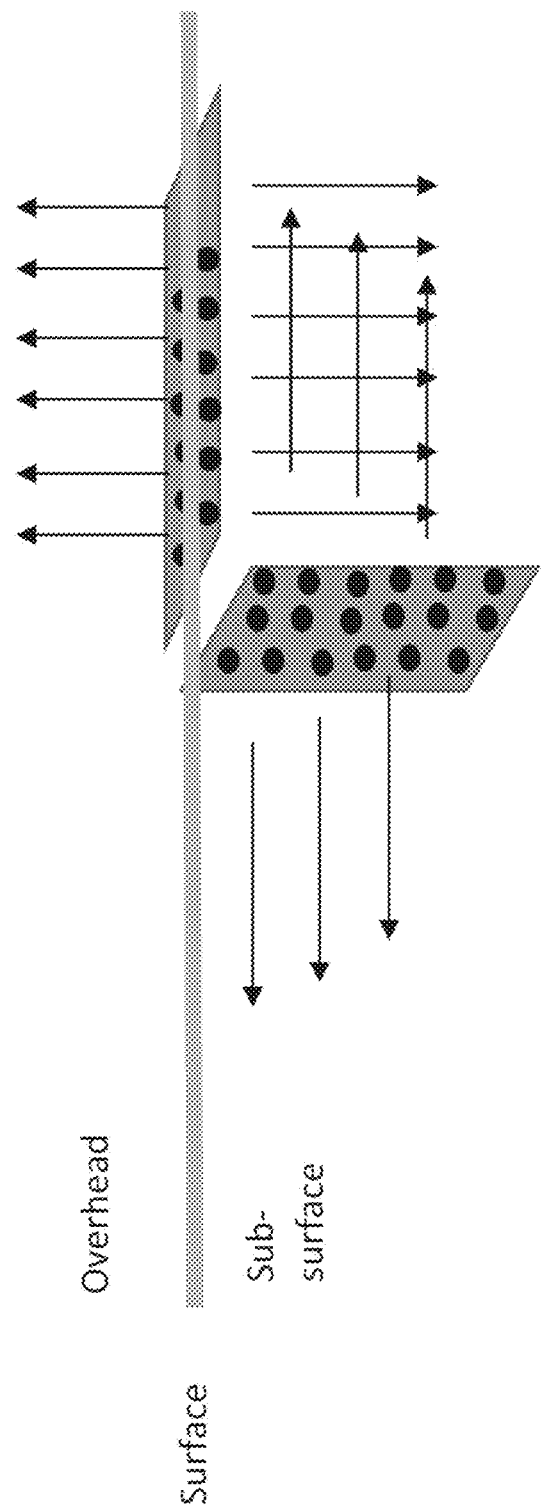
FIG. 22 is a schematic overview of an exemplary three-dimensional coverage grid for a mission planning and control system according to an embodiment of the present invention.

As described above, a military mission may have a specific objective in a specific area, and may be time-bound. Multi-mode swarm, as described herein, may be accomplished at the mission level. As illustrated in FIG. 22, three-dimensional (3D) deployment may be considered a special category of multi-mode swarm control driven by the mission planning. 3D Deployment missions may be accomplished on a global scale, although the mission "target zone" may be in a concentrated and designated area. Swarms, in such a scenario, may be comprised of one or more groupings, and such groupings may be hierarchically organized (e.g., analogous to military units: team, platoon, squadron). A mission plan, in this same scenario, may be thought of as a set of mission maps.

For example, and without limitation, a 3D Deployment may comprise an air-drop of a squad (10) of unmanned vehicles, deployment of a platoon (40) of unmanned vehicles off of a ship, and deployment of a team (4) of unmanned vehicles out of a submarine. For example, and without limitation, each of the unmanned vehicles may be equipped with a collision avoidance system (CAS) which may provide awareness of proximate vehicles and/or objects.

In one embodiment of a basic swarm method, each unmanned vehicle may be loaded with a mission track (e.g., one or more transit paths) with location, speed, time, and path tolerance. Missions may be coordinated such that involved unmanned vehicles' paths do not collide. In the example embodiment, each group may proceed from the "drop zone" on a transit path specified by the off-board control system. At a specified time, each group may proceed to its own specified location, at which point the swarm may be considered to have achieved platoon size. Each grouping may be deployed to a location that may be a specified distance from a target. Upon a specified schedule, all mission assets (e.g., unmanned vehicles) may move toward the mission target zone, each executing planned movements in support of the mission and, as appropriate, executing autonomous movements in response to unplanned stimuli but no so as to jeopardize the mission. For example and without limitation, planned movements may call for the air dropped squad to split off into two teams, for the platoon to split into four squads, and for the team to stay intact. In such a manner, all vessels and groups in the swarm may be coordinated over time, 3D location, and transit path.

Figure 23:
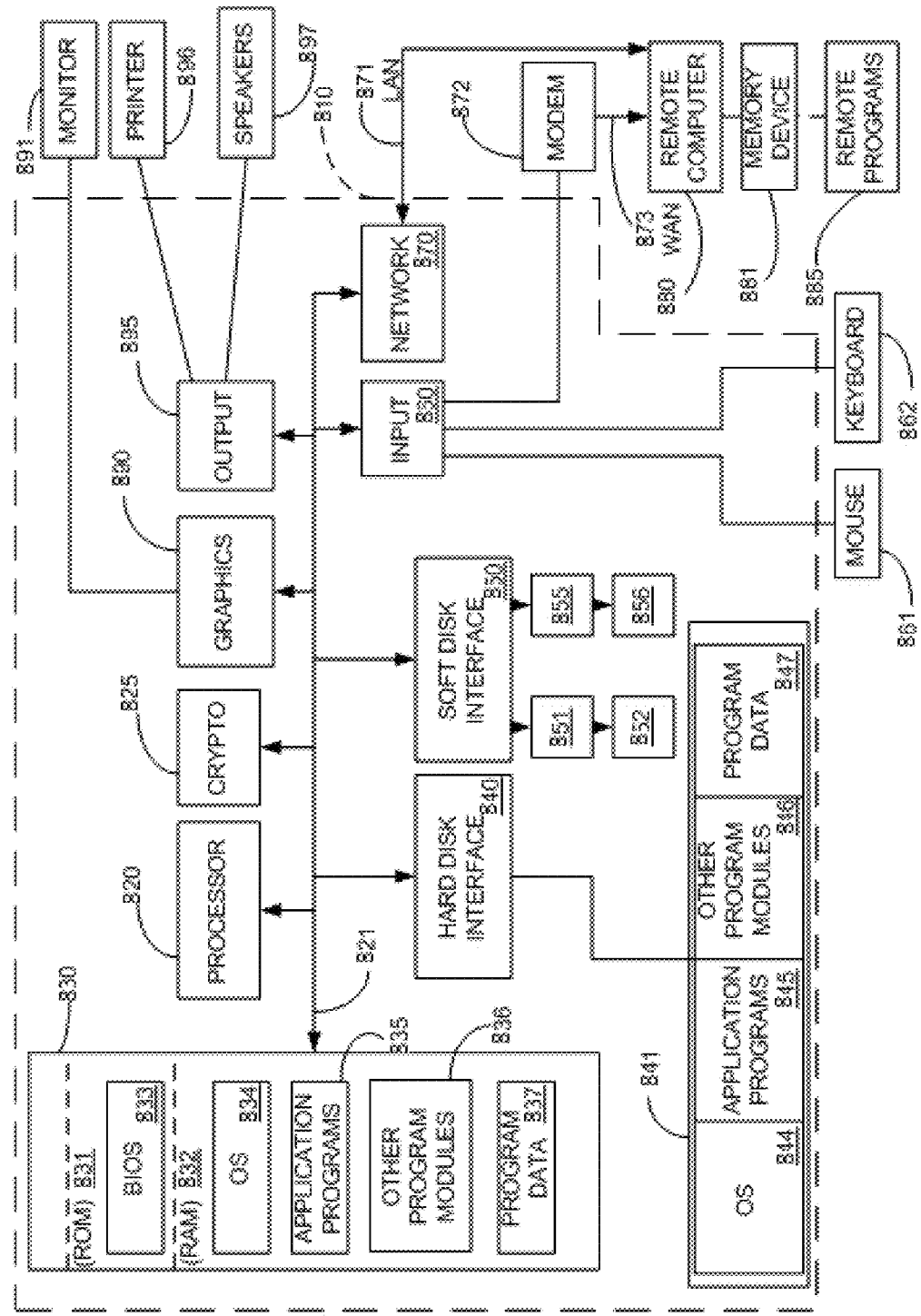
FIG. 23 is a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 23 illustrates a model computing device in the form of a computer 810, which is capable of performing one or more computer-implemented steps in practicing the method aspects of the present invention. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

A computer 810 typically includes a variety of computer readable media. Computer readable media can be any available media that can be accessed by a computer 810 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random-access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 23 illustrates an operating system (OS) 834, application programs 835, other program modules 836, and program data 837.

The computer 810 may also include other removable/non-removable, volatile/nonvolatile computer storage media. By way of example only, FIG. 23 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 23, provide storage of computer readable instructions, data structures, program modules and other data for the computer 810. In FIG. 23, for example, hard disk drive 841 is illustrated as storing an OS 844, application programs 845, other program modules 846, and program data 847. Note that these components can either be the same as or different from OS 833, application programs 833, other program modules 836, and program data 837. The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 23. The logical connections depicted in FIG. 23 include a local area network (LAN) 871 and a wide area network (WAN) 873, but may also include other networks 140. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 23 illustrates remote application programs 885 as residing on memory device 881.

The communications connections 870 and 872 allow the device to communicate with other devices. The communications connections 870 and 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media. Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

With additional reference to FIGS. 33-41, another embodiment of an unmanned vessel will be described. The unmanned vehicle according to this embodiment is configured for semi-submersible launch and recovery of payload objects. Of course, such embodiment may include any of the features described above with respect to other embodiments. As will be described in further detail below, the present embodiments include a well-deck built into a hull (e.g., a catamaran-like hull) and include the ability to flood the stern of the host vessel, the ability to control buoyancy through a buoyancy control system, and/or the ability to control water depth in the well deck and pitch of the well deck by controlling the center of buoyancy. The ability to position the host vessel in an advantageous position and orientation, may also be provided so the payload can most effectively be launched and recovered. Positioning is relative to the payload and environment which may be particularly important in higher sea states.

It should be noted that the present embodiment preferably provides the ability of the host vessel to navigate autonomously with high performance characteristics when not flooded, the ability of the host vessel to maintain headway and navigate while the well deck is flooded, and/or the ability of the host vessel to sense location and position of launched and recovered payload objects as they move away or toward the well deck.

For this description the payload objects are unmanned vessels, such as unmanned surface vessels ("USV"), unmanned underwater vessels ("UUV") or remote operated vehicles ("ROV") that can be free-launched or launched using a winched tethered tow, for example.

Figure 33:
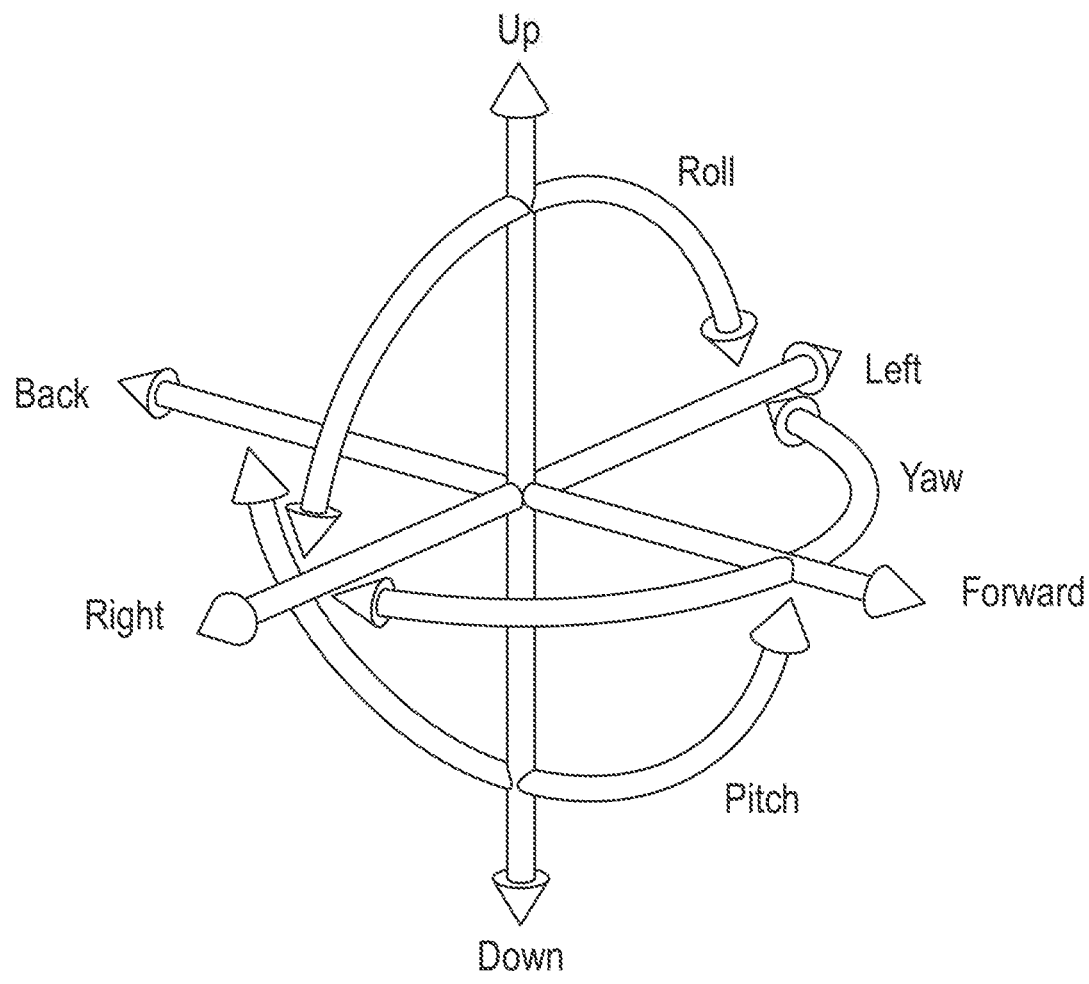
FIG. 33 is a schematic diagram illustrating the six degrees of freedom related to the operation of an unmanned vehicle according to embodiments of the present invention.

Initially, referring to FIG. 33, a diagram is shown that illustrates the six degrees of freedom related to the operation of an unmanned vehicle according to embodiments of the present invention. A position of the well deck is preferably controlled within six degrees of freedom including roll, pitch, yaw, up/down, forward/reverse and right/left.

Figure 34:
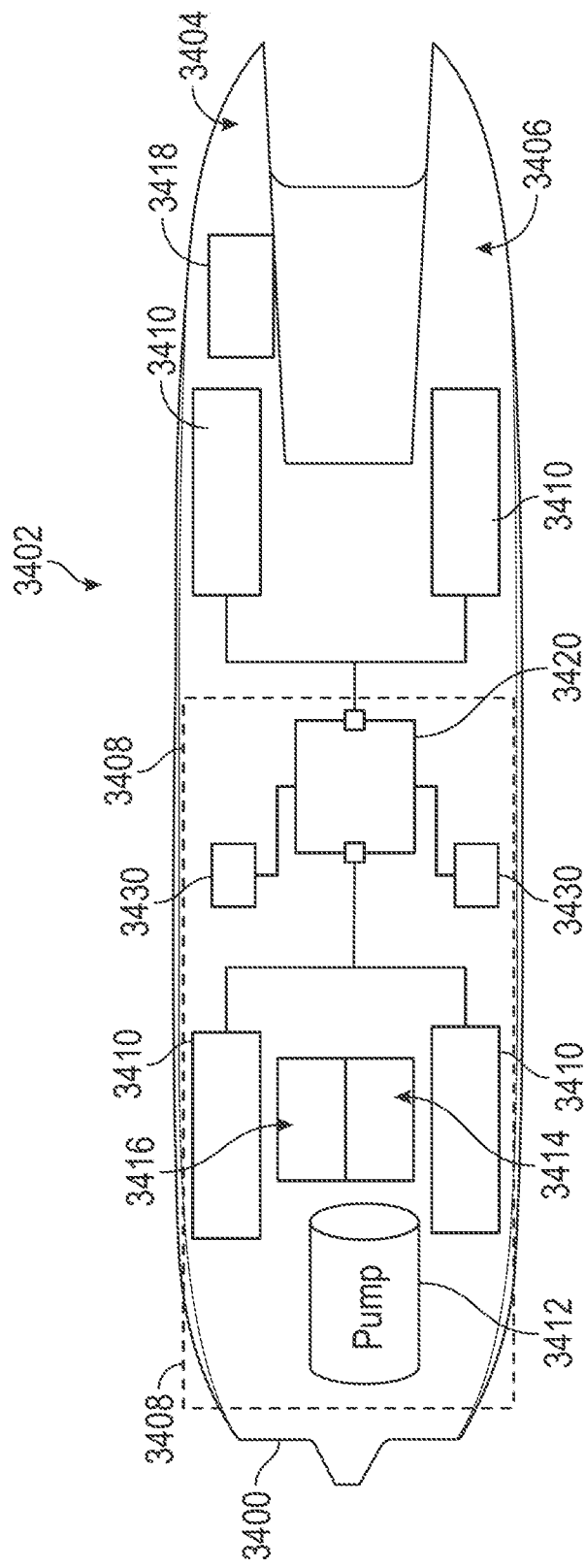
FIG. 34 is a schematic diagram illustrating the layout of a buoyancy control system for an unmanned vehicle according to an embodiment of the present invention.

FIG. 34 is a schematic diagram illustrating the layout of a buoyancy control system 3402 for an unmanned vehicle 3400 according to an embodiment of the present invention. In this embodiment, the example of an unmanned vehicle 3400 includes many features described above but is not limited thereto. Other combinations of features described herein are contemplated as would be appreciated by those skilled in the art. Here, the vehicle body may include a pair of substantially parallel sponsons 3404, 3406 coupled together on opposite sides of a recessed well deck 3408 in a stern portion of the vehicle body. The recessed well deck 3408 is configured to stow a payload as will be described below.

Although not shown here, a propulsion system is configured to propel the unmanned vehicle 3400, a maneuvering system is configured to maneuver the unmanned vehicle, and a vehicle control system is configured to control a speed, an orientation, and a direction of travel of the unmanned vehicle in combination with the propulsion system and the maneuvering system. Various embodiments of such systems are described above with reference to FIGS. 4-15 and are not described again here. A sensor system includes a plurality of environmental sensors configured to sense environmental and operational characteristics for the unmanned vehicle, and at least one power supply is configured to provide power to the propulsion system, the maneuvering system, the vehicle control system, the buoyancy control system, and the sensor system, as also described above with respect to other embodiments.

As described above with reference to FIG. 6, the ballast system may contain mechanisms to control the volume of water and air in one or more ballast chambers to advantageously vary the buoyancy of the unmanned vehicle while submerged and to support selective submerging and re-surfacing of the unmanned vehicle. The ballast system may also be known as the buoyancy system because the system may provide for the selective submerging and re-surfacing of the unmanned vehicle by varying buoyancy. The ballast control mechanism may include piping and ports to enable the flow of water into and out of ballast chambers. Electric water pumps may be activated by the ballast control system to control ballast levels which may be monitored by ballast sensors.

For the buoyancy control system 3402, ballast containers 3410 are positioned within portions of the vehicle body. A pump 3412 and valves 3414, 3416 define a pump and valve system that is configured to vary amounts of water and air in the recessed well deck 3408. Various other pumps and valves, described above with reference to FIG. 6, may be included to vary the amount of water and/or air in the ballast containers 3410. The ballast containers 3410 preferably include at least a ballast container located forward and aft in each of the sponsons 3404, 3406 to define four quadrants of buoyancy for the unmanned vehicle 3400. More than four ballast containers 3410 is also contemplated. The buoyancy control system 3402 may include a buoyancy controller 3420 that is configured to individually control the relative buoyancy in each of the four quadrants and the total buoyancy of the unmanned vehicle 3400. Various sensors, including imaging sensors 3430, may also be provided and will be described in more detail below.

Water is filled in the recessed well deck 3408 via a combination of the water pump 3412 and actuated valves 3414, 3416 that allow water into and out of the hull. An air valve 3418 may be used to control air flow in and out of the recessed well deck 3408 of the hull. The pump 3412 may also pump water out. The recessed well deck 3408 can accept water in the hull without damaging internal components as it is designed to be flooded through the use of various seals and channels, not shown, as would be appreciated by those skilled in the art. The combination of total water in the well deck 3408 and the four-quadrant buoyancy control enables control of at least three of the six degrees of freedom: pitch, roll and up/down.

The vehicle control system or navigation control system 1500, as the on-board governor of the speed, direction, and orientation, will control the other three of the six degrees of freedom: yaw, forward/reverse and right/left.

Figure 36:
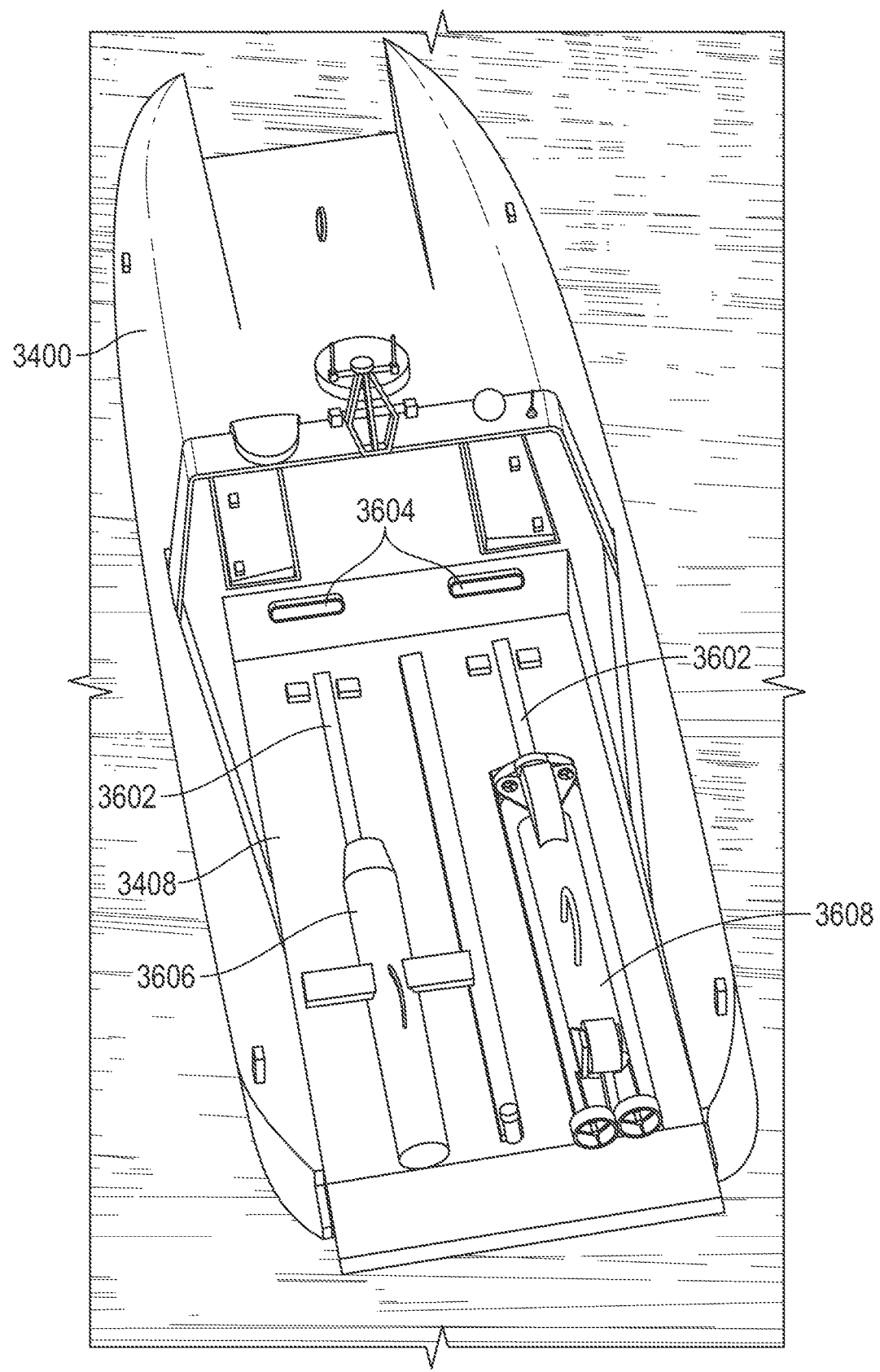
FIG. 36 is a top view illustrating a semi-submersible launch and recovery unmanned vehicle according to an embodiment of the present invention.
Figure 37:
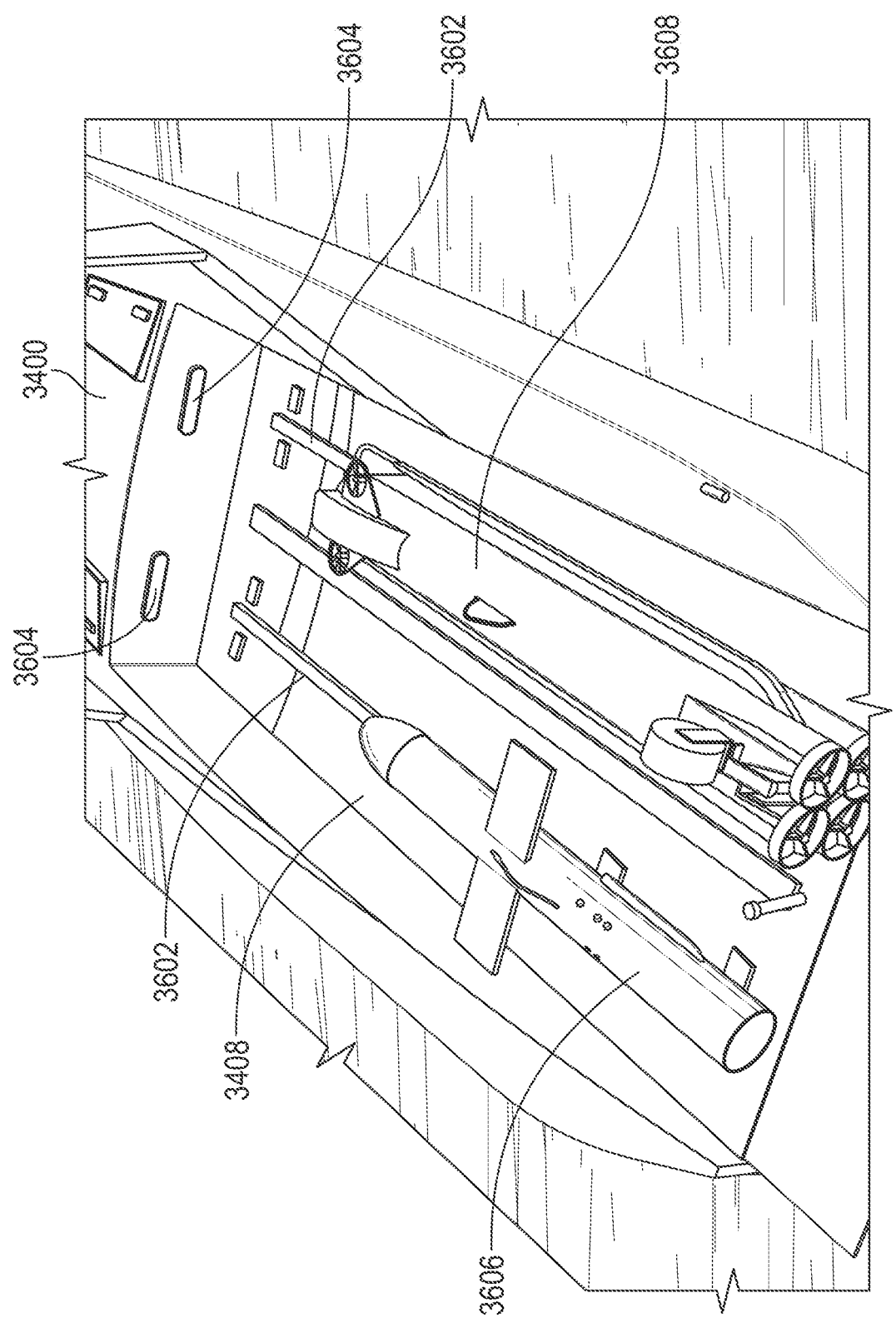
FIG. 37 is a perspective rear view illustrating the semi-submersible launch and recovery unmanned vehicle of FIG. 36 on the surface of the water.

Referring additionally to FIGS. 36 and 37, the recessed well deck 3408 includes a payload securing system that may include supports 3602 or cradles or similar structures into which the payload objects 3606, 3608 (e.g., USV/UUV/ROVs) sit for stability during transit. FIG. 36 is a top view illustrating a semi-submersible launch and recovery unmanned vehicle according to an embodiment of the present invention. FIG. 37 is a perspective rear view illustrating the semi-submersible launch and recovery unmanned vehicle of FIG. 36 on the surface of the water.

The supports 3602 and may have an automated apparatus 3604 to secure the payload objects. For example, for winched tethered tow, the automated apparatus 3604 may include tether lines 3605 that connect to an autonomously controlled reel at a fixed end, and attach to the payload objects 3606, 3608 at a free end. The tether lines may be multi-purpose to both convey data and power between the USV/UUV/ROVs and the UMMV, as well as mechanically tow the USV/UUV/ROVs.

Figure 35:
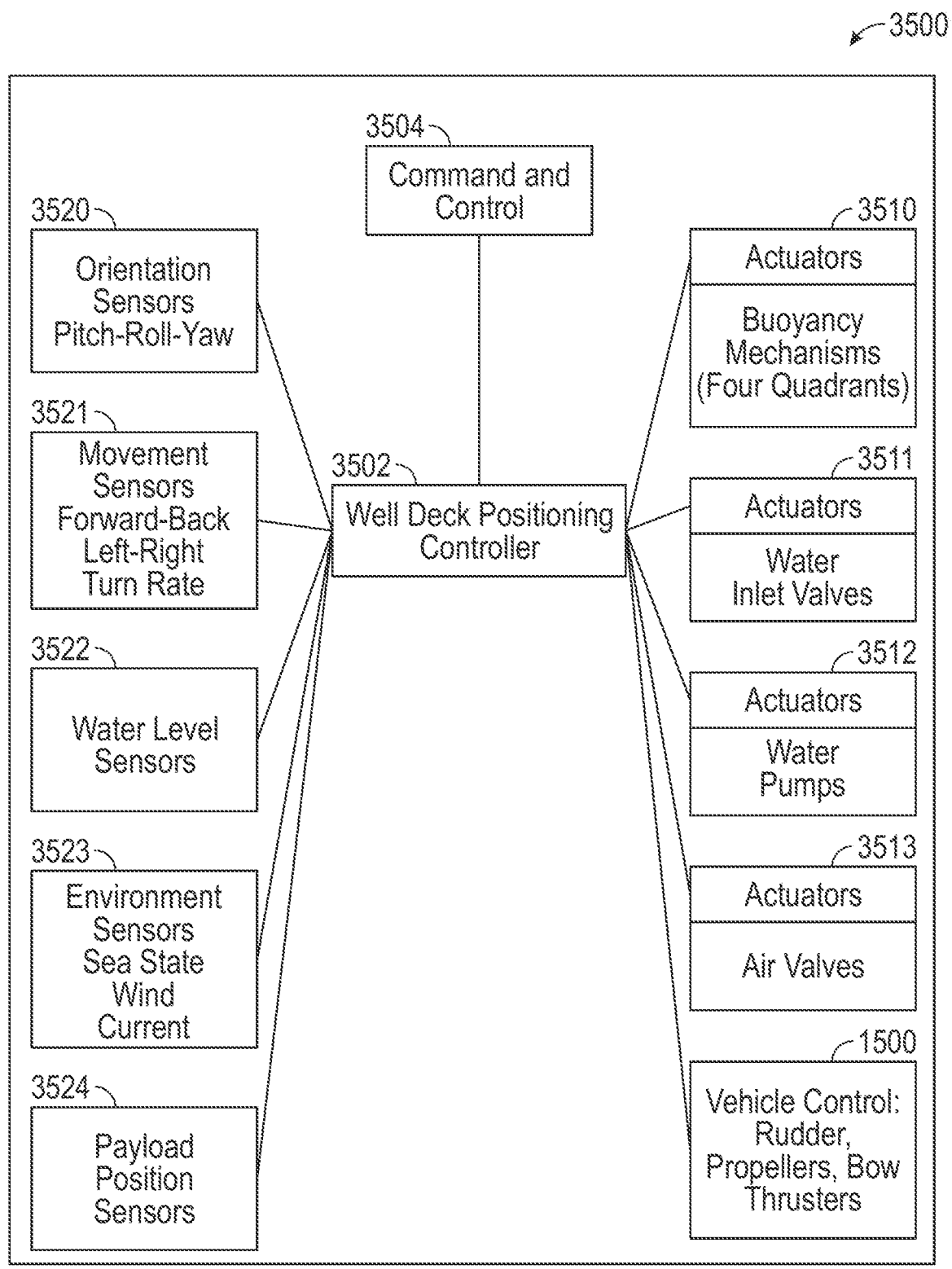
FIG. 35 is a schematic block diagram illustrating components defining a well deck position control system for an unmanned vehicle according to an embodiment of the present invention.

The vehicle control system 1500, the buoyancy control system 3402 and the sensor system 1650 define a well deck positioning control system 3500 (FIG. 35) configured to launch and recover objects 3606, 3608 of the payload to/from the water while the well deck 3408 is at least partially submerged in water. FIG. 35 is a schematic block diagram illustrating components defining the well deck position control system 3500 for an unmanned vehicle 3400 according to an embodiment of the present invention. The well deck positioning system 3500 may include a well deck positioning controller 3502 configured to provide output signals to actuators 3510-3513 of the buoyancy control system 3402 and to the vehicle control system 1500 in response to input signals from sensors 3520-3524 of the sensor system. Thus, the well deck positioning control system 3500 is a feedback control system taking instructions from the command and control block 3504 as set points, using sensor inputs to determine feedback signals and provide output signals to actuators.

The command and control block 3504, which may be under operator direction, or receive autonomous instructions as described above, sends positioning instructions to the well deck positioning controller 3502. Such instructions may include well deck pitch, well deck depth, well deck heading, well deck turn rate or well deck pitch rate, for example. The well deck positioning controller 3502 sends position information back to the command and control block 3504. The sensors may include orientation 3520, movement 3521, water level 3522, environment 3523 and payload position 3524. These sensors 3520-3524 provide feedback to the well deck position controller 3502. The actuators 3510-3513 control flooding of the well deck 3408 and ballast containers 3410 via the four buoyancy mechanisms, water inlet valves, water pumps, air valves and vehicle movement.

An embodiment at least includes the plurality of environmental sensors 3430 including, for example, water level sensors 3522 configured to sense water levels in the ballast containers 3410 and the recessed well deck 3408, and payload position sensors 3524 configured to sense the position of the payload relative to the payload securing system 3602/3604 and the recessed well deck 3408.

Figure 38:
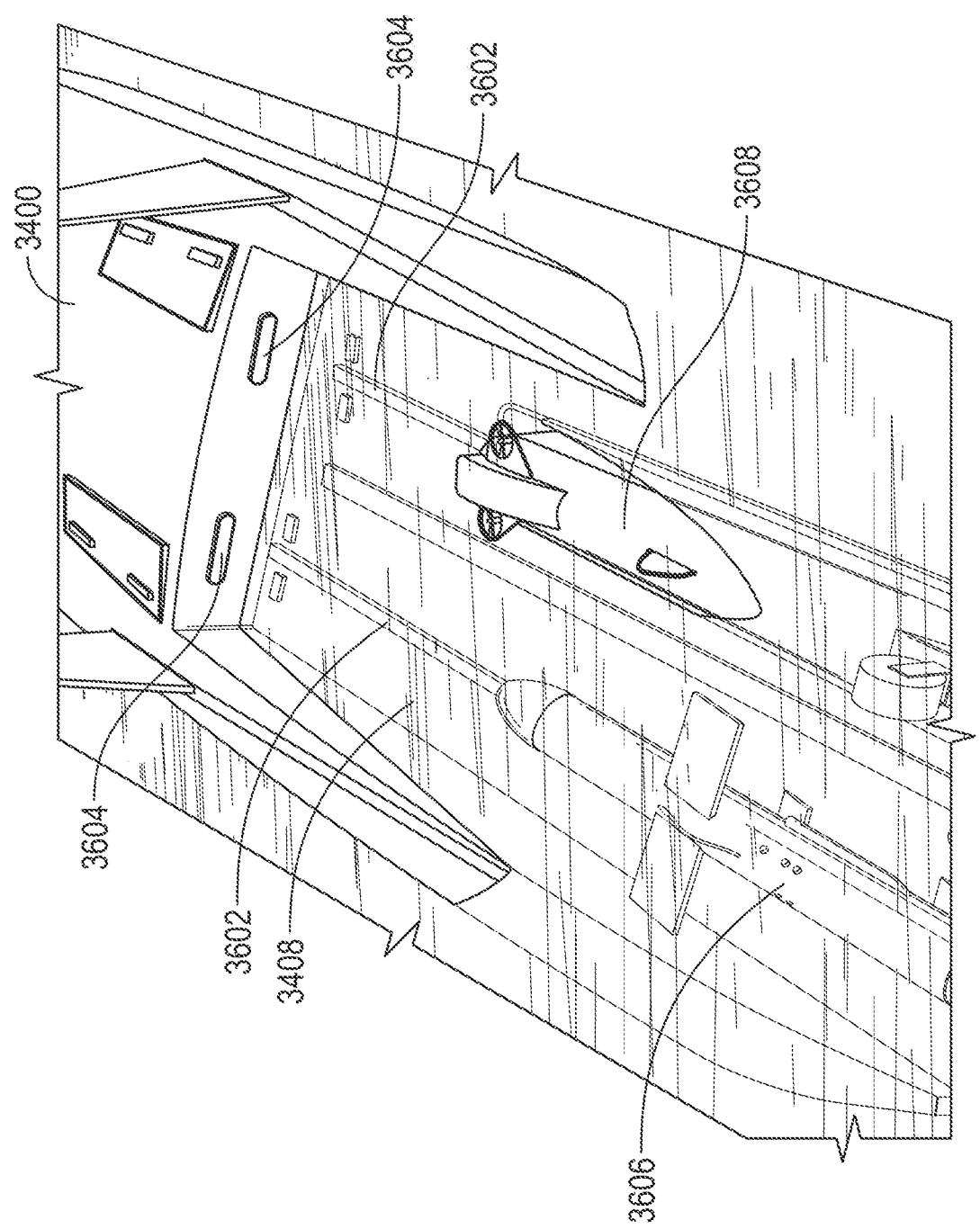
FIG. 38 is a perspective rear view illustrating the semi-submersible launch and recovery unmanned vehicle of FIG. 36 partially submerged below the surface of the water.

The launch process begins when the UMMV 3400 initiates a launch sequence request from a remote operator or from internal logic executing autonomous mission logic running on resident control systems as described above. The entire sequence of launch and recovery may be under control of the on-board control systems on the UMMV 3400. The UMMV 3400 floods the recessed well deck 3402, e.g., in the stern section of the vessel to the mid-ship, by opening flood valves and activating flooding pumps if faster flooding is desired. FIG. 38 is a perspective rear view illustrating the semi-submersible launch and recovery unmanned vehicle 3400 of FIG. 36 partially submerged below the surface of the water.

Water level monitoring sensors 3522 in the well deck 3408 provide feedback to the controller 3502 which also monitors pitch and roll 3520. Additionally, the buoyancy control system 3402 controls the amount and location of flotation. The buoyancy control system 3402 controls the depth of water in the well deck 3408 and the pitch of the well deck by controlling the amount of flooding and center of buoyancy while monitoring water level and pitch sensors.

Figure 39:
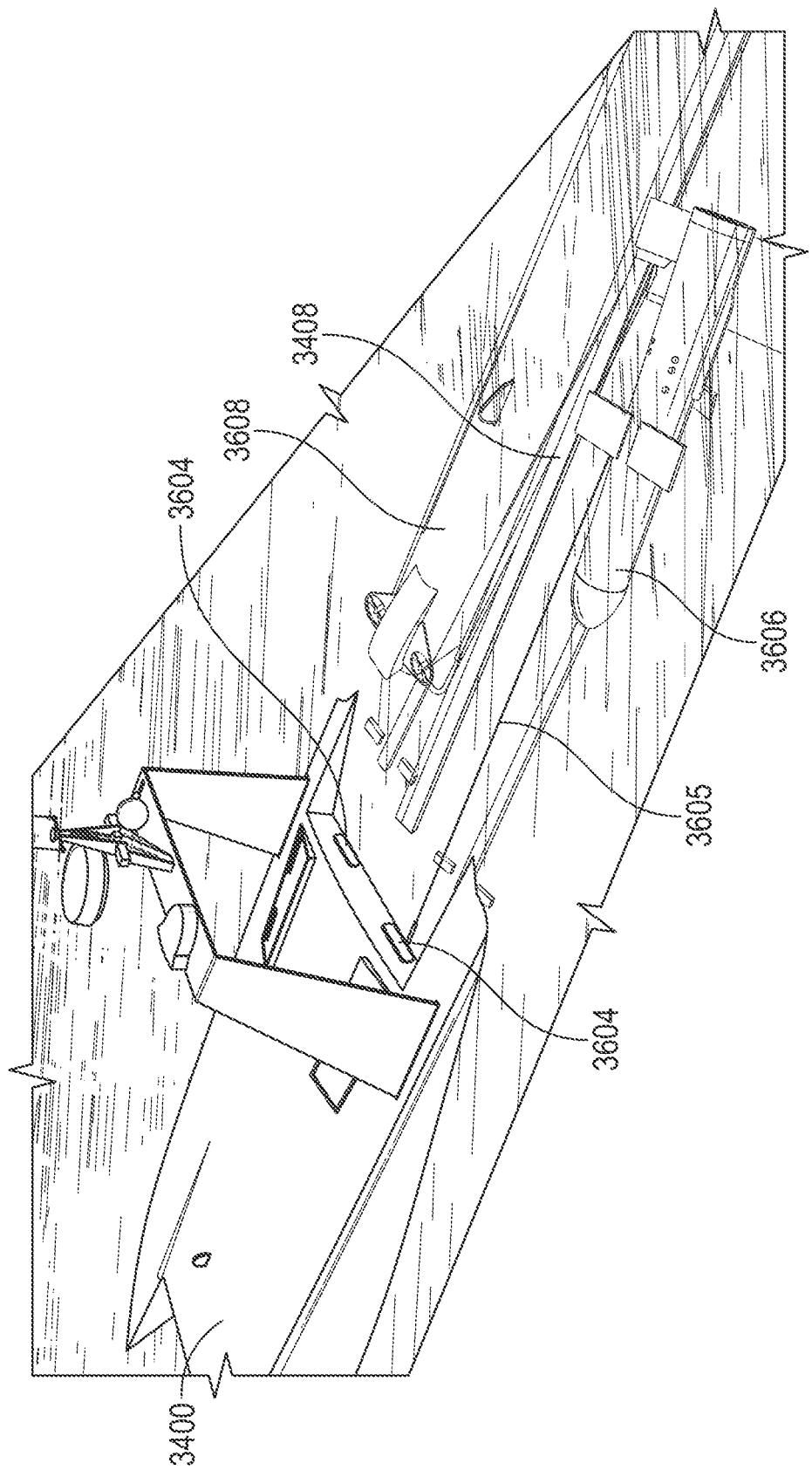
FIG. 39 is a perspective rear view illustrating the semi-submersible launch and recovery unmanned vehicle of FIG. 36 during launch and recovery of a payload object.
Figure 40:
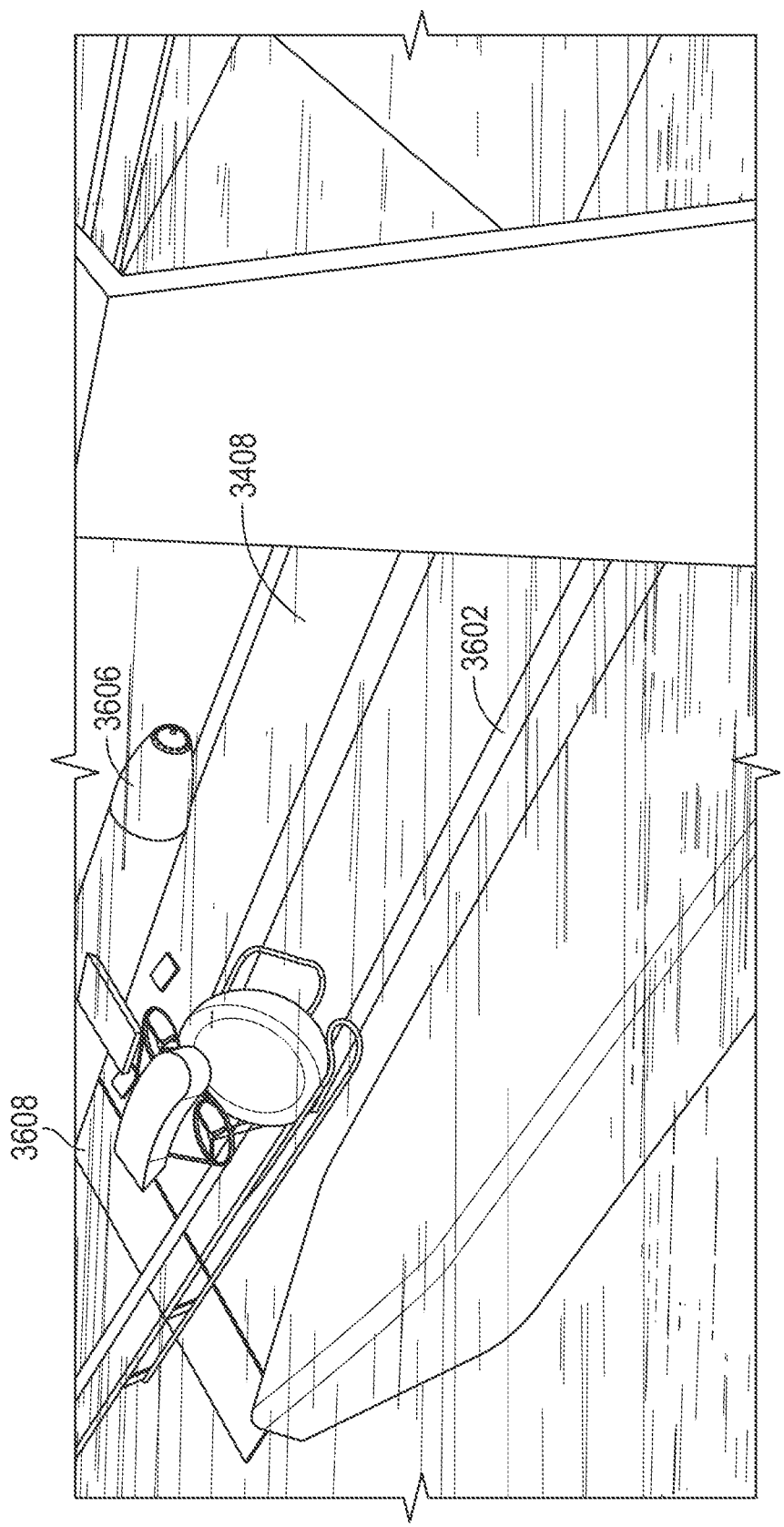
FIG. 40 is a more detailed rear view illustrating the semi-submersible launch and recovery unmanned vehicle of FIG. 36 during launch and recovery of a payload object.

When the water in the well deck 3408 is at the desired depth and the pitch of the well deck is at the desired angle, the actual launch of the payload objects 3606, 3608 (e.g. either USV, UUV or ROV) is initiated. In this phase, the support 3602 or cradle releases the payload object(s) 3606, 3608 or the object simply floats away from its cradle. The object 3606, 3609 may or may not be tethered 3605 and may drive away from the UMMV 3400 to perform its mission. FIG. 39 is a perspective rear view illustrating the semi-submersible launch and recovery unmanned vehicle 3400 of FIG. 36 during launch and recovery of the payload object 3606, 3608. FIG. 40 is a more detailed rear view illustrating the semi-submersible launch and recovery unmanned vehicle 3400 of FIG. 36 during launch and recovery of the payload objects 3606, 3608.

It should be appreciated that the UMMV 3400 may drive away from the payload object(s) 3606, 3608, or the objects may drive away from the UMMV. Once the UMMV 3400 achieves separation from the object(s) 3606, 3608, the UMMV may stay partially submerged and navigate in that orientation, may evacuate the flooded water and continue to drive as a surface vessel, or remain floating stationary in its partially submerged orientation, for example.

Orientation sensors 3520 may include positional sensors to provide pitch-roll-yaw and depth position of the UMMV 3400. Also, sensors 3524 detect location and orientation of payload objects 3606, 3608 to provide feedback to the command and control block 3504 and/or positioning and payload securing systems. The payload position sensors 3524 may include imaging sensors, e.g., electro-optical or infrared (EO/IR), that are oriented toward payload objects 3606, 3608 and a remote streaming system (i.e., control and communications of imaging) may be part of the command and control block 3504 or the vehicle control system 1500 to provide feedback to remote human operators. Thus, the well deck positioning control system 3500, in connection with the vehicle control system, has the capability to dynamically position the UMMV 3400 relative to payload objects 3606, 3608 and may include communication (wired or wireless) between such objects and the UMMV.

Figure 41:
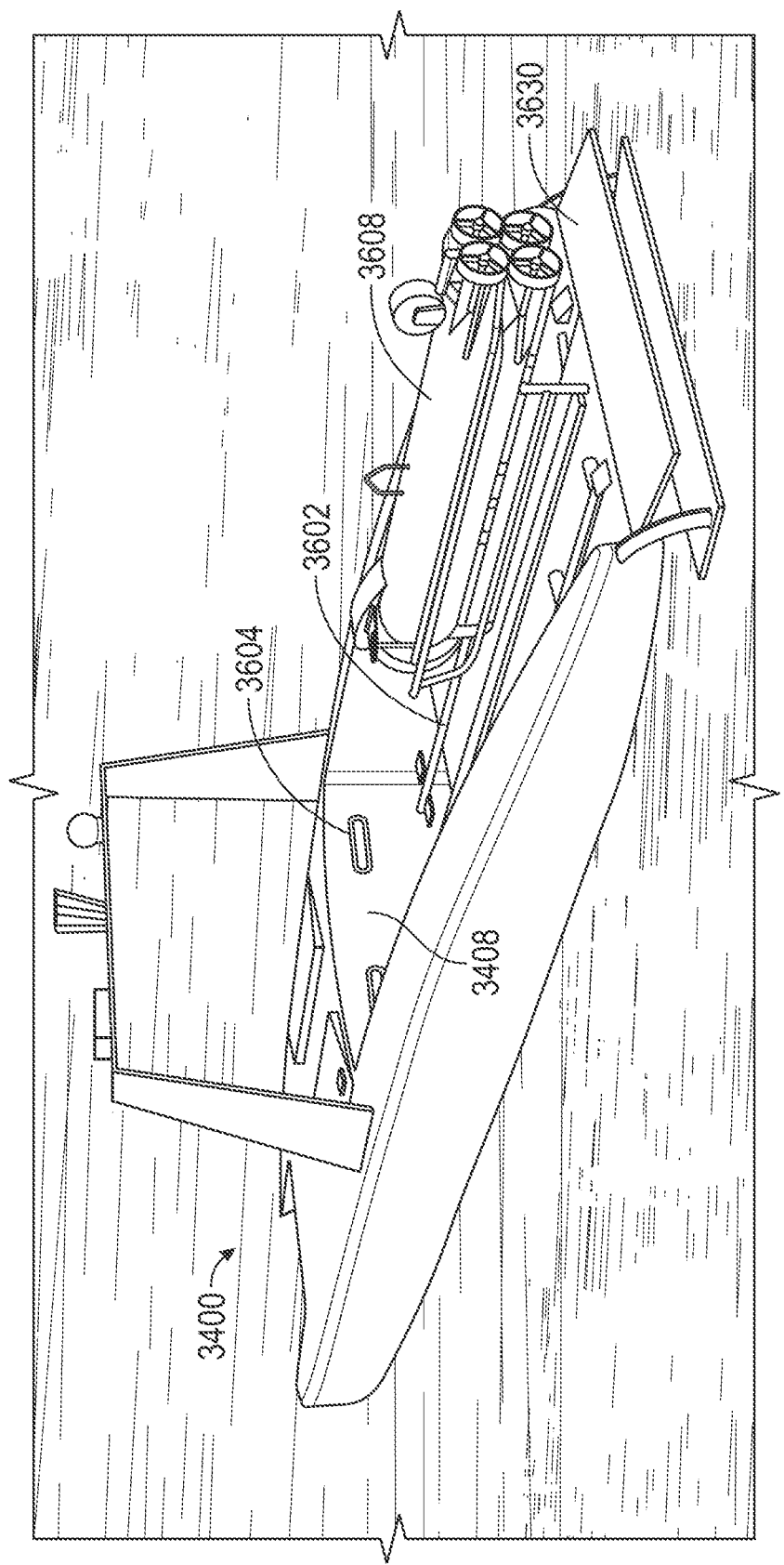
FIG. 41 is a perspective rear view illustrating the semi-submersible launch and recovery unmanned vehicle of FIG. 36 on the surface of the water after recovery of a payload object and back on the surface of the water.

In recovery mode, the UMMV 3400 will return to its semi-submersible condition. The payload object(s) 3606, 3608 will either drive back over the well deck 3408 for capture or may be captured aft of the UMMV 3400 and then towed back into the well deck. Once the object(s) 3606, 3608 is/are in position and secured or captured in the well deck 3408, the UMMV 3400 evacuates the flooded water by pumping it out and returns to its surface operation. Sensors 3522, 3520 monitor the water level and pitch during the transition from semi-submersible to surface condition. FIG. 41 is a perspective rear view illustrating the semi-submersible launch and recovery unmanned vehicle 3400 of FIG. 36 on the surface of the water after recovery of a payload object 3608 and back on the surface of the water. As illustrated, as part of the payload securing system, a tailgate 3630 is configured to pivot between a down (or launch/recovery) position and an up (or closed/transport) position.

Once the flooded water is pumped out of the well deck 3408 and/or the ballast containers 3410, the UMMV 3400 may navigate normally and perform high speed maneuvers as desired.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An unmanned vehicle configured to selectively operate on at least a substantially planar water surface and while at least partially submerged in water, the unmanned vehicle comprising:
 a vehicle body comprising a pair of substantially parallel sponsons coupled together on opposite sides of a recessed well deck in a stern portion of the vehicle body, the recessed well deck being configured to stow a payload;
 a propulsion system carried by the vehicle body and configured to propel the unmanned vehicle;
 a maneuvering system carried by the vehicle body and configured to maneuver the unmanned vehicle;
 a vehicle control system carried by the vehicle body and configured to control a speed, an orientation, and a direction of travel of the unmanned vehicle in combination with the propulsion system and the maneuvering system;
a buoyancy control system carried by the vehicle body and configured to control buoyancy of the unmanned vehicle;
a sensor system carried by the vehicle body and comprising a plurality of environmental sensors configured to sense environmental and operational characteristics for the unmanned vehicle; and
at least one power supply carried by the vehicle body and configured to provide power to the propulsion system, the maneuvering system, the vehicle control system, the buoyancy control system, and the sensor system;
wherein the vehicle control system, the buoyancy control system and the sensor system define a well deck positioning control system configured to launch and recover objects of the payload to/from the water while the well deck is at least partially submerged in water;
wherein the buoyancy control system comprises
ballast containers positioned within portions of the vehicle body, and
a pump and valve system configured to vary amounts of water and air in the ballast containers and the recessed well deck;
wherein the recessed well deck comprises a payload securing system;
wherein the plurality of environmental sensors of the sensor system at least include
water level sensors configured to sense water levels in the ballast containers and the recessed well deck, and
payload position sensors configured to sense the position of the payload relative to the payload securing system and the recessed well deck; and
wherein the well deck positioning system further comprises a well deck positioning controller configured to provide output signals to the buoyancy control system in response to input signals from the sensor system and at least one of operator instructions and autonomous operation instructions.

2. The unmanned vehicle according to claim 1 wherein the well deck positioning system is controlled by the well deck positioning controller to position the recessed well deck within six degrees of freedom including roll, pitch, yaw, up/dawn, forward/reverse and right/left.

3. The unmanned vehicle according to claim 2 wherein roll, pitch, and up/down are controlled in combination with the buoyancy control system, and yaw, forward/reverse, and right/left are controlled in combination with the vehicle control system.

4. The unmanned vehicle according to claim 1 wherein the ballast containers comprise at least one ballast container located forward and aft in each of the sponsons to define four quadrants of buoyancy for the unmanned vehicle.

5. The unmanned vehicle according to claim 4 wherein the buoyancy control system is configured to control the relative buoyancy in each of the four quadrants and the total buoyancy of the unmanned vehicle.

6. The unmanned vehicle according to claim 1 wherein the pump and valve system comprises at least one ballast water pump and a ballast water valve associated with each ballast container.

7. The unmanned vehicle according to claim 1 wherein the pump and valve system comprises at least one well deck water pump and associated well deck water valve.

8. The unmanned vehicle according to claim 1 wherein the pump and valve system comprises at least one air valve associated with the ballast containers or the recessed well deck.

9. The unmanned vehicle according to claim 1 wherein the payload securing system comprises:
at least one support structure configured to hold and stabilize objects of the payload; and
a winch/tether system including tether lines attached to at least one reel.

10. The unmanned vehicle according to claim 9 wherein the tether lines comprise multi-purpose tether lines configured to transmit power to, communicate data with, and mechanically tow objects of the payload.

11. The unmanned vehicle according to claim 1 wherein the objects of the payload comprise at least one of unmanned surface vessels ("USV"), unmanned underwater vessels ("UUV") and remote operated vehicles ("ROV").

12. The unmanned vehicle according to claim 1 wherein the plurality of environmental sensors of the sensor system further include orientation sensors; and wherein the well deck positioning system is controlled by the well deck positioning controller to position the recessed well deck relative to position and orientation of objects of the payload using payload position sensors and orientation sensors.

13. The unmanned vehicle according to claim 1 wherein the well deck positioning system is controlled by the well deck positioning controller to position the recessed well deck relative to position and orientation of objects of the payload using communication therebetween.

14. The unmanned vehicle according to claim 1 wherein the sensor system further comprises environmental sensors to sense environmental conditions including at least one of sea state, wind and current; and wherein the well deck positioning system is controlled by the well deck positioning controller to position the recessed well deck relative to objects of the payload based upon the environmental conditions.

15. An unmanned vehicle configured to selectively operate on at least a substantially planar water surface and while at least partially submerged in water to launch and recover objects of a payload, the unmanned vehicle comprising:
a vehicle body comprising a hull and a recessed well deck in a stern portion of the vehicle body, the recessed well deck being configured to stow a payload and be flooded with water during launch and recovery of objects of the payload;
a propulsion system carried by the vehicle body and configured to propel the unmanned vehicle;
a maneuvering system carried by the vehicle body and configured to maneuver the unmanned vehicle;
a vehicle control system carried by the vehicle body and configured to control a speed, an orientation, and a direction of travel of the unmanned vehicle in combination with the propulsion system and the maneuvering system;
a buoyancy control system carried by the vehicle body and configured to control buoyancy of the unmanned vehicle;
a sensor system carried by the vehicle body and comprising a plurality of environmental sensors configured to sense environmental and operational characteristics for the unmanned vehicle; and
at least one power supply carried by the vehicle body and configured to provide power to the propulsion system, the maneuvering system, the vehicle control system, the buoyancy control system, and the sensor system;

wherein the vehicle control system, the buoyancy control system and the sensor system define a well deck positioning control system configured to launch and recover objects of the payload to/from the water while the well deck is at least partially submerged in water;

wherein the buoyancy control system comprises
- ballast containers positioned within portions of the vehicle body, and
- a pump and valve system configured to vary amounts of water in the ballast containers and the recessed well deck;

wherein the recessed well deck comprises a payload securing system; and wherein the well deck positioning system further comprises a well deck positioning controller configured to provide output signals in response to input signals from the sensor system and operation instructions to position the recessed well deck within six degrees of freedom including roll, pitch, yaw, up/down, forward/reverse and right/left, wherein roll, pitch, yaw, and up/down are controlled in combination with the buoyancy control system, and forward/reverse and right/left are controlled in combination with the vehicle control system.

16. The unmanned vehicle according to claim 15 wherein the ballast containers comprise at least one ballast container located in each of four quadrants of the hull; and wherein the buoyancy control system is configured to control the relative buoyancy in each of the four quadrants and the total buoyancy of the unmanned vehicle.

17. The unmanned vehicle according to claim 15 wherein the pump and valve system comprises at least one ballast water pump and a ballast water valve associated with each ballast container.

18. The unmanned vehicle according to claim 15 wherein the pump and valve system comprises at least one well deck water pump and associated well deck water valve.

19. The unmanned vehicle according to claim 15 wherein the pump and valve system comprises at least one air valve associated with the ballast containers or the recessed well deck.

20. The unmanned vehicle according to claim 15 wherein the plurality of environmental sensors of the sensor system at least include:
- water level sensors configured to sense water levels in the ballast containers and the recessed well deck, and
- payload position sensors configured to sense the position of the payload relative to the payload securing system and the recessed well deck.

21. The unmanned vehicle according to claim 15 wherein the payload securing system comprises at least one support structure configured to hold and stabilize objects of the payload.

22. The unmanned vehicle according to claim 21 wherein the payload securing system further comprises a winch/tether system including tether lines attached to at least one reel.

23. The unmanned vehicle according to claim 22 wherein the tether lines comprise multi-purpose tether lines configured to transmit power to, communicate data with, and mechanically tow objects of the payload.

24. The unmanned vehicle according to claim 15 wherein the objects of the payload comprise at least one of unmanned surface vessels ("USV"), unmanned underwater vessels ("UUV") and remote operated vehicles ("ROV").

25. The unmanned vehicle according to claim 15 wherein the propulsion system is powered by at least one of an electric motor, a diesel motor, a turbine engine, and a nuclear reactor.

26. The unmanned vehicle according to claim 15 wherein the at least one power supply includes at least one battery in electrical communication with at least one of solar energy collectors, wave motion energy collectors, and generated energy collectors.

* * * * *